(12) United States Patent
Rupp et al.

(10) Patent No.: US 12,163,912 B2
(45) Date of Patent: Dec. 10, 2024

(54) GAS SENSOR DEVICE CONTAINING LITHIUM GARNET

(71) Applicant: Massachusetts Institute of Technology, Cambridge, MA (US)

(72) Inventors: Jennifer Lilia Rupp, Starnberg (DE); Zachary Hood, Bolingbrook, IL (US); Moran Balaish, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 420 days.

(21) Appl. No.: 17/562,658

(22) Filed: Dec. 27, 2021

(65) Prior Publication Data

US 2022/0276196 A1    Sep. 1, 2022

Related U.S. Application Data

(60) Provisional application No. 63/154,336, filed on Feb. 26, 2021.

(51) Int. Cl.
*G01N 27/404* (2006.01)
*G01N 27/30* (2006.01)
*G01N 27/403* (2006.01)

(52) U.S. Cl.
CPC ....... *G01N 27/4045* (2013.01); *G01N 27/301* (2013.01); *G01N 27/4035* (2013.01)

(58) Field of Classification Search
CPC .................................................. G01N 33/0042
See application file for complete search history.

(56) References Cited

U.S. PATENT DOCUMENTS

| | | |
|---|---|---|
| 2009/0011315 A1 | 1/2009 | Gauckler et al. |
| 2009/0029195 A1 | 1/2009 | Gauckler et al. |
| 2021/0332473 A1 | 10/2021 | Pfenninger et al. |

FOREIGN PATENT DOCUMENTS

EP    2896962 A1    7/2015

OTHER PUBLICATIONS

Ramakumar et al., "Lithium garnets: Synthesis, strucuture, Li+ conductivity, Li+ dynamics and applications," Progress in Materials Sciece 88 (2017) 325-411 (Year: 2017).*
Deng et al., "Structural and Mechanistic Insights into Fast Lithium-Ion Conduction in Li3PO4—Li2SiO3 Solid Electrolytes," J. Am. Chem. Soc. 2015, 137, 9136-9145 (Year: 2015).*
(Continued)

*Primary Examiner* — Alexander S Noguerola
(74) *Attorney, Agent, or Firm* — Smith Baluch LLP

(57) ABSTRACT

An $SO_x$ sensor includes a lithium garnet electrolyte, a sensing electrode, a reference electrode, and a heating element. The sensing electrode includes $Li_2SO_4$ and at least one metal oxide or second metal sulfate. One surface of the sensing electrode is disposed on at least a portion of a surface of the lithium garnet electrolyte. A current collector is disposed on at least a portion another surface of the sensing electrode to electrically couple the sensing electrode to the reference electrode via a potentiometer. The reference electrode is disposed on the lithium garnet electrolyte. The heating element is capable of heating the sensing electrode and the lithium garnet electrolyte to a temperature sufficient to achieve a sensor response time of less than about 30 minutes.

20 Claims, 43 Drawing Sheets

(56) References Cited

OTHER PUBLICATIONS

Wang et al., "Influence of annealing conditions on the ionic conductivity of Li3PO4—Li2SiO3 thin films prepared by magnetron sputtering," Ceramics International 43 (2017) 15821-15827 (Year: 2017).*

Struzik et al., "A Simple and Fast Electrochemical CO2 Sensor Based on Li7La3Zr2O12 for Environmental Monitoring," Adv. Mater. 2018, 30, 1804098, ten pages plus Supporting Information (Year: 2015).*

Wang et al., "A new potentiometric SO2 sensor based on Li3PO4 electrolyte film and its response characteristics," Rev, Sci. Instrum. 86, 075007 (2015).*

Akila et al., "An SOx (x=2, 3) sensor using β-alumina/Na2SO4 couple." Sensors and Actuators 16.4 (1989): 311-323.

Akila et al., "Use of the Nasicon/Na 2 SO 4 couple in a solid state sensor for SO x (x=2, 3)." Journal of applied electrochemistry 18.2 (1988): 245-251.

Balaish et al. "Design of triple and quadruple phase boundaries and chemistries for environmental SO 2 electrochemical sensing." Journal of Materials Chemistry A 9.26 (2021): 14691-14699.

Balaish et al. "Widening the Range of Trackable Environmental and Health Pollutants for Li-Garnet-Based Sensors." Advanced Materials 33.20 (2021): 2100314, 15 pages.

Balaish et al. Processing thin but robust electrolytes for solid-state batteries. Nature Energy 6.3 (2021): 227-239.

Barrier Films. Saes Group. Accessed at https://www.saesgetters.com/barrier-films on Jul. 6, 2021. 4 pages.

Berger et al., "Tin dioxide-based gas sensors for SO2 detection: a chemical interpretation of the increase in sensitivity obtained after a primary detection." Sensors and Actuators B: Chemical 45.3 (1997): 175-181.

Chen et al., "A potentiometric SO2 gas sensor based on the Li3PO4—Li2SiO3 solid electrolyte thin film." Review of Scientific Instruments 90.6 (2019): 065001, 10 pages.

Choi et al., "SO2 sensing characteristics of Nasicon electrolytes." Sensors and Actuators B: Chemical 36.1-3 (1996): 263-266.

Fergus "A review of electrolyte and electrode materials for high temperature electrochemical CO2 and SO2 gas sensors." Sensors and Actuators B: Chemical 134.2 (2008): 1034-1041.

Gauthier et al., "Solid-state detectors for the potentiometric determination of gaseous oxides: I. Measurement in air." Journal of the electrochemical society 124.10 (1977): 1579-1583.

Gauthier et al., "Solid-State Detectors for the Potentiometric Determination of Gaseous Oxides: II. Measurements in Oxygen-Variable Gases in the, System." Journal of the Electrochemical Society 124.10 (1977): 1584, 5 Pages.

Girardin et al., "Modelling of SO2 detection by tin dioxide gas sensors." Sensors and Actuators B: Chemical 43.1-3 (1997): 147-153.

Hitz et al. "High-rate lithium cycling in a scalable trilayer Li-garnet-electrolyte architecture." Materials Today 22 (2019): 50-57.

Hötzel et al., "Potentiometric gas sensors based on fast solid electrolytes." Sensors and Actuators 12.4 (1987): 449-453.

Imanaka et al., "Sulfur Dioxide Gas Detection with Na2 SO 4-Li2 SO 4-Y 2 (SO 4) 3-SiO2 Solid Electrolyte by a Solid Reference Electrode Method." Journal of the Electrochemical Society 134.3 (1987): 725, 4 pages.

Itoh et al., "Solid reference electrode of SO2 sensor using β-alumina solid electrolyte." Transactions of the Japan Institute of metals 25.7 (1984): 504-510.

Izu et al., "Planar potentiometric SO2 gas sensor for high temperatures using NASICON electrolyte combined with V2O5/WO3/TiO2+ Au or Pt electrode." Journal of the Ceramic Society of Japan 119.1393 (2011): 687-691.

Jasinski et al., "Electrocatalytic gas sensors based on Nasicon and Lisicon." Materials Science-Poland 24.1 (2006), 8 pages.

Jasinski et al., "Lisicon solid electrolyte electrocatalytic gas sensor." Journal of the European Ceramic Society 25.12 (2005): 2969-2972.

Jianhua et al., "A fully solid-state SOx (x=2, 3) gas sensor utilizing Ag-ß"-alumina as solid electrolyte." Sensors and Actuators B: Chemical 31.3 (1996): 209-212.

Joo et al., "Lithium ion conducting lithium sulfur oxynitride thin film." Electrochemical and Solid State Letters 7.8 (2004): A256, 3 pages.

Kida et al., "Interfacial structure of NASICON-based sensor attached with Li2CO3—CaCO3 auxiliary phase for detection of CO2." Solid State Ionics 136 (2000): 647-653.

Knauth "Inorganic solid Li ion conductors: An overview." Solid State Ionics 180.14-16 (2009): 911-916.

Korotcenkov, "Metal oxides for solid-state gas sensors: What determines our choice?." Materials Science and Engineering: B 139.1 (2007): 1-23.

Korotcenkov, "Nanocomposites in gas sensors: promising approach to gas sensor optimization." Handbook of Gas Sensor Materials. Springer, New York, NY, 2014. 181-184.

Lee et al., "Environmental gas sensors." IEEE sensors journal 1.3 (2001): 214-224.

Liang et al., "Solid-state potentiometric SO2 sensor combining NASICON with V2O5-doped TiO2 electrode." Sensors and Actuators B: Chemical 134.1 (2008): 25-30.

Lindell, Packaging solutions for biodegradable tissue engineering products. Packing Digest Sep. 22, 2014. Accessed at https://www.packagingdigest.com/flexible-packaging/super-barrier-nanofilm-stretches-packaging-applications. 6 pages.

Liu et al., "Solid-state gas sensors for high temperature applications—a review." Journal of Materials Chemistry A 2.26 (2014): 9919-9943.

Liu et al., "Stabilized zirconia-based mixed potential type sensors utilizing MnNb2O6 sensing electrode for detection of low-concentration SO2." Sensors and Actuators B: Chemical 238 (2017): 1024-1031.

Ma et al. "Novel solid electrolyte CO2 gas sensors based on c-axis-oriented Y-doped La9. 66Si5. 3B0. 7O26. 14." ACS Applied Materials & Interfaces 12.19 (2020): 21515-21520.

Ma et al. "Sub-ppb SO2 gas sensor based on NASICON and LaxSm1—xFeO3 sensing electrode." Sensors and Actuators B: Chemical 256 (2018): 648-655.

Maruyama et al., "Potentiometric sensor for sulfur oxides using NASICON as a solid electrolyte." Solid State Ionics 17.4 (1985): 281-286.

Ménil et al., "Planar LiSICON-based potentiometric CO2 sensors: influence of the working and reference electrodes relative size on the sensing properties." Sensors and Actuators B: Chemical 107.2 (2005): 695-707.

Min et al., "SO2-sensing characteristics of Nasicon sensors with Na2SO4—BaSO4 auxiliary electrolytes." Sensors and Actuators B: Chemical 93.1-3 (2003): 209-213.

Miura et al., "High-performance solid-electrolyte carbon dioxide sensor with a binary carbonate electrode." Sensors and Actuators B: Chemical 9.3 (1992): 165-170.

Pasierb et al. "Solid-state potentiometric gas sensors—current status and future trends." Journal of Solid State Electrochemistry 13.1 (2009): 3-25.

Pfenninger et al., "A low ride on processing temperature for fast lithium conduction in garnet solid-state battery films." Nature Energy 4.6 (2019): 475-483.

Rao et al., "A novel temperature-gradient Na+-β"-alumina solid electrolyte based SOx gas sensor without gaseous reference electrode." Solid State Ionics 53 (1992): 30-38.

Roman et al. "Luminescent characteristics of CaSO4: Dy films obtained by spray pyrolysis method." Applied Radiation and Isotopes 70.7 (2012): 1403-1406.

Sharafi et al. "Impact of air exposure and surface chemistry on Li—Li 7 La 3 Zr 2 O 12 interfacial resistance." Journal of Materials Chemistry A 5.26 (2017): 13475-13487.

Shimizu et al., "Improvement of SO2 sensing properties of WO3 by noble metal loading." Sensors and Actuators B: Chemical 77.1-2 (2001): 35-40.

Struzik et al., "A simple and fast electrochemical CO2 sensor based on Li7La3Zr2O12 for environmental monitoring." Advanced Materials 30.44 (2018): 1804098.

(56) References Cited

OTHER PUBLICATIONS

Suganuma et al., "SO2 gas sensor utilizing stabilized zirconia and sulfate salts with a new working mechanism." Solid State Ionics 126.1-2 (1999): 175-179.

Thangadurai et al. "Garnet-type solid-state fast Li ion conductors for Li batteries: critical review." Chemical Society Reviews 43.13 (2014): 4714-4727.

Tobon-Zapata et al., "Thermal behaviour of pharmacologically active lithium compounds." Journal of thermal analysis and calorimetry 61.1 (2000): 29-35.

Uneme et al., "Moderate-temperature operable SO 2 gas sensor based on Zr 4+ ion conducting solid electrolyte." Journal of Sensors and Sensor Systems 1.1 (2012): 29-32.

Wang et al. "A new potentiometric SO2 sensor based on Li3PO4 electrolyte film and its response characteristics." Review of Scientific Instruments 86.7 (2015): 075007, 7 pages.

Wang et al., "A new SO2 gas sensor based on an Mg2+ conducting solid electrolyte." Journal of Electroanalytical Chemistry 543.2 (2003): 109-114.

Wang et al., "A SO2 gas sensor based upon composite Nasicon/Sr-β-Al2O3 bielectrolyte." Materials research bulletin 40.10 (2005): 1802-1815.

Wang et al., "Influence of the sensing and reference electrodes relative size on the sensing properties of Li3PO4-based potentiometric CO2 sensors." Surface and Coatings Technology 320 (2017): 542-547.

Wang et al., "Potentiometric SO 2 gas sensor based on a thick film of Ca 2+ ion conducting solid electrolyte." Journal of applied electrochemistry 36.2 (2006): 173-178.

Weppner, "Solid-state electrochemical gas sensors." Sensors and Actuators 12.2 (1987): 107-119.

Yan et al., "Construction and working mechanism of sulfur dioxide sensor utilizing stabilized zirconia and metal sulfate." Journal of the Electrochemical Society 143.2 (1996): 609, 5 pages.

Yan et al., "High-performance solid-electrolyte SOx sensor using MgO-stabilized zirconia tube and Li2SO4—CaSO4—SiO2 auxiliary phase." Sensors and Actuators B: Chemical 20.2-3 (1994): 81-87.

Yan et al., "Solid-state sensor for sulfur oxides based on stabilized zirconia and metal sulphate." Chemistry letters 21.4 (1992): 635-638.

Yang et al., "Performance evaluation of SOx (x=2, 3) gas sensors using Ag-β"-alumina solid electrolyte." Solid state ionics 86 (1996): 1095-1099.

Zhu et al., "Garnet-like solid state electrolyte Li6BaLa2Ta2O12 based potentiometric CO2 gas sensor." Sensors and Actuators B: Chemical 176 (2013): 284-289.

Zhu et al., "Lithium-film ceramics for solid-state lithionic devices." Nature Reviews Materials 6.4 (2021): 313-331.

\* cited by examiner

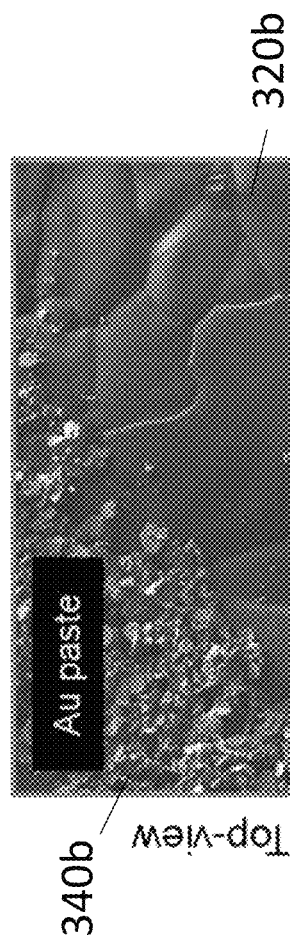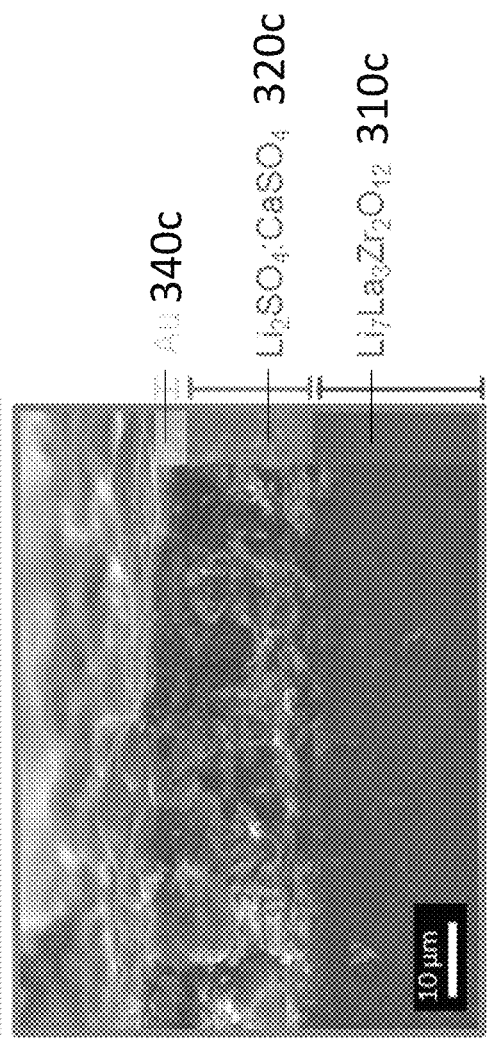
FIG. 3B
FIG. 3C

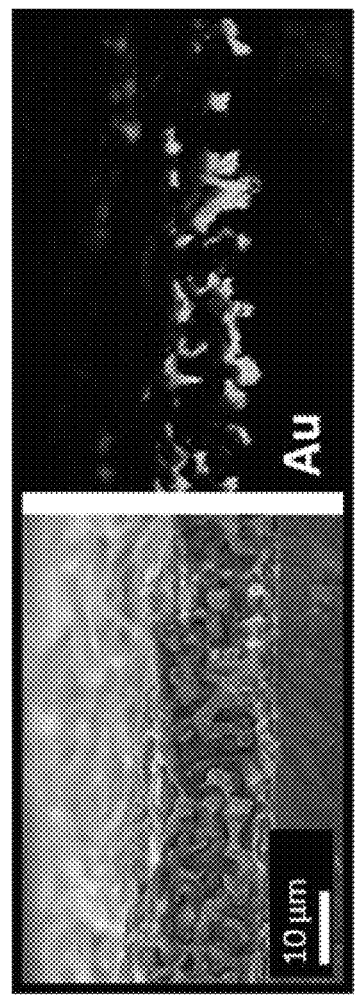
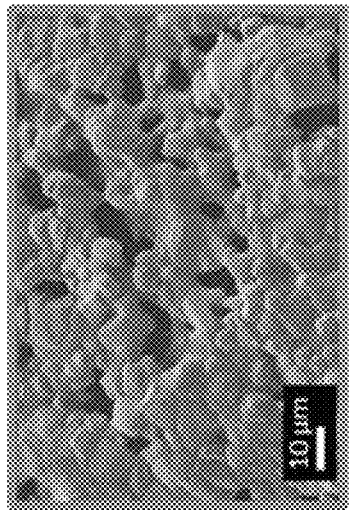
FIG. 4B, FIG. 4C, FIG. 4D

LLZO scaffold on LLZO pellet

Table 1. Melting temperature of the sensing electrode as a function of its composition was determined via DSC/TGA analysis of different mole ratio of $Li_2SO_4:CaSO_4$

| Mole ratio of $Li_2SO_4:CaSO_4$ | 1:0 | 1:1 | 4:1 | 2:1 | 1:2 | 4:1 |
|---|---|---|---|---|---|---|
| $T_{Orth \to cubic}$ [°C] | 582 | 575 | 577 | 577 | 577 | 576 |
| $T_m$ [°C] | 853 | 696 | 701 | 699 | 705 | 705 |

FIG. 14

GAS SENSOR DEVICE CONTAINING LITHIUM GARNET

CROSS-REFERENCE TO RELATED APPLICATION(S)

This application claims the priority benefit, under 35 U.S.C § 119(e), of U.S. Application No. 63/154,336, filed on Feb. 26, 2021, entitled "GAS SENSOR DEVICE CONTAINING LITHIUM GARNET," which is incorporated herein by reference in its entirety for all purposes.

BACKGROUND

With 91% of the world's population living in urban areas breathing polluted air, solid-state sensors at low cost for the monitoring and control of environmental quality are imperative to preserve air quality, human health, and the environment. In this context, sulfur oxides, $SO_2$ and $SO_3$, make up a sizeable portion of harmful pollutants, which are emitted from residential, manufacturing, and construction sectors through the combustion of sulfur-containing compounds in fossil fuels during oil and gas production and from natural processes such as volcanic eruptions and forest fires. Sulfur oxides may interact with the environment to cause toxicity, diseases, and environmental decay, playing a significant role in acid rain and having an adverse impact on forests, water, soil, corrosion, and human health. The permissible exposure limit to $SO_2$ in the air and workplaces is 0.1-10 ppm and 5 ppm, respectively, setting the upper limit for exposure without detrimental effects.

Conventionally, $SO_2$ concentrations are measured using one of two optical tracking technologies, IR spectroscopy, or UV absorbance spectroscopy, which are accurate and stable but expensive and dependent on bulky instruments (~50,000 $cm^3$) and thus not suitable for real-time continuous monitoring in miniaturized applications. Alternative detection methods include gas chromatography and flame emission spectrometry, which are expensive, time consuming, and demand high power and are thus impractical for real-time monitoring and feedback control daily.

SUMMARY

More chemical sensing systems and technology are needed to increase the ability of sensors to monitor environmental changes and ensure the health and safety of humans. A lithium-garnet $Li_7La_3Zr_2O_{12}$ (LLZO)-based electrochemical sensor targets the highly corrosive environmental pollutant sulfur dioxide ($SO_2$). LLZO is conventionally used as a solid-state lithium-ion battery component. The LLZO-based electrochemical sensor extends the range of trackable pollutants for potential future sensor-noses. The LLZO-based electrochemical sensor includes a composite sensing electrode. The sensing electrode may be porous to define a high number of interfacial reaction sites. The LLZO-based electrochemical sensor successfully tracked $SO_2$ gas at the dangerous levels of 0-10 ppm with close-to-theoretical $SO_2$ sensitivity.

An embodiment of the invention includes an $SO_x$ gas sensor including a lithium garnet electrolyte, a sensing electrode, a current collector, a reference electrode, and a heating element. The sensing electrode comprises $Li_2SO_4$ and a second metal sulfate and/or a metal oxide. A first surface of the sensing electrode is disposed on at least a portion of a first surface of the lithium garnet electrolyte. The current collector is disposed on at least a portion of a second surface of the sensing electrode. The reference electrode is disposed on the lithium garnet electrolyte. The reference electrode is electrically coupled to the current collector via a potentiometer. The heating element is preferably capable of heating the sensing electrode and the lithium garnet electrolyte to a temperature sufficient to achieve a sensor response time of less than about 30 minutes. The sensor response time may be less than about 15 minutes. Preferably, the sensor response time may be less than 8 minutes. More preferable, the sensor response time may be less than 6 minutes. For example, the heating element may be heated at a temperature that preferably causes the sensing electrode and the lithium garnet electrolyte to achieve a temperature of about 200° C. to about 500° C.

The reference electrode in the $SO_x$ sensor may be disposed on at least a portion of the first surface of the lithium garnet electrolyte. Alternatively, the reference electrode may be disposed on at least a portion of a second surface of the lithium garnet electrolyte.

The sensing electrode may comprise $Li_2SO_4$ and a second metal sulfate in a mole ratio of about 1:4 to about 9.5:0.5. For example, the mole ratio may be about 2:3, about 1:1, or about 9:1. The second metal sulfate may be at least one of $CaSO_4$, $K_2SO_4$, $Na_2SO_4$, $Bi_2(SO_4)_3$, $Ce(SO_4)_2$, $ZnSO_4$, $Zr(SO_4)_2$, $Fe_2(SO_4)_3$, $Y_2(SO_4)_3$, $La_2(SO_4)_3$, $Ta_2SO_4$, or $BaSO_4$. The metal oxide may be at least one of FeO, $Fe_2O_3$, $Fe_3O_4$, VO, $VO_2$, $V_2O_3$, $V_2O_5$, NiO, ZnO, $CeO_2$, $SnO_2$, $Ga_2O_3$, $WO_3$, $TiO_2$, Pt, $In_2O_3$, or $La_xSm_{1-x}FeO_3$ where x is 0.2, 0.4, 0.5, 0.6, or 0.8. In one embodiment, the sensing electrode may have a thickness of about 10 nm to about 70 µm. In another embodiment, the sensing electrode may have a thickness of about 15 µm to about 20 µm. In another embodiment, the sensing electrode may have a thickness of about 5 µm to about 10 µm. The total combined thickness of the lithium garnet electrolyte, the sensing electrode, the current collector, and the reference electrode may be about 100 nm to about 5 mm. In one embodiment, the total combined thickness is about 2 µm to about 20 µm. The thickness of the lithium garnet electrolyte may be about 100 nm to about 80 µm.

The sensing electrode may include at least one of a lithium garnet phase or a $(La_{0.6}Sr_{0.4})_{0.99}CoO_{3-\delta}$ phase. The sensing electrode may additionally include a catalyst to facilitate oxidation of $SO_x$.

The lithium garnet electrolyte may have a highly conductive cubic phase. The lithium garnet may include $Li_xLa_yZr_zO_{12}$ with at least one additional dopant element. The lithium garnet may include $Li_{7-x}La_{3-y}Zr_{2-z}O_{12-\delta}$, where Al and/or Ga may be doped in the Li position; Nd and/or Sr may be doped in the La position; and Ta can be doped in the Zr position. The lithium garnet may include $Li_{7-x}La_3Zr_{2-x}Ta_xO_{12}$, where x is about 0.25 to about 0.6.

The reference electrode may include at least one of $(La_{0.6}Sr_{0.4})_{0.99}CoO_{3-\delta}$, gold, or platinum. The $SO_x$ sensor may include a capping layer to substantially reduce exposure of the lithium garnet electrolyte to air. The sensing electrode may have a porous microstructure.

Another embodiment of the present technology includes a method of sensing $SO_x$ gas using an electrochemical sensor. The method includes exposing $SO_x$ gas to a sensing electrode comprising $Li_2SO_4$ and a second metal sulfate and/or a metal oxide. A first surface of the sensing electrode is disposed on at least a portion of a first surface of a lithium garnet electrolyte. The method also includes heating the sensing electrode and the lithium garnet electrolyte to a temperature sufficient to achieve a reaction between $SO_x$, Li$^+$ and O$_2$ to form Li$_2$SO$_4$, thereby changing a potential of the electrochemical sensor. The method also includes detecting a change in the potential of the electrochemical sensor.

The SO$_x$ gas may be SO$_2$. If so, the method may additionally include oxidizing SO$_2$ to SO$_3$. The method may include determining a concentration of SO$_x$ gas based at least in part on the change in the potential of the electrochemical sensor. The method may include heating the sensing electrode and the lithium garnet electrolyte at a temperature between about 200° C. and about 500° C.

Another embodiment of the present technology includes a method of making an SO$_x$ sensing electrode. The method includes creating a mixture of Li$_2$SO$_4$ and a second metal sulfate and/or a metal oxide. The method also includes applying the mixture of Li$_2$SO$_4$ and the second metal sulfate to at least a portion of a first surface of a lithium garnet electrolyte. The method also includes annealing the lithium garnet electrolyte and the mixture of Li$_2$SO$_4$ and the second metal sulfate to form the SO$_x$ sensing electrode on the at least a portion of the first surface of the lithium garnet electrolyte.

Creating the mixture of Li$_2$SO$_4$ and the second metal sulfate and/or the metal oxide may include grinding with a mortar and pestle in a binder solution. Creating the mixture may include ball milling. The mixture may be ball milled in isopropanol. Annealing may include melting the mixture. Annealing may include heating the sensing electrode under a constant flow of oxygen gas to a temperature sufficient to adhere the sensing electrode to the at least a portion of the first surface of the lithium garnet electrolyte. For example, the annealing chamber may be heated to about 550° C. to about 750° C. The step of applying the mixture may include spraying a suspension of the mixture onto the at least a portion of the first surface of the lithium garnet electrolyte. The step of applying the mixture may include RF sputtering of the mixture onto the at least a portion of the first surface of the lithium garnet electrolyte. The step of applying the mixture may include at least one of pulsed laser deposition (PLD), tape casting, or dip coating.

Another embodiment of the present technology includes a method of making an SO$_x$ sensor. The method includes making the SO$_x$ sensing electrode according to the method described above. The method also includes adding a reference electrode to at least a portion of the first surface of the lithium garnet electrolyte or to at least a portion of a second surface of the lithium garnet electrolyte. The method also includes electrically coupling the sensing electrode and the reference electrode via a potentiometer. The method also includes adding a heating element in proximity to the sensing electrode and the lithium garnet electrolyte, wherein the heating element can heat the sensing electrode and the lithium garnet electrolyte to a temperature sufficient to achieve a sensor response time of less than about 30 minutes.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

FIG. 3B is a planar SEM image of the sensing electrode in FIG. 3A.

FIG. 3C is a cross-sectional SEM image of the sensing electrode in FIG. 3A.

FIG. 4B is a planar SEM image of the porous sensing electrode in FIG. 4A.

FIG. 4C is a cross-sectional SEM image of the porous sensing electrode in FIG. 4A.

FIG. 4D shows a gold elemental analysis of the SEM image in FIG. 4C.

Figure 12A:
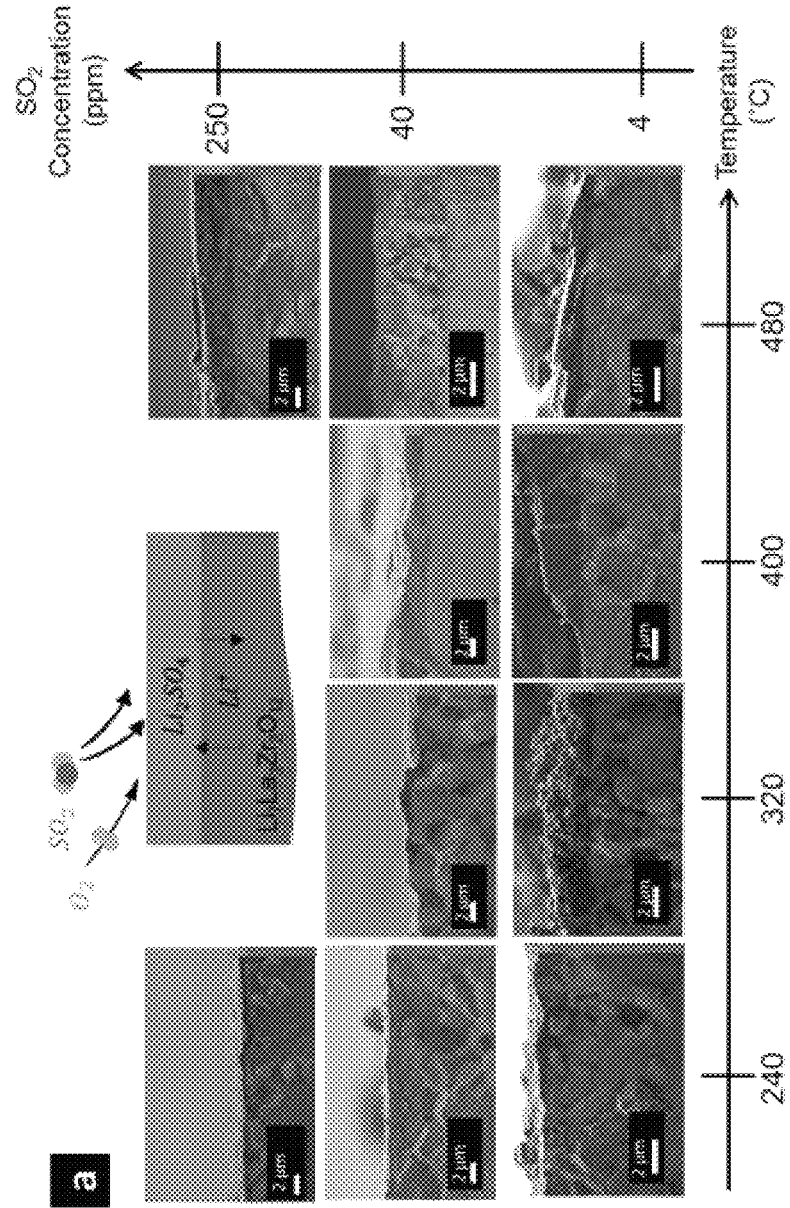

FIG. 12A shows cross-sectional SEM images of lithium garnet pellets after exposure to 4, 40, and 250 ppm $SO_2$ at 240, 320, 400, and 480° C. for 24 hours.

Figure 12B:
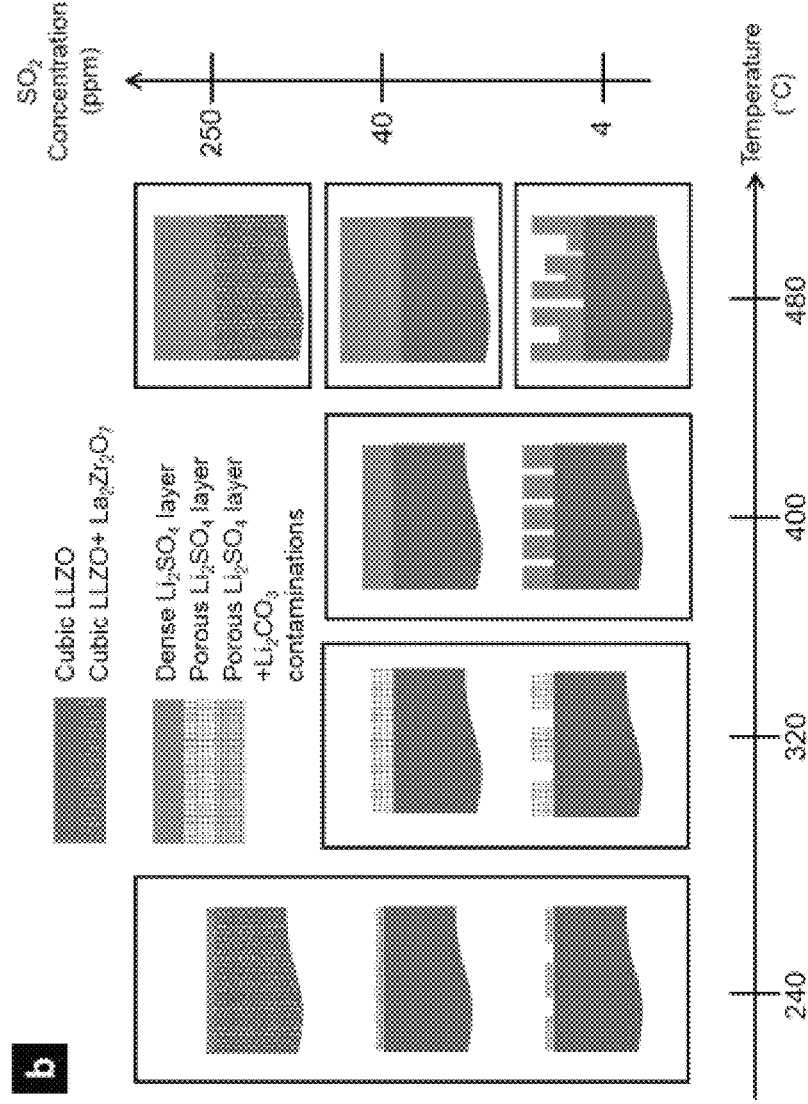

FIG. 12B shows schematic illustrations of the images in FIG. 12A.

Figure 13:
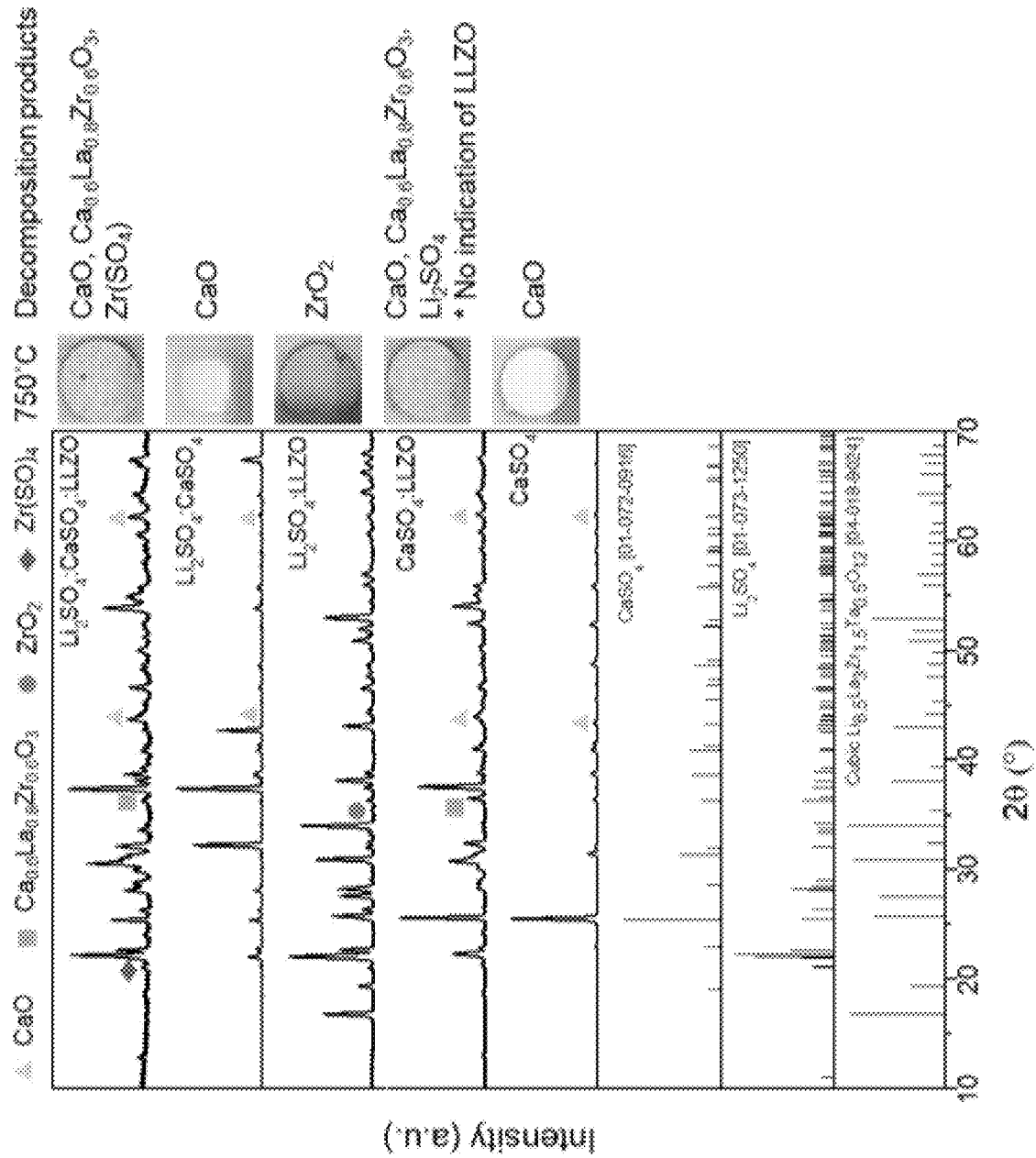

FIG. 13 shows X-ray diffraction and Raman characterization of the surface of the lithium garnet pellets in FIG. 12A after exposure to $SO_2$.

FIG. 14 shows the melting temperatures of the sensing electrode as a function of its composition, as determined with differential scanning calorimetry and thermogravimetric analysis.

Figure 15B:
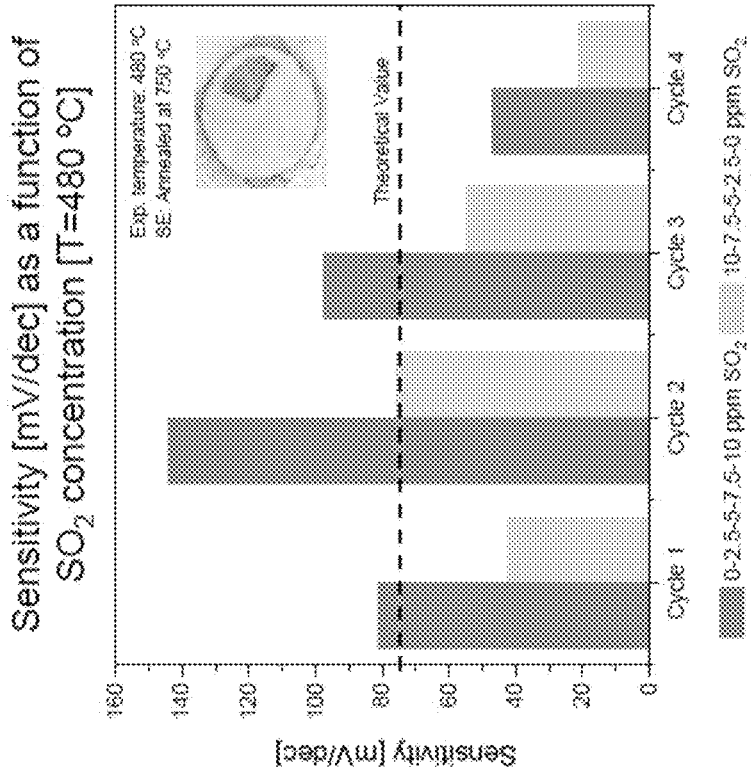
Figure 15A:
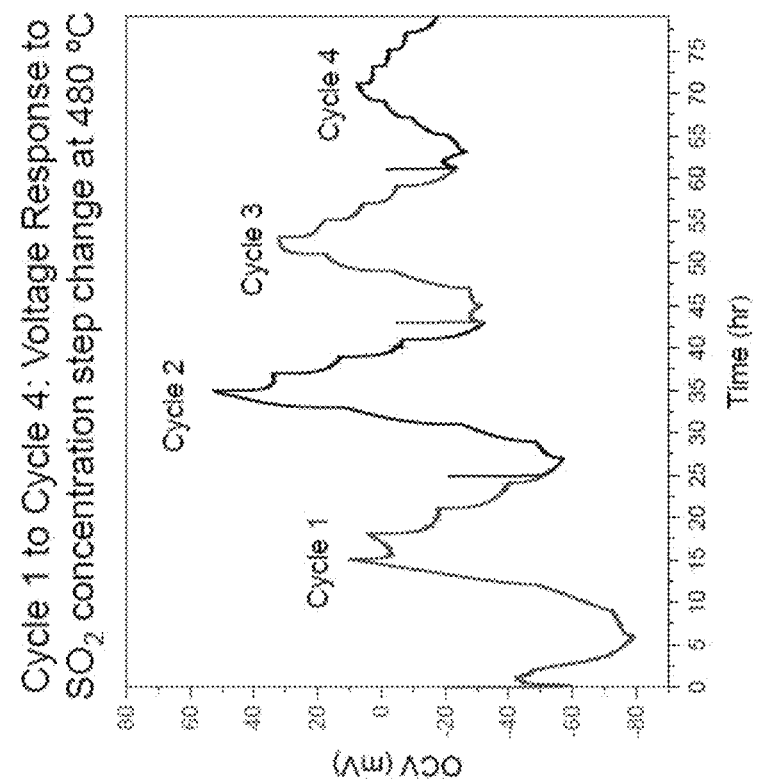

FIG. 15A shows the open circuit voltage response of an $SO_x$ sensor to four cycles of $SO_2$ concentration step changes (0-10-0 ppm) at 480° C.

FIG. 15B shows sensitivity values from the data in FIG. 15A.

Figure 16B:
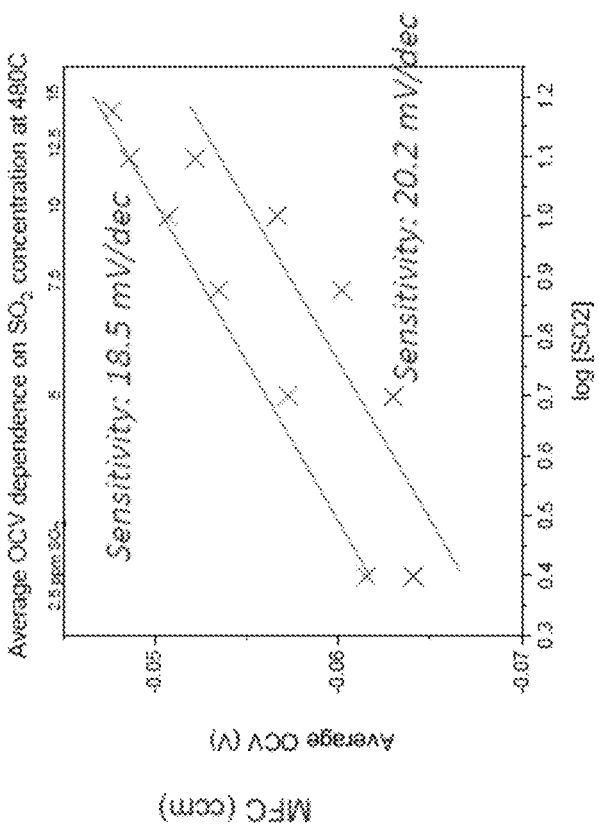
Figure 16A:
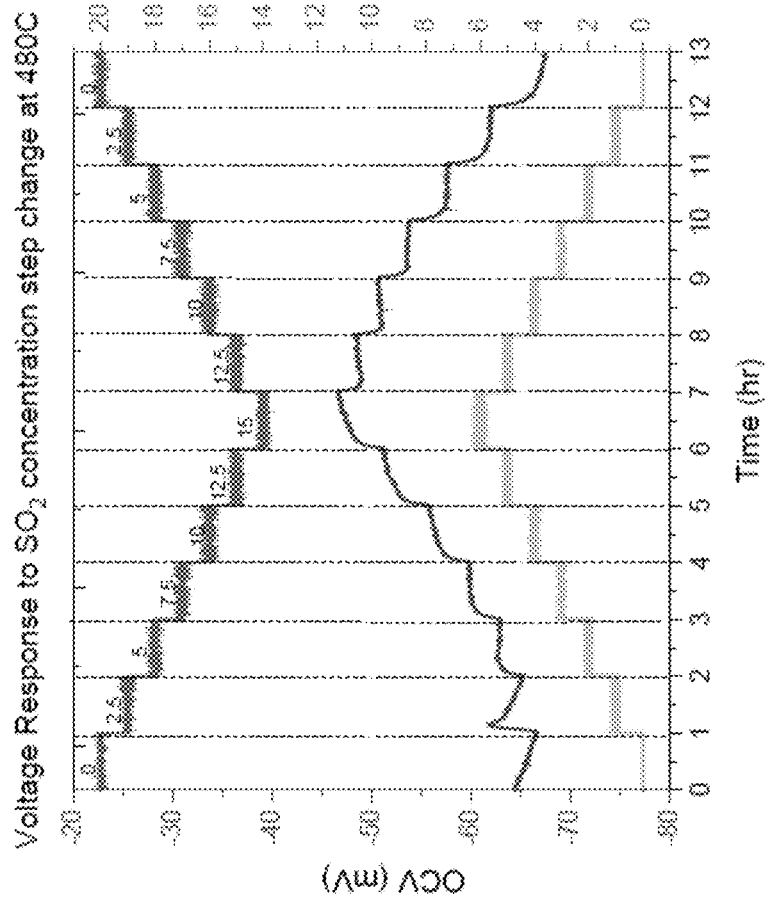

FIG. 16A shows the open circuit voltage response of an $SO_x$ sensor with an inorganic coating to $SO_2$ concentration step changes (0-15 ppm) at 480° C.

FIG. 16B shows average sensitivity values from the data in FIG. 16A.

Figure 17:
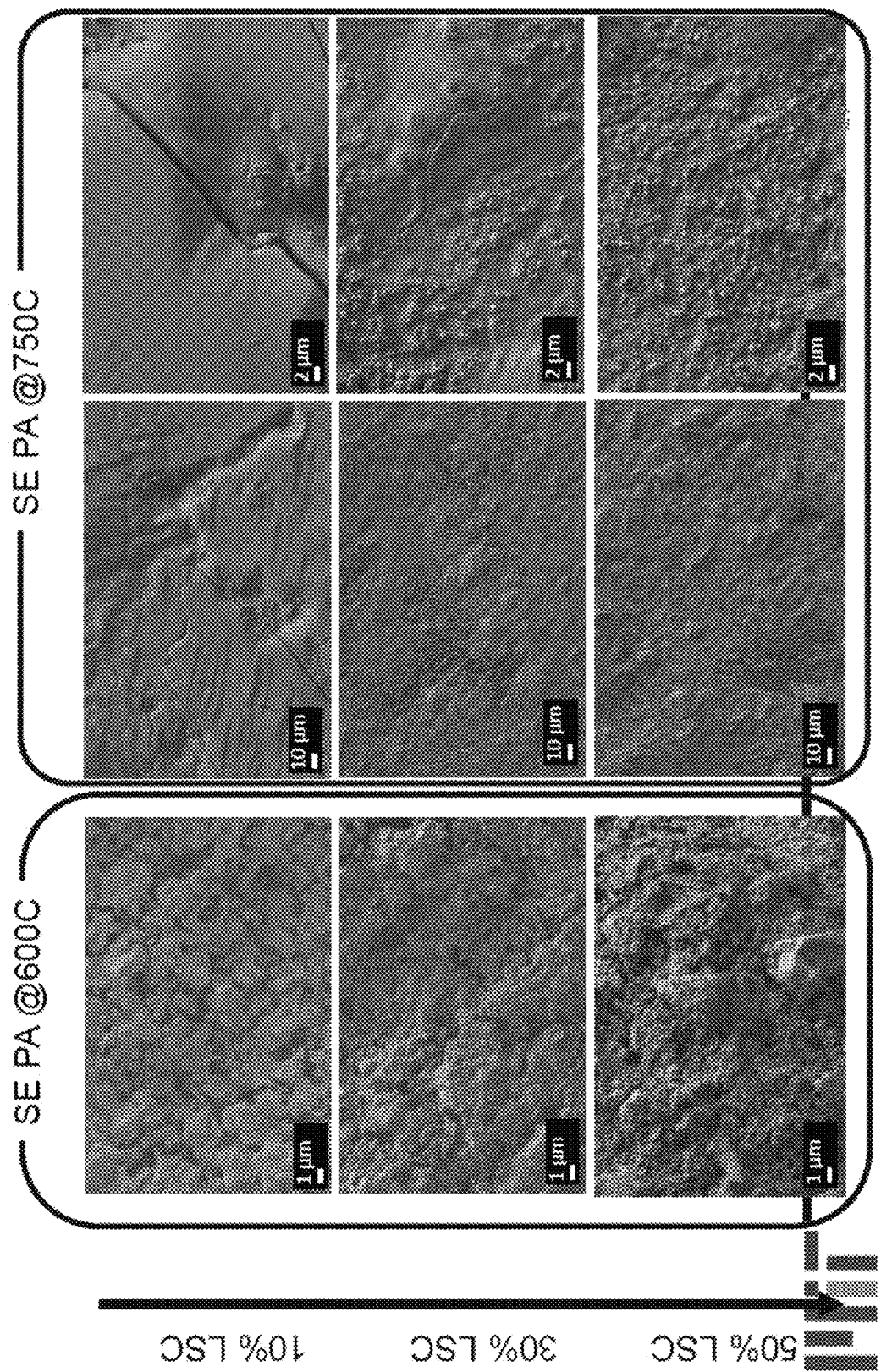

FIG. 17 shows planar SEM images of sensing electrode composites comprising $Li_2SO_4$, $CaSO_4$, and $(La_{0.6}Sr_{0.4})_{0.99}CoO_{3-\delta}$ with varying amounts of $(La_{0.6}Sr_{0.4})_{0.99}CoO_{3-\delta}$ and different annealing temperatures.

Figure 18B:
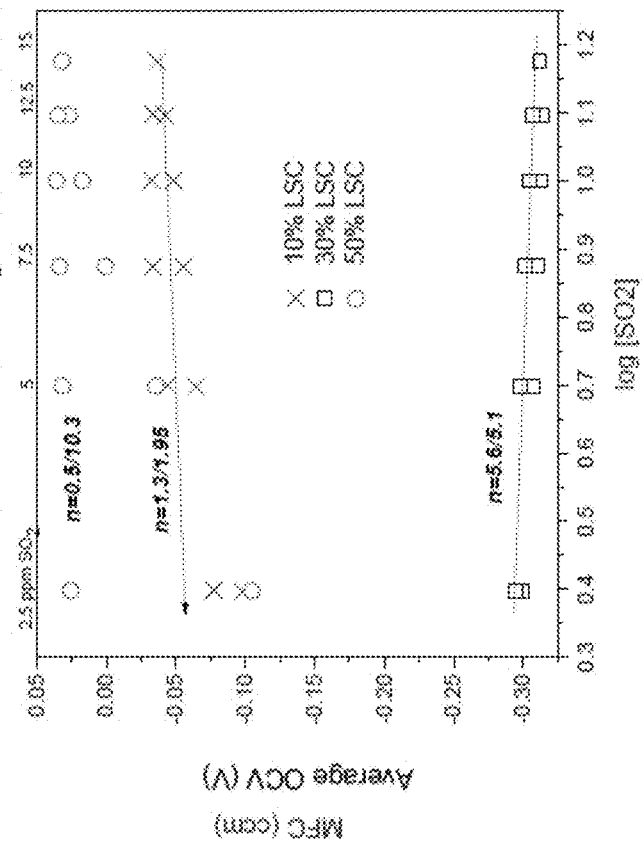
Figure 18A:
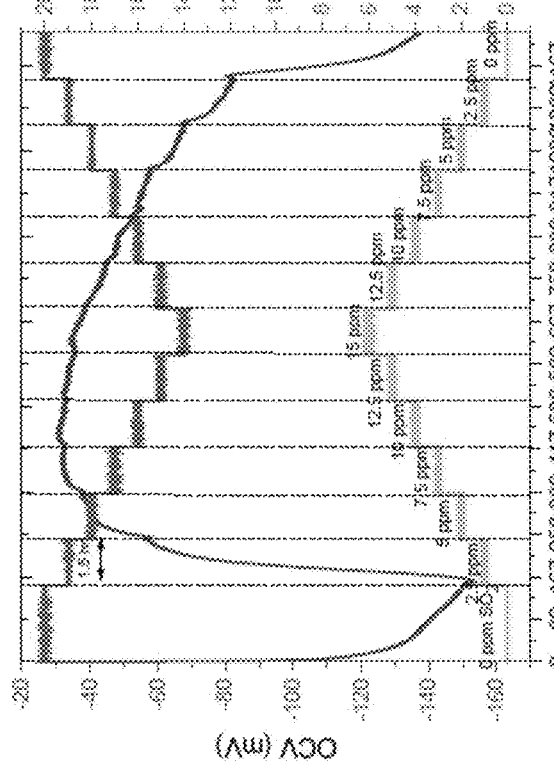

FIG. 18A shows the open circuit voltage response of an $SO_x$ sensor with a sensing electrode with 10% $(La_{0.6}Sr_{0.4})_{0.99}CoO_{3-\delta}$ to $SO_2$ concentration step changes (0-15 ppm) at 240° C.

FIG. 18B shows average sensitivity values of $SO_x$ sensors with sensing electrodes with 10%, 30%, and 50% $(La_{0.6}Sr_{0.4})_{0.99}CoO_{3-\delta}$ to $SO_2$ concentration step changes (0-15 ppm) at 240° C.

Figure 19A:
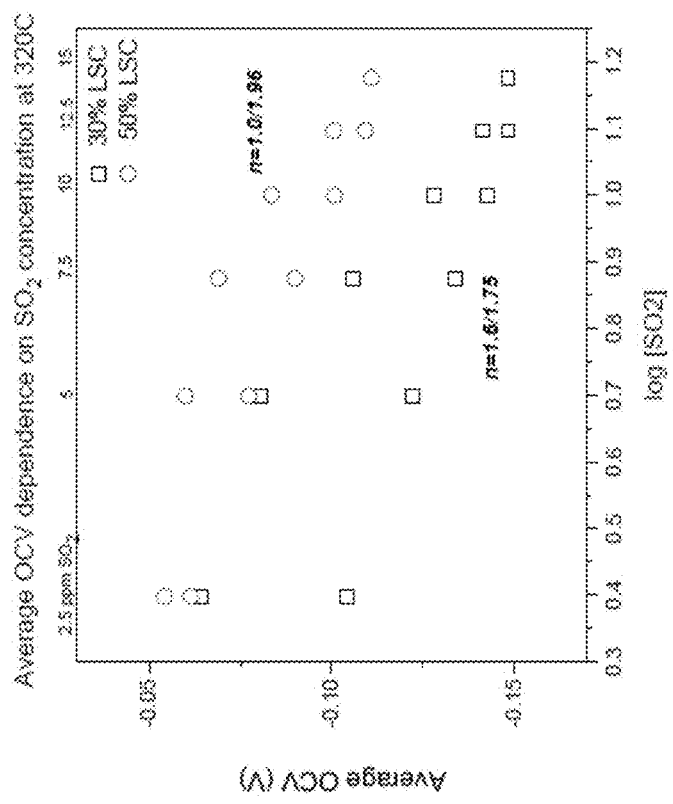

FIG. 19A shows the open circuit voltage response of an $SO_x$ sensor with a sensing electrode with 50% $(La_{0.6}Sr_{0.4})_{0.99}CoO_{3-\delta}$ to $SO_2$ concentration step changes (0-15 ppm) at 320° C.

Figure 19B:
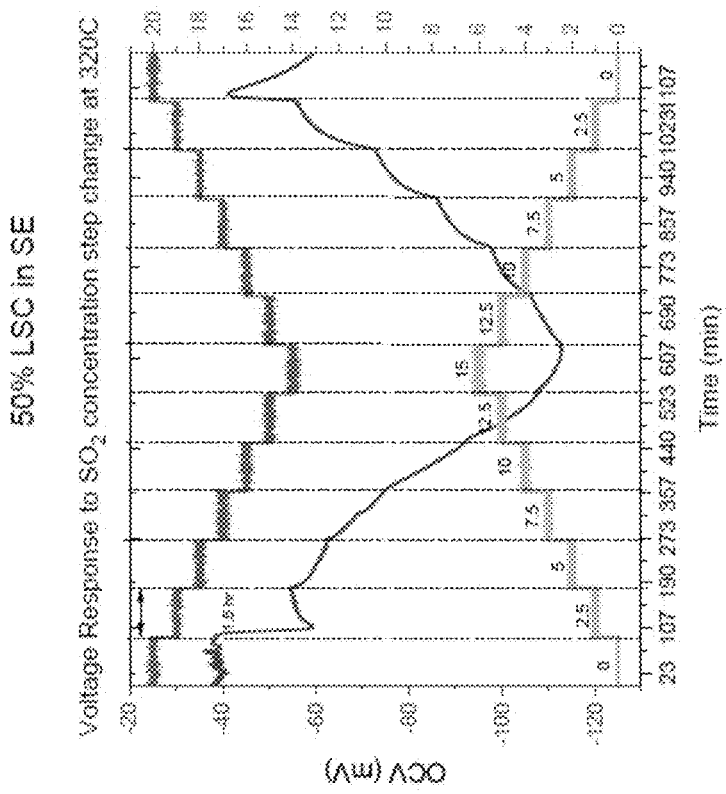

FIG. 19B shows average sensitivity values of $SO_x$ sensors with sensing electrodes with 30% and 50% $(La_{0.6}Sr_{0.4})_{0.99}CoO_{3-\delta}$ to $SO_2$ concentration step changes (0-15 ppm) at 320° C.

Figure 20:
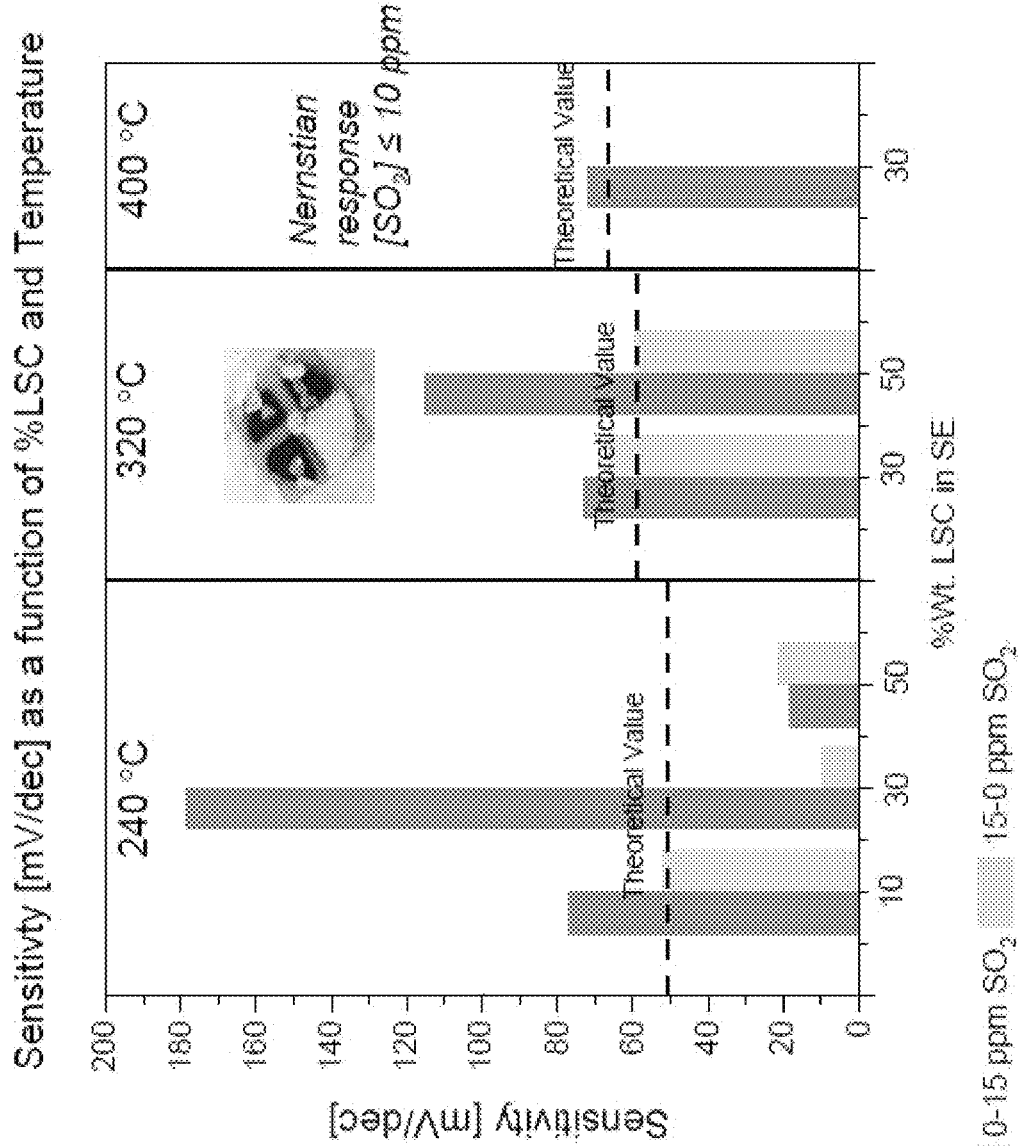

FIG. 20 shows average sensitivity values of $SO_x$ sensors as a function of the amount of $(La_{0.6}Sr_{0.4})_{0.99}CoO_{3-\delta}$ in the sensing electrode.

Figures 21A, 21B:
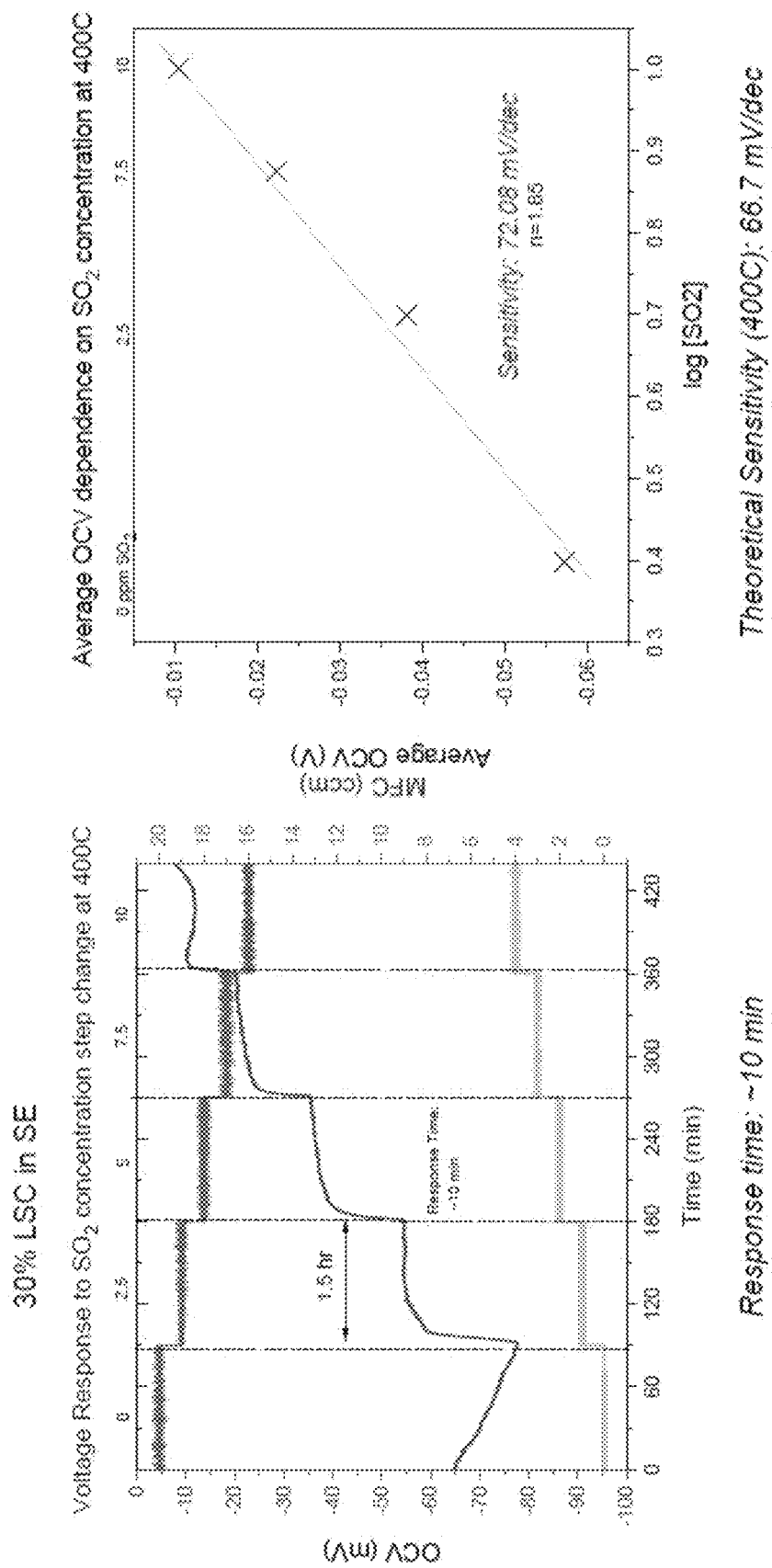

FIG. 21A shows the open circuit voltage response of an $SO_x$ sensor with a sensing electrode with 30% $(La_{0.6}Sr_{0.4})_{0.99}CoO_{3-\delta}$ to $SO_2$ concentration step changes (0-10 ppm) at 400° C.

FIG. 21B shows average sensitivity values from the data in FIG. 21A.

Figure 22:
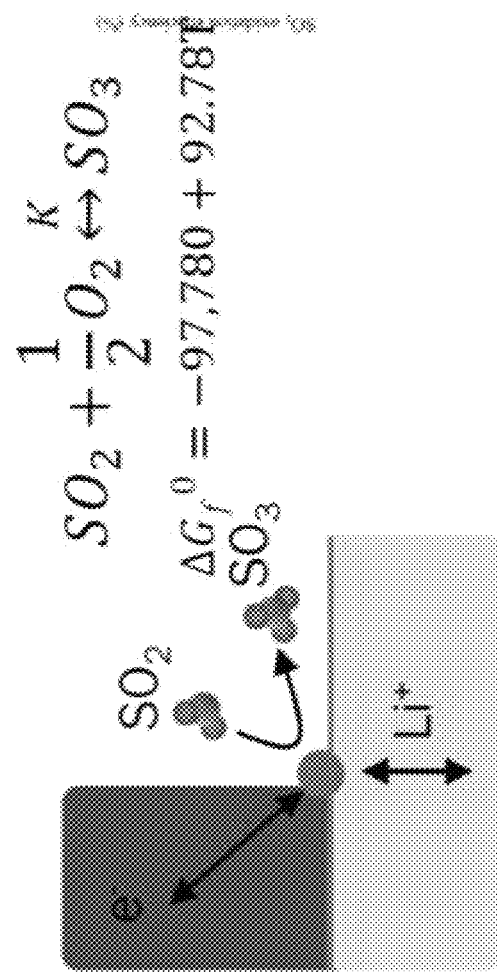

FIG. 22 shows catalyst-assisted $SO_2$ oxidation.

Figure 23A:
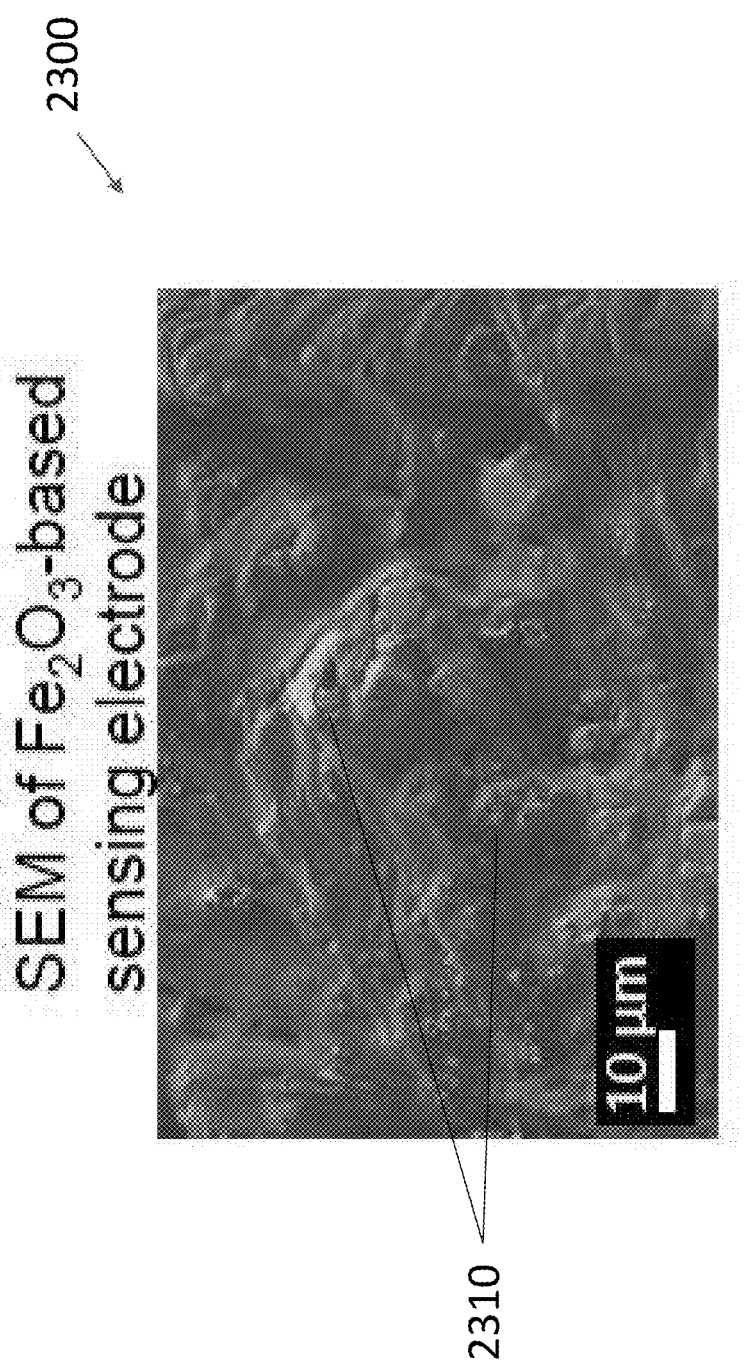

FIG. 23A shows an SEM image of a sensing electrode with 10% $Fe_2O_3$ as a catalyst.

Figure 23B:
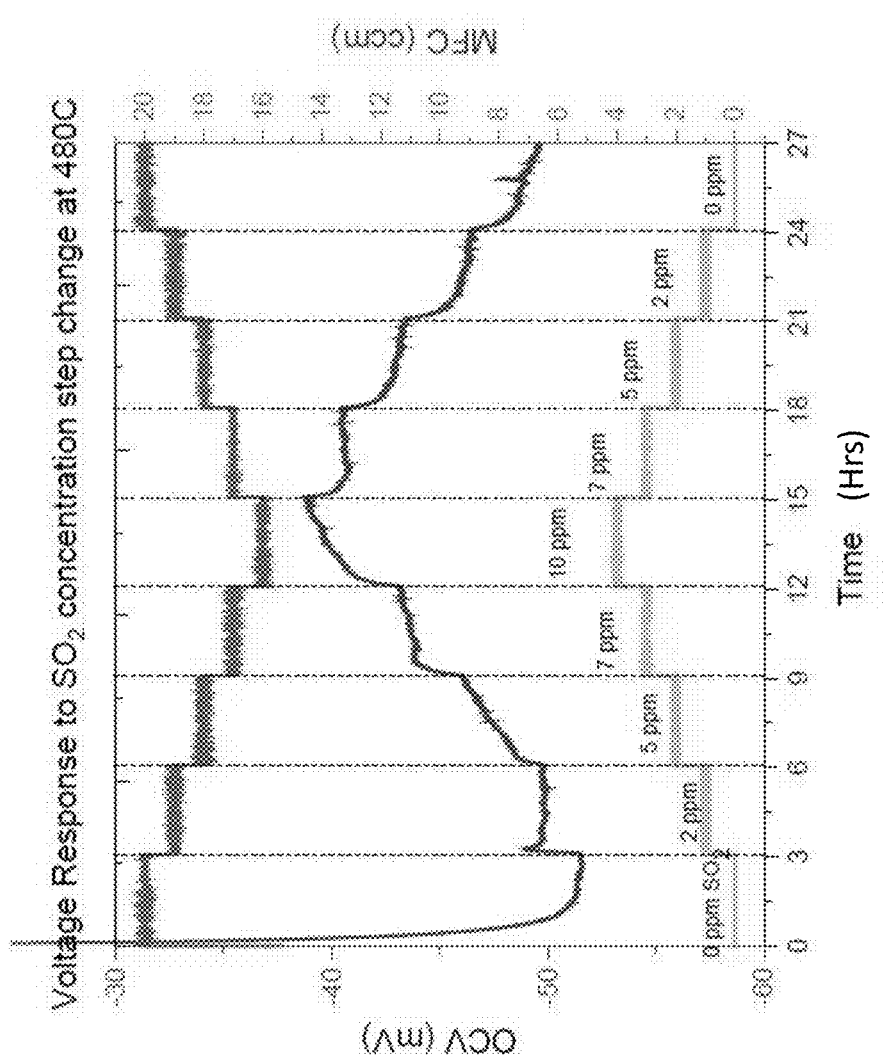

FIG. 23B shows the open circuit voltage response of an $SO_x$ sensor with a sensing electrode with 10% $Fe_2O_3$ to $SO_2$ concentration step changes (0-10 ppm) at 480° C.

Figure 23C:
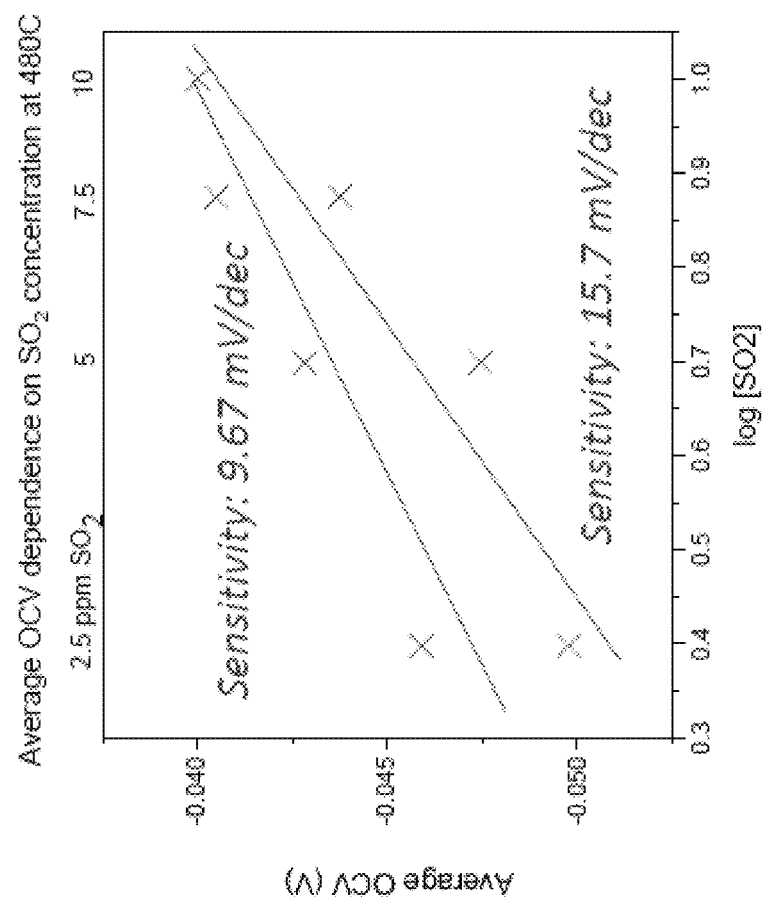

FIG. 23C shows average sensitivity values from the data in FIG. 23B.

Figure 24:
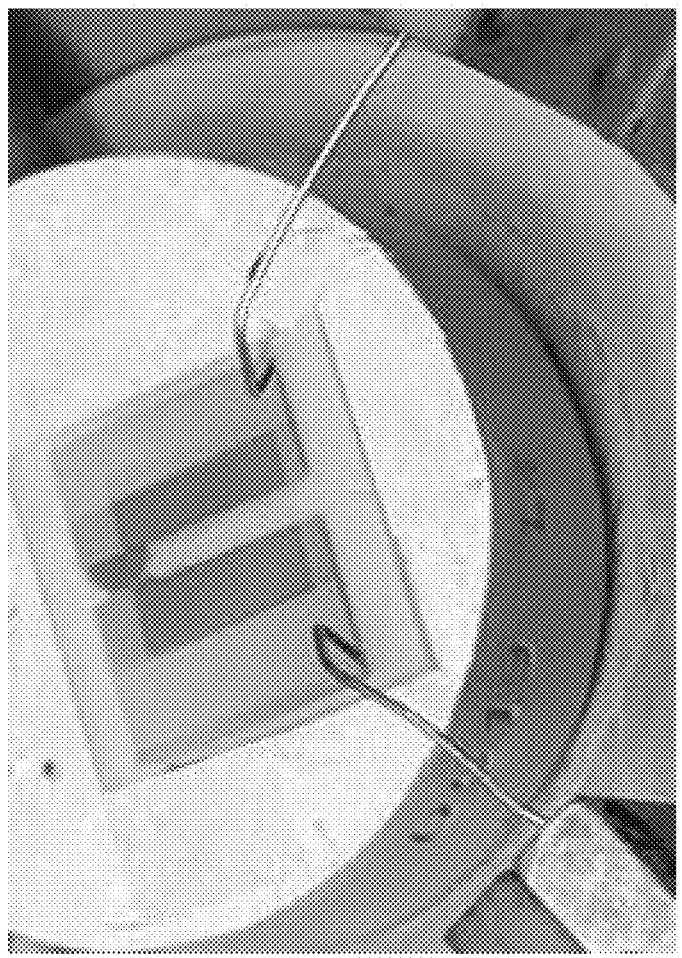

FIG. 24 is a photograph of a thin film electrochemical potentiometric $SO_x$ sensor.

Figures 25A, 25B, 25C, 25D:
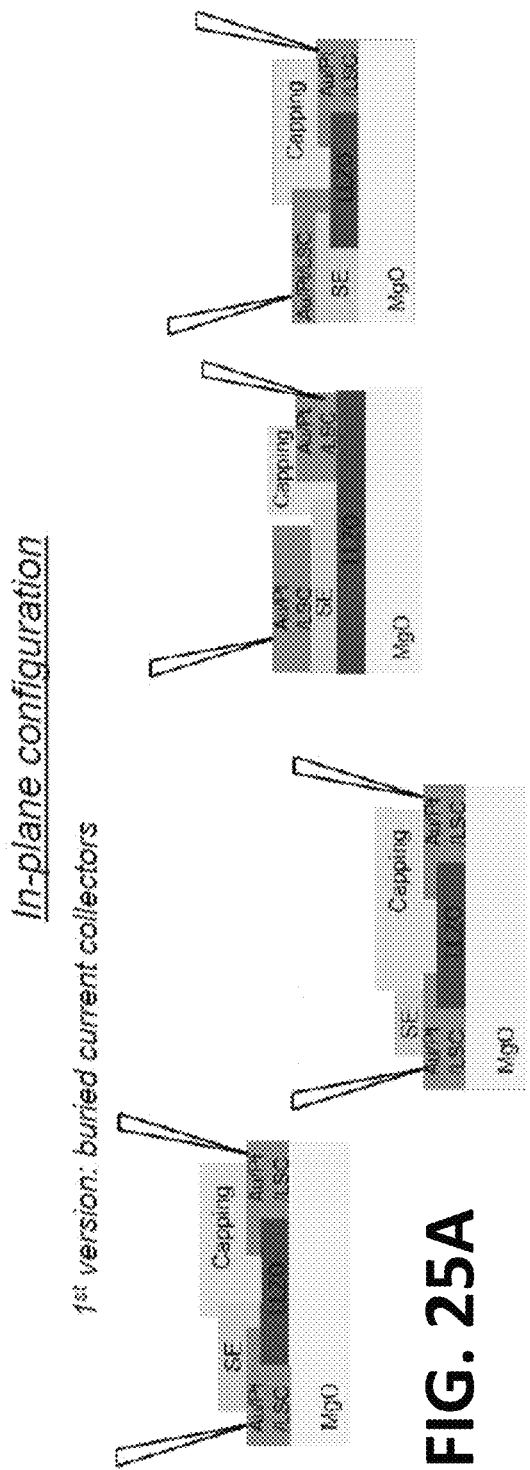

FIG. 25A is a cross-sectional schematic of a thin film electrochemical potentiometric $SO_x$ sensor with an in-plane configuration.

FIG. 25B is a cross-sectional schematic of another thin film electrochemical potentiometric $SO_x$ sensor with an in-plane configuration.

FIG. 25C is a cross-sectional schematic of another thin film electrochemical potentiometric $SO_x$ sensor with an in-plane configuration.

FIG. 25D is a cross-sectional schematic of another thin film electrochemical potentiometric $SO_x$ sensor with an in-plane configuration.

Figure 26:
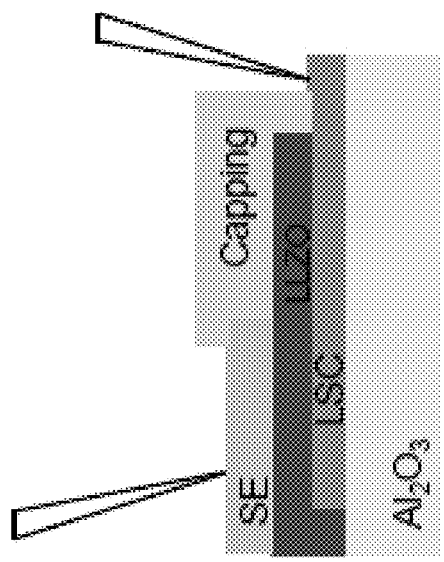

FIG. 26 is a cross-sectional schematic of a thin film electrochemical potentiometric $SO_x$ sensor with a cross-plane configuration.

Figure 27:
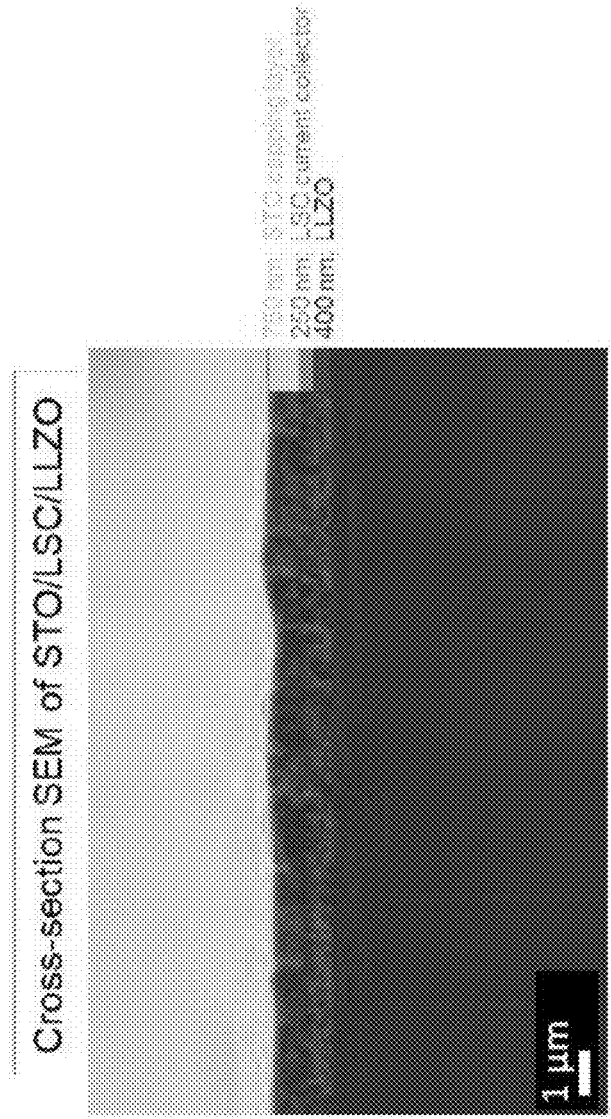

FIG. 27 is a cross-sectional SEM image of part of a thin film $SO_x$ sensor with an in-plane configuration.

Figure 28A:
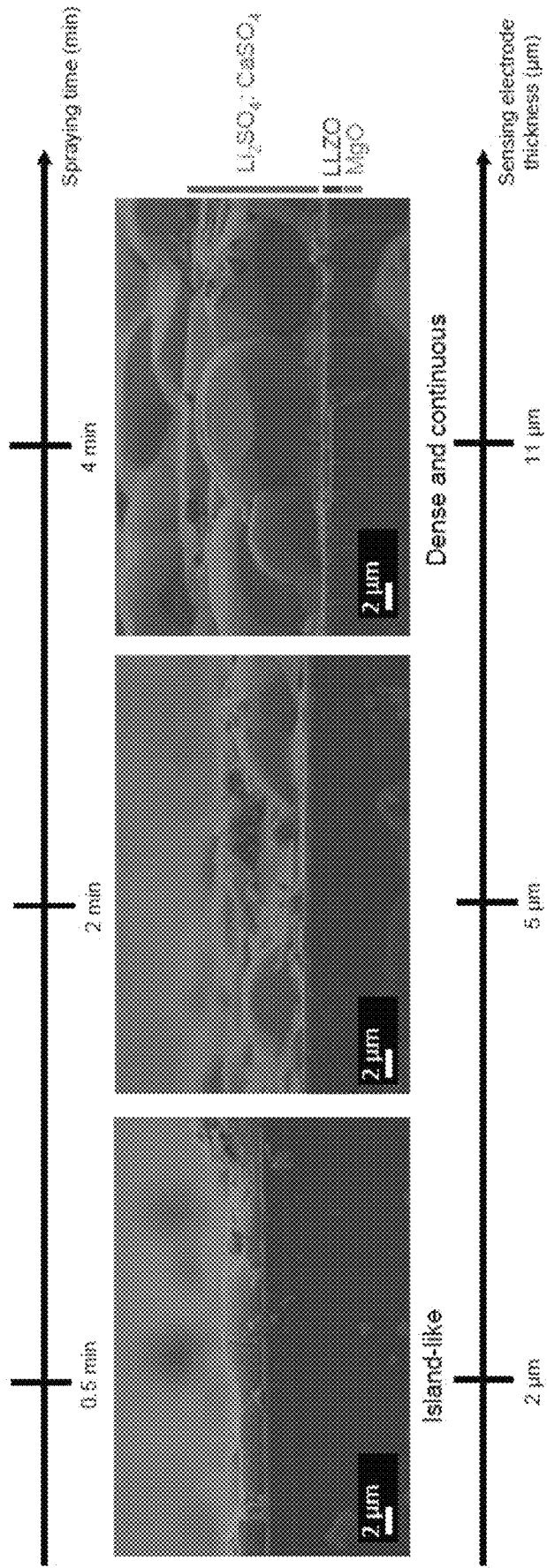

FIG. 28A shows cross-sectional SEM images of sensing electrodes deposited on thin film lithium garnet using spray pyrolysis.

Figures 28B, 28C:
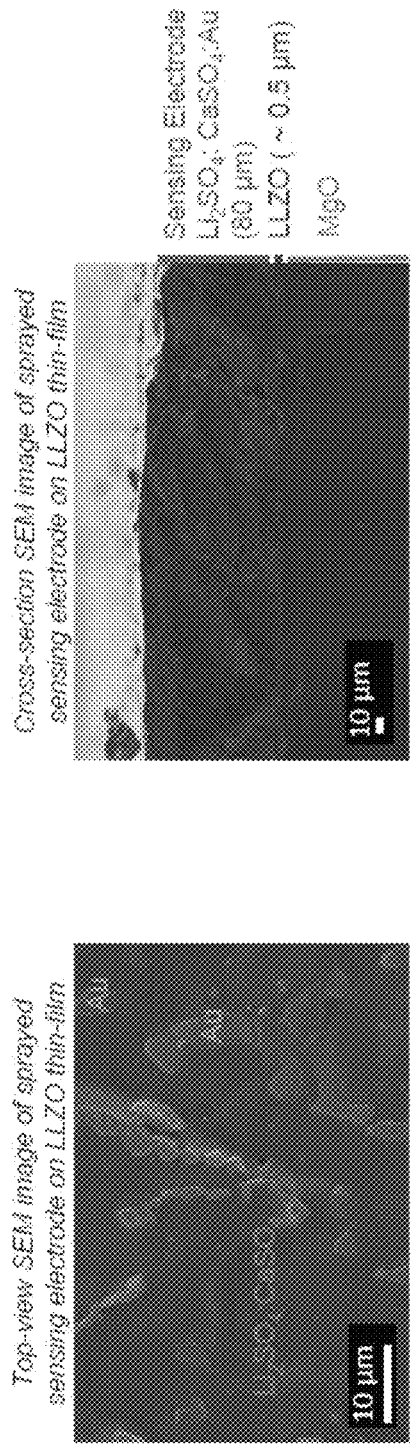

FIG. 28B shows a planar SEM image of a sensing electrode deposited on thin film lithium garnet using spray pyrolysis.

FIG. 28C shows a cross-sectional SEM image of a sensing electrode deposited on thin film lithium garnet using spray pyrolysis.

Figure 29B:
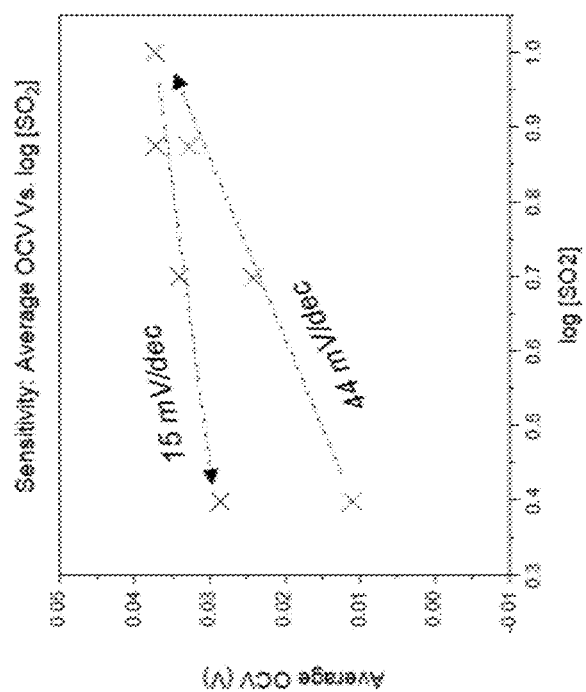
Figure 29A:
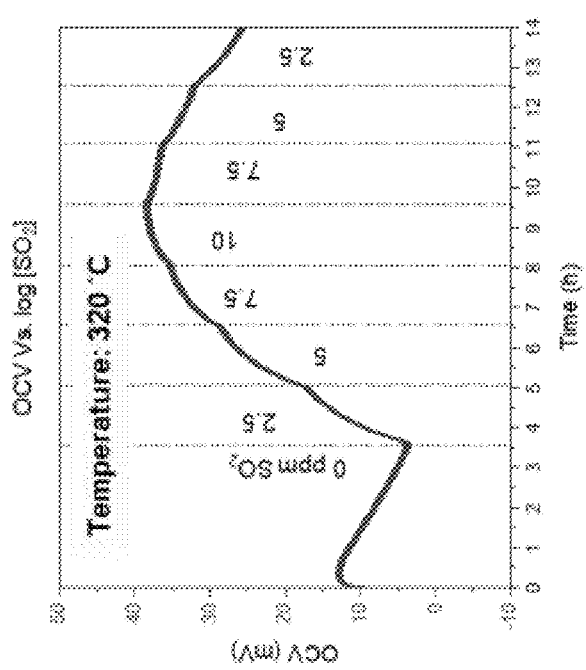

FIG. 29A shows the open circuit voltage response of a thin film $SO_x$ sensor to $SO_2$ concentration step changes (0-10 ppm) at 320° C.

FIG. 29B shows average sensitivity values for the data in FIG. 29A.

Figure 30A:
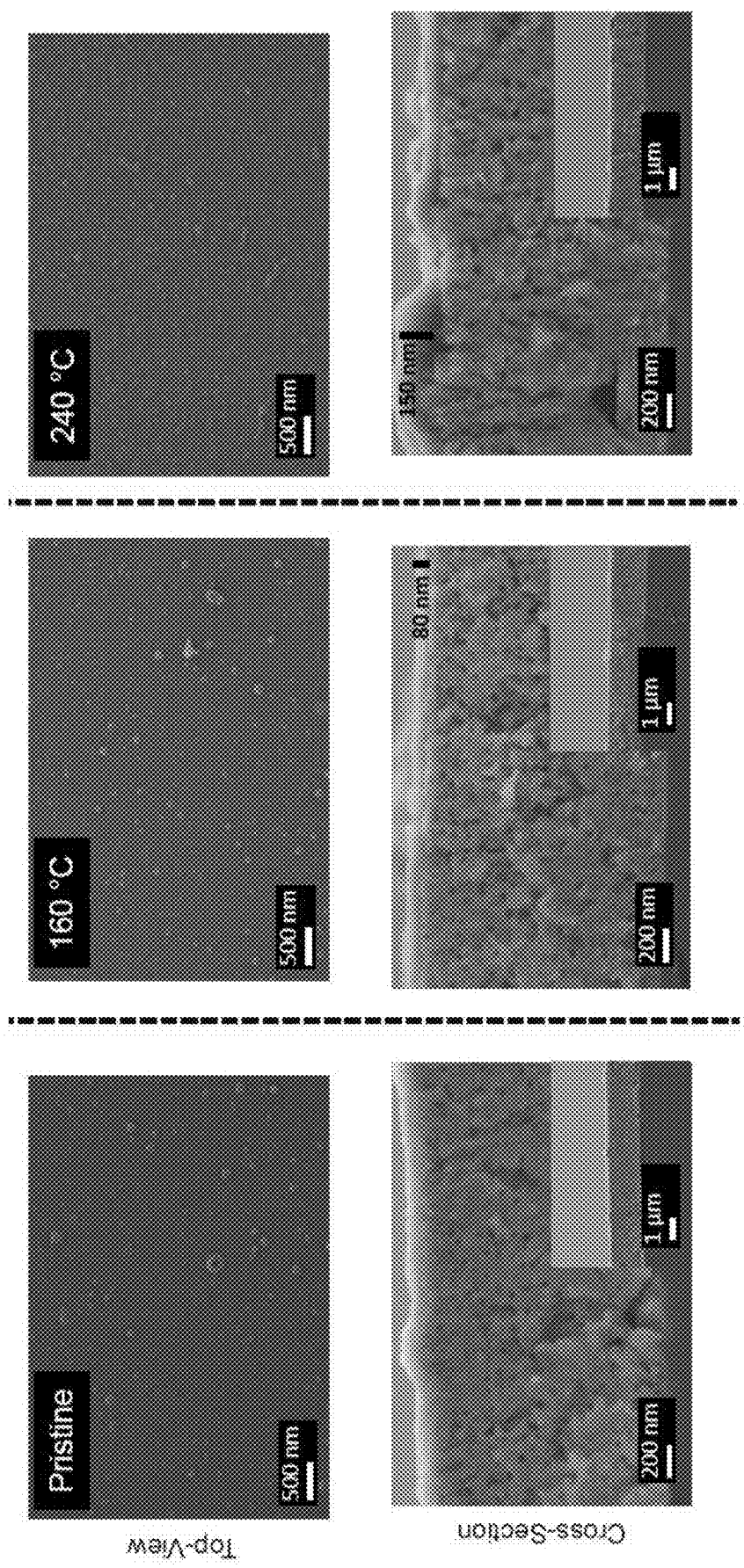

FIG. 30A shows SEM images of thin film lithium garnet exposed to 10 ppm $SO_2$ at different temperatures for 24 hours.

Figure 30B:
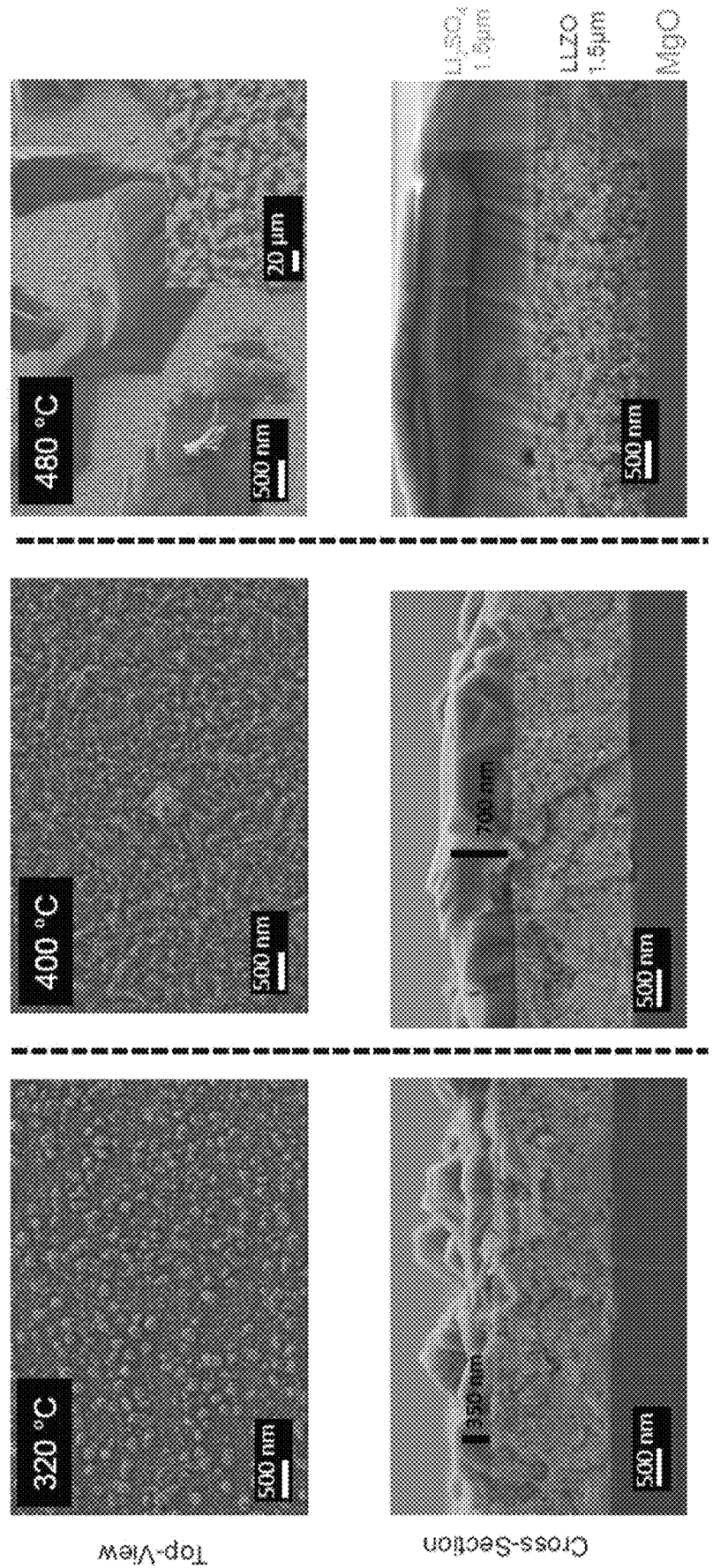

FIG. 30B shows SEM images of thin film lithium garnet exposed to 10 ppm $SO_2$ at different temperatures for 24 hours.

Figure 31:
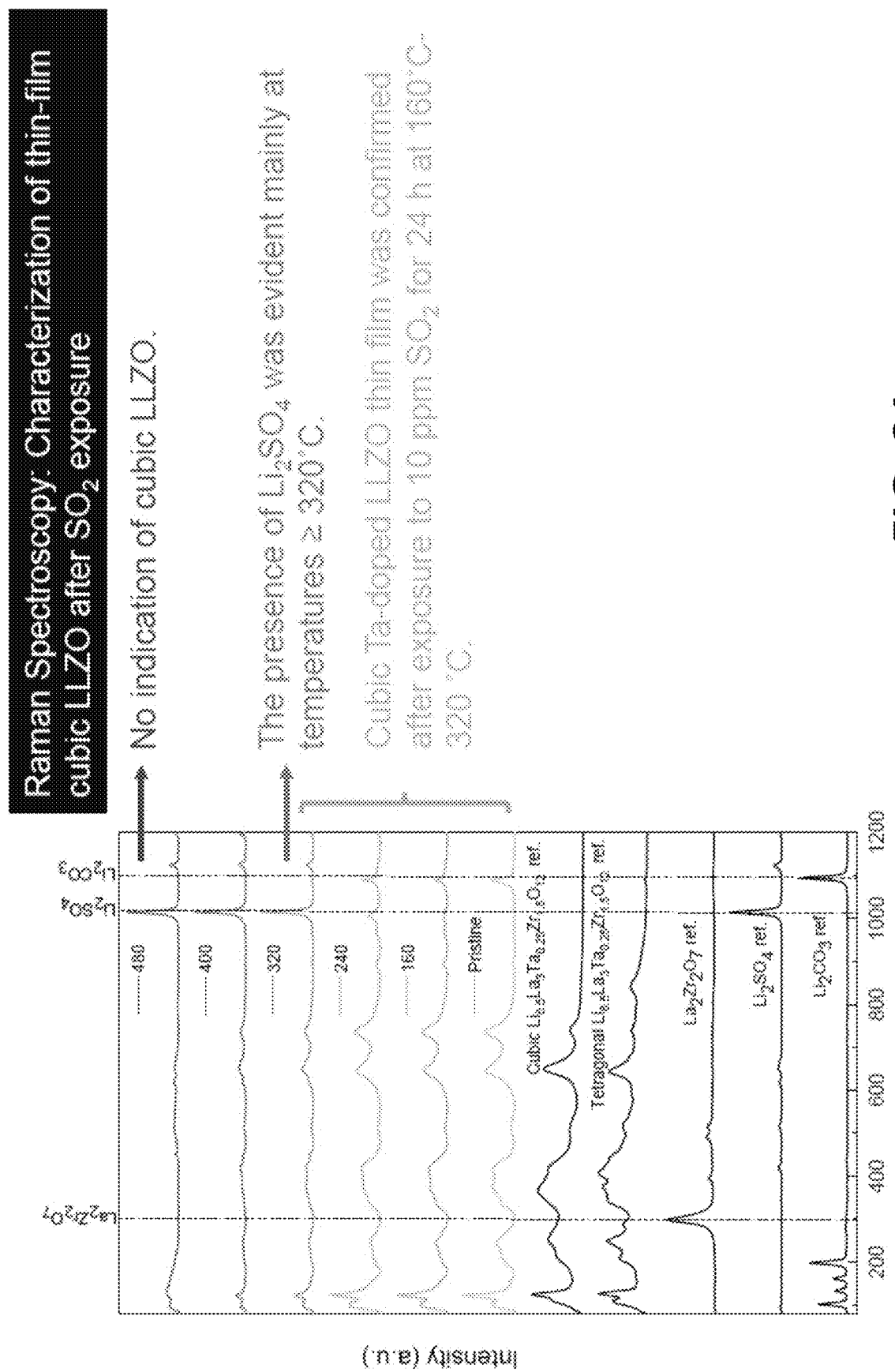

FIG. 31 shows Raman characterization of thin film lithium garnet after $SO_2$ exposure shown in FIGS. 30A and 30B.

Figure 32:
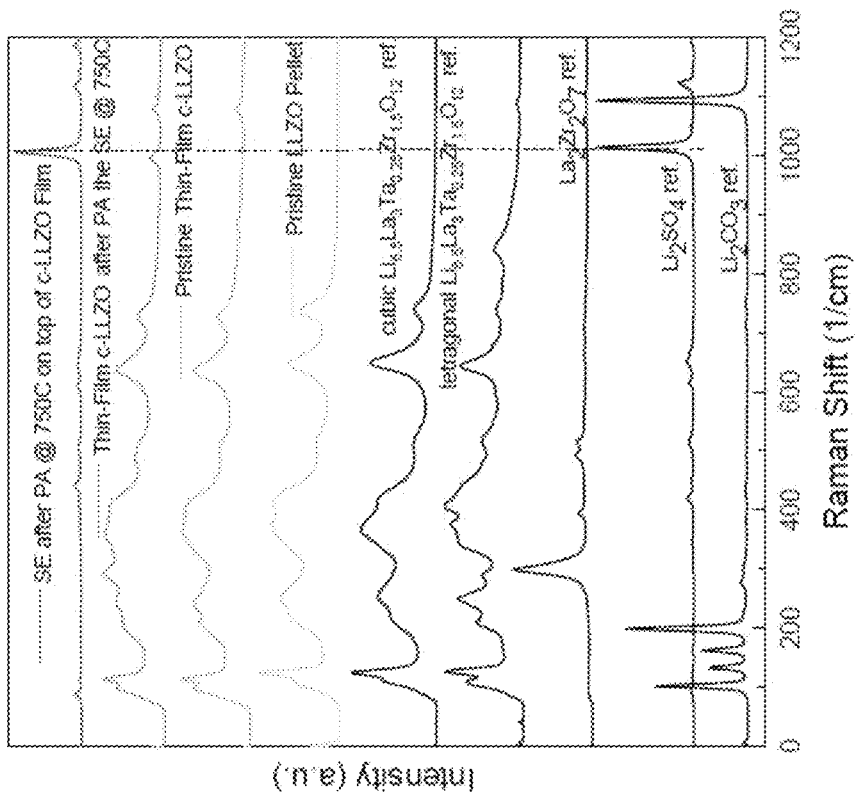

FIG. 32 shows Raman characterization of thin film lithium garnet before and after post-annealing at 750° C.

DETAILED DESCRIPTION

A potentiometric solid-state electrochemical sensor uses a fast-conducting lithium-garnet (e.g., $Li_7La_3Zr_2O_{12}$ or $Li_{6.5}La_3Zr_{1.5}Ta_{0.5}O_{12}$) solid electrolyte, a composite sensing electrode, and a reference electrode to detect sulfur dioxide ($SO_2$) and sulfur trioxide ($SO_3$) (cumulatively, $SO_x$). The composite sensing electrode includes lithium sulfate ($Li_2SO_4$) and at least one other metal sulfate or metal oxide. The sensing electrode may be porous to define a high number of interfacial reaction sites. The Li-garnet-based electrochemical sensor successfully tracked $SO_2$ gas at the dangerous levels of 0 ppm to 10 ppm with a high level of sensitivity and selectivity.

In comparison to resistive gas sensors, which have poor selectivity and high susceptibility to corrosion in acidic gases, potentiometric gas sensors have high selectivity and reduced susceptibility to corrosion. Resistive gas sensors detect changes in electrical resistance based on gas adsorption to the surface of the sensor. The potentiometric gas sensor operates under thermodynamic equilibrium and employs ion-conducting solid electrolyte, Li-garnet, where the conductivity stems from mobile Li+ ions rather than electrons, reducing susceptibility to corrosion and increasing selectivity, even at low operation temperatures. These potentiometric sensors also offer a promising alternative to the inconvenient UV and IR $SO_2$ gas sensors, which have large power demands, high costs, and bulky sizes.

$SO_x$ gas reacts at the electrode/solid electrolyte interface in the potentiometric gas sensor, resulting in an electrical signal that is directly related to the concentration or partial pressure of the $SO_x$ gas species. The output is an electromotive force (emf). The emf of the cell is determined by the chemical potentials established at the sensing ($\mu_{Li}^{SE}$) and reference electrodes ($\mu_{Li}^{RE}$). At thermodynamic equilibrium, the measured voltage across the cell (E) is related to the partial pressure of the detected gas ($p(SO_x)^{SE}$) according to the Nernst equation.

The solid-state potentiometric gas sensor is a type III sensor, where the ion species derived from the tracked gas do not coincide with either the mobile or the immobile ion but, rather, another ion species in the auxiliary sensing electrode. Compared to types I and II, type III potentiometric sensors provide detection of complex gas species using an auxiliary sensing electrode and a fast-ion-conducting solid electrolyte. Ionic conductivity in the solid electrolyte effects the sensor's response and recovery time. This mechanism obviates the need for separate gas environments for the sensing electrode (SE) and the referenced electrode (RE). Conventional type III potentiometric sensors use solid-state electrolytes based on $O^{2-}$ ion conductors (e.g., NASICON), which have low ion mobility so that they are typically operated at high temperatures above 500° C. to ensure sufficient ionic conductivity in the solid electrolyte.

These conventional devices typically have several drawbacks related to stability and transport, including relatively high power usage, sluggish sensor detection and regeneration due to slow diffusion processes and poor ion conductance (e.g., ~$10^{-8}$ S/cm at 300° C.), poor sensor detection and/or response times (typically >~5 min), long recovery times, low electrolyte chemical stability, unstable voltage response, poor reproducibility and poor long-term stability.

Li-garnet has a high room-temperature ionic conductivity (e.g., ~mS cm$^{-1}$ for $Li_7La_3Zr_2O_{12}$ in the cubic phase), high chemical stability towards Li metal (e.g., reduction potential of 0.05 V vs. Li+/Li for $Li_7La_3Zr_2O_{12}$), and a wide electrochemical stability window. Li-garnet also has stable phase and transport properties during prolonged exposure to $SO_x$ gas. The Li-garnet-based potentiometric sensor can operate continuously for several days or weeks.

Figure 1:
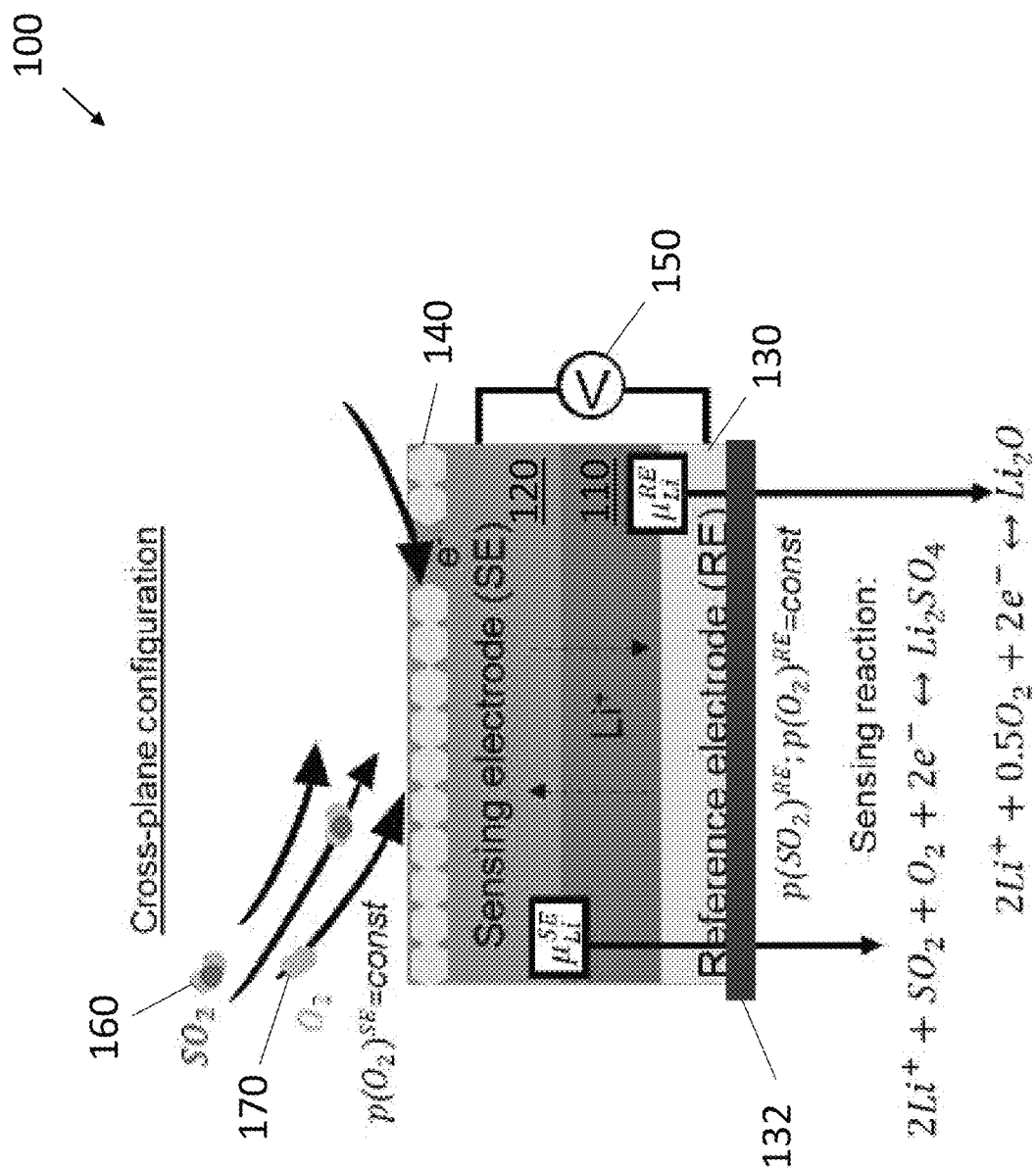
FIG. 1 is a cross-sectional schematic of an electrochemical potentiometric SO$_x$ sensor with a cross-plane configuration.

FIG. 1 shows one embodiment of the potentiometric gas sensor 100. The gas sensor 100 includes a Li-garnet solid electrolyte 110, a sensing electrode 120, and a reference electrode 130. The reference electrode 130 also acts as the counter electrode. In this cross-plane configuration, the sensing electrode 120 and the reference electrode 130 are disposed on opposite sides of the solid electrolyte 110. A current collector 140 is disposed on a surface of the sensing electrode 120 opposite the surface of the sensing electrode 120 disposed on the solid electrolyte 110. A potentiometer 150 is electrically coupled to the current collector 140 and the reference electrode 130 via conductive wires to measure emf across the device 100. $SO_2$ gas 160 and $O_2$ gas 170 interact with the surface of the sensing electrode 120, thereby changing the cell potential.

At the sensing electrode 120, $SO_2$ gas 160 is oxidized with $O_2$ gas 170 according to the following reactions:

$$SO_2 + \frac{1}{2}O_2 \overset{K}{\leftrightarrow} SO_3; \quad [1]$$

$$K = \frac{p[SO_3]}{p[SO_2] \cdot p[O_2]^{0.5}} \quad [2]$$

$$\Delta G_f^0 = -97,780 + 92.78T[K],$$

where K and $\Delta G_f^0$ are the equilibrium constant and the standard Gibbs free energy change in both reactions, respectively. Thermodynamically, the oxidation of $SO_2$ gas 160 is feasible at room temperature and up to 780° C. The overall reaction at the sensing electrode 120 is expressed by, $$2Li^+ + SO_3 + \frac{1}{2}O_2 + 2e^- \leftrightarrow Li_2SO_4. \quad [2]$$

At the reference electrode 130, without being bound by any particular theory, Li+ ions may react primarily with oxygen and not $SO_2$, according to the following equation:

$$2Li^+ + \frac{1}{2}O_2 + 2e^- \leftrightarrow Li_2O. \quad [3]$$

Considering that i) the temperature and the partial pressure of $O_2$ ($p[O_2]$) are generally fixed in an atmospheric environment (0.21 atm) and ii) the activity of $Li_2SO_4$ and $Li_2O$ are kept constant and the concentration of Li+ is assumed to remain unchanged through the measurement, the cell potential (emf), E, is directly related to the partial pressure of $SO_2$ ($p[SO_2]$) according to the Nernst equation:

$$E = E^0 + \frac{RT}{2F}\ln(p[SO_2]), \quad [4]$$

where $E^0$ is a constant (standard potential), F is the Faraday constant, R the gas constant, and T is the absolute temperature.

The gas sensor 100 can operate continuously or intermittently. During operation, the gas sensor 100 is able to detect $SO_x$ concentrations of 0 ppm to 250 ppm. In one embodiment, the gas sensor 100 is able to detect $SO_x$ concentrations of 0 ppm to 10 ppm (e.g., 0.1 ppm, 0.5 ppm, 1 ppm, 2 ppm, 3 ppm, 4 ppm, 5 ppm, 6 ppm, 7 ppm, 8 ppm, 9ppm, or 10 ppm). In another embodiment, the gas sensor 100 is able to detect $SO_x$ gas concentrations of 4 ppm to 250 ppm (e.g., 4 ppm, 8 ppm, 12 ppm, 20 ppm, 50 ppm, 100 ppm, 200 ppm, or 250 ppm). In another embodiment, the gas sensor 100 is configured to detect low $SO_x$ concentrations of 0 ppm to 4 ppm. In another embodiment, the gas sensor 100 is configured to detect medium $SO_x$ concentrations of 4 ppm to 40 ppm. In another embodiment, the gas sensor 100 is configured to detect high $SO_x$ concentrations of 4 ppm to 250 ppm. At high and medium $SO_x$ concentrations, operating parameter (e.g., temperature) and materials are selected to accommodate the highly corrosive environment created by the presence of a substantial concentration of $SO_x$ gas.

Regardless of the $SO_x$ concentration, the gas sensor's components may begin to degrade once the gas sensor 100 is turned on and exposed to atmospheric gases. This degradation may determine a shelf-life of days, weeks, months, or years before the gas sensor 100 is either replaced or regenerated.

When the gas sensor 100 detects $SO_x$ gas in the environment, it has a response time of less than 30 minutes and a recovery time of 60 minutes. The response time is the amount of time between the introduction of the $SO_x$ gas and the sensor response, a change in emf, indicating the presence of the $SO_x$ gas. The recovery time is the amount of time between the removal of the $SO_2$ gas from the environment and when the sensor stops indicating the presence of $SO_x$ gas. The sensor response time may be less than about 15 minutes. Preferably, the sensor response time may be less than 8 minutes. More preferably, the sensor response time may be less than 6 minutes. The sensor recovery time may be about 4 minutes to about 60 minutes. Preferably, the sensor recovery time is less than 24 minutes. More preferably, the sensor recovery time is less than 6 minutes.

The gas sensor 100 is heated by a heating element 132 thermally coupled to the sensing electrode 120. The reference electrode 130 is disposed on the heating element 132 in FIG. 1. In another embodiment, the heating element 132 is positioned along a side of the gas sensor 100 so that it is directly in contact with the solid electrolyte 110 and the sensing electrode 120. In another embodiment, the heating element 132 is positioned so that it is not in direct contact with any components of the gas sensor 100 to provide more even heating. The heating element 132 may have dimensions wider or smaller than the reference electrode 130. The heating element 132 may have a continuous surface or may have a grid shape. The heating element 132 may be a convection heater, an infrared heater, a resistive heater, or a combination thereof. Alternatively, the substrate may be heated via a light source (e.g., a laser) emitting light in a wavelength range (e.g., infrared light). Alternatively, the gas sensor 100 does not include a heating element and the sensing electrode 120 and the solid electrolyte 110 are heated by the environment in which the sensor is placed. For example, the gas sensor 100 may be placed in a combustion exhaust stream that heats the environment to 500° C. to 1000° C. or in an environmental monitoring area that is heated to 150° C. to 400° C.

The heat source (the heating element 132 or environmental heating) is thermally coupled to at least the solid electrolyte 110 and the sensing electrode 120. The solid electrolyte 110 and sensing electrode 120 are heated at a temperature selected based on the $SO_x$ concentration range which the sensor is configured to detect. The temperature selected is one that is hot enough to provide a reasonable sensor response time and not so hot as to accelerate degradation of the gas sensor components. In one embodiment, the gas sensor 100 operates in a temperature range of 200° C. to about 780° C. Preferably, the gas sensor 100 operates with the solid electrolyte and the sensing electrode in a temperature range of 240° C. and 500° C. (e.g., at 240° C., 280° C., 320° C., 360° C., 400° C., 440° C., 480° C., or 500° C.). In another embodiment, the gas sensor 100 is configured to detect low $SO_x$ concentrations (0 ppm to 4 ppm) and the solid electrolyte 110 and the sensing electrode 120 are heated at a temperature of 240° C. to 480° C. In another embodiment, the gas sensor 100 is configured to detect medium $SO_x$ concentrations (4 ppm to 40 ppm) and the solid electrolyte 110 and the sensing electrode 120 are heated to a temperature of 240° C. to 400° C. In another embodiment, the gas sensor 100 is configured to detect high $SO_x$ concentrations (40 ppm to 250 ppm) and the solid electrolyte 110 and the sensing electrode 120 are heated to a temperature of about 240° C.±10° C. At high and medium $SO_x$ concentrations, the gas sensor 100 is operated at lower temperatures to prevent degradation of the Li garnet in the highly corrosive environment created by the presence of a substantial concentration of $SO_x$ gas.

The solid electrolyte 110 is Li garnet. In one embodiment, the Li garnet is $Li_xLa_3Zr_2O_{12}$ (LLZO). In another embodiment, the Li garnet electrolyte includes $Li_xLa_yZr_2O_{12}$ with at least one additional dopant element. The additional dopant may be at least one of tantalum, niobium, aluminum, tungsten, bismuth, antimony, yttrium, samarium, barium, calcium, strontium, tin, hafnium, cerium, tellurium, gallium, or neodymium. The Li garnet may include $Li_{7-x}La_3Zr_{2-x}D_xO_{12}$, where D is the additional dopant and x is about 0.25 to about 0.6. For example, the Li garnet may include $Li_{7-x}La_3Zr_{2-x}Ta_xO_{12}$, where x is about 0.25 to about 0.6. For example, the Li garnet may include $Li_{6.5}La_3Zr_{1.5}Ta_{0.5}O_{12}$. The Li garnet may substantially maintain a cubic garnet structure during operation since this structure has a high ionic conductivity.

The solid electrolyte 110 may have a thickness of about 200 nm to about 1 cm. In one embodiment, the gas sensor has a thin film configuration and the solid electrolyte 110 is about 200 nm to about 1 μm. Preferably, in the thin film configuration, the solid electrolyte 110 is about 400 nm to about 600 nm (e.g., 400 nm, 500 nm, or 600 nm). In another embodiment, the gas sensor has a bulk configuration and the solid electrolyte 110 is about 1 mm to about 5 mm. Preferably, in the bulk configuration, the solid electrolyte 110 is about 2 mm to about 4 mm (e.g., 2 mm, 3 mm, or 4 mm).

The sensing electrode 120 includes lithium sulfate ($Li_2SO_4$) and at least one metal sulfate and/or metal oxide. The other metal sulfate may include at least one of $CaSO_4$, $K_2SO_4$, $Na_2SO_4$, $Bi_2(SO_4)_3$, $Ce(SO_4)_2$, $ZnSO_4$, $Zr(SO_4)_2$, $Fe_2(SO_4)_3$, $Y_2(SO_4)_3$, $La_2(SO_4)_3$, $Ta_2SO_4$, or $BaSO_4$. The metal oxide may include at least one of FeO, $Fe_2O_3$, $Fe_3O_4$, VO, $VO_2$, $V_2O_3$, $V_2O_5$, NiO, ZnO, $CeO_2$, $SnO_2$, $Ga_2O_3$, $WO_3$, $TiO_2$, Pt, $In_2O_3$, or $La_xSm_{1-x}FeO_3$ where x is 0.2-0.8 (e.g., 0.2, 0.4, 0.5, 0.6, or 0.8).

The other metal sulfate may act as a humidity absorbent (e.g., $CaSO_4$). The metal sulfate may also lower the melting temperature of the composite sensing electrode, so that it has fewer defects and grain boundaries, and forms a strongly adhered interface with Li garnet. The metal oxide may act as a catalyst to facilitate the oxidation of $SO_2$ to $SO_3$. The metal oxide may be present in the sensing electrode 120 in a weight percent of about 0% to about 50% (e.g., 10%, 20%, 30%, 40%, or 50%). In one embodiment, the $Li_2SO_4$ and the other metal sulfate are in a mole ratio of about 1:4 to about 9.5:0.5. Preferably, the $Li_2SO_4$ and the other metal sulfate are in a mole ratio corresponding to or near the eutectic point on the phase diagram of the two materials. With a mole ratio close to or at the eutectic point, the sensing electrode has a lower melting temperature, and therefore a lower processing temperature and higher ionic conductivity. The $Li_2SO_4$ and the at least one metal sulfate and/or metal oxide are substantially homogenously mixed in the electrode. In some cases, the sensing electrode includes at least one of Li garnet or $(La_{0.6}Sr_{0.4})_{0.99}CoO_{3-\delta}$ to increase ionic conductivity. The Li garnet or $(La_{0.6}Sr_{0.4})_{0.99}CoO_{3-\delta}$ may be present in the sensing electrode in a weight percent of about 0% to about 50% (e.g., 10%, 20%, 30%, 40%, or 50%). In some cases, the sensing electrode includes an electronic conductor (e.g., gold, platinum, and/or $(La_{0.6}Sr_{0.4})_{0.99}CoO_{3-\delta}$) to increase electronic conductivity in the electrode.

In some cases, the sensing electrode 120 has a dense (e.g., about >85%) morphology, which limits the reaction surface area and forms a triple phase boundary (as described below) where electrochemical sensing reactions occur. The lower surface area decreases the gas sensor's sensitivity but increases its lifetime when exposed to high temperatures and/or high concentrations of $SO_x$ gas. Therefore, the dense morphology is preferably for sensing $SO_x$ gas at medium and high concentrations of $SO_x$ or for operation at higher temperatures (>500° C.). Alternatively, the sensing electrode may have a microporous structure, which increases the surface area and creates a quadrupole phase boundary where electrochemical sensing reactions occur. The higher surface area increases the gas sensor's sensitivity but decreases its lifetime when exposed to high temperatures and/or high concentrations of $SO_x$ gas. Therefore, the microporous morphology is preferable for sensing $SO_x$ gas at low concentrations of $SO_x$ gas, at lower operating temperatures, and/or where fast sensing times are desired.

The reference electrode 130 includes at least one electrically conductive material. The reference electrode 130 includes at least one of $(La_{0.6}Sr_{0.4})_{0.99}CoO_{3-\delta}$, gold, or platinum. The reference electrode 130 has a thickness of about 10 µm to about 500 µm (e.g., 10 µm, 20 µm, 50 µm, 100 µm, 200 µm, or 500 µm). The reference electrode 130 may be capped with an inorganic capping layer to prevent the reference electrode from interacting with atmospheric gases.

The current collector 140 includes at least one electrically conductive material. The current collector 140 includes at least one of $(La_{0.6}Sr_{0.4})_{0.99}CoO_{3-\delta}$, gold, or platinum. The current collector 140 may include the same material as the reference electrode 130 for ease of sensor assembly. The current collector 140 may be applied to the sensing electrode 120 in the form of an electrically conductive paste. In one embodiment, wires electrically coupling the current collector 140 and reference electrode 130 to a potentiometer may be adhered to the current collector 140 and the reference electrode 130 with the same electrically conductive paste.

Figure 2A:
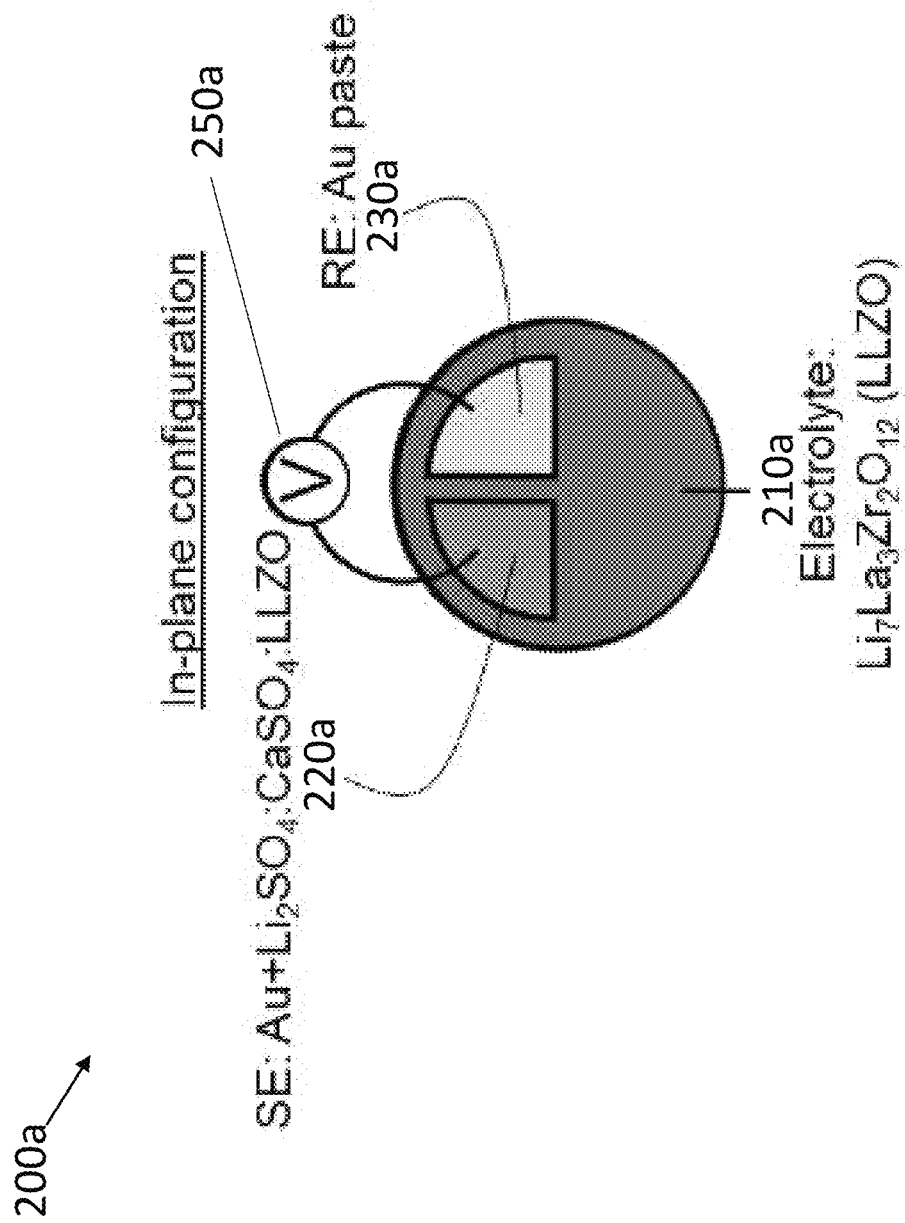
FIG. 2A is a planar schematic of an electrochemical potentiometric SO$_x$ sensor with an in-plane configuration.

FIG. 2A shows another embodiment of the potentiometric gas sensor 200a. The gas sensor 200a includes a Li-garnet solid electrolyte 210a, a sensing electrode 220a, and a reference electrode 230a. The reference electrode 230a also acts as the counter electrode. This gas sensor 200a has an in-plane configuration, where the sensing electrode 220a and the reference electrode 230a are disposed on the same surface of the solid electrolyte 210a. A potentiometer 250a is electrically coupled to the sensing electrode 220a and the reference electrode 230a via conductive wires to measure emf across the device 200a, corresponding to a concentration of $SO_x$. The gas sensor 200a uses the same materials as described for gas sensor 100. Any of the sensing electrode materials and configurations described below may be used with the in-plane sensor geometry. The in-plane geometry of the gas sensor 200a may be preferred for ease of manufacturing the sensor.

Figure 2B:
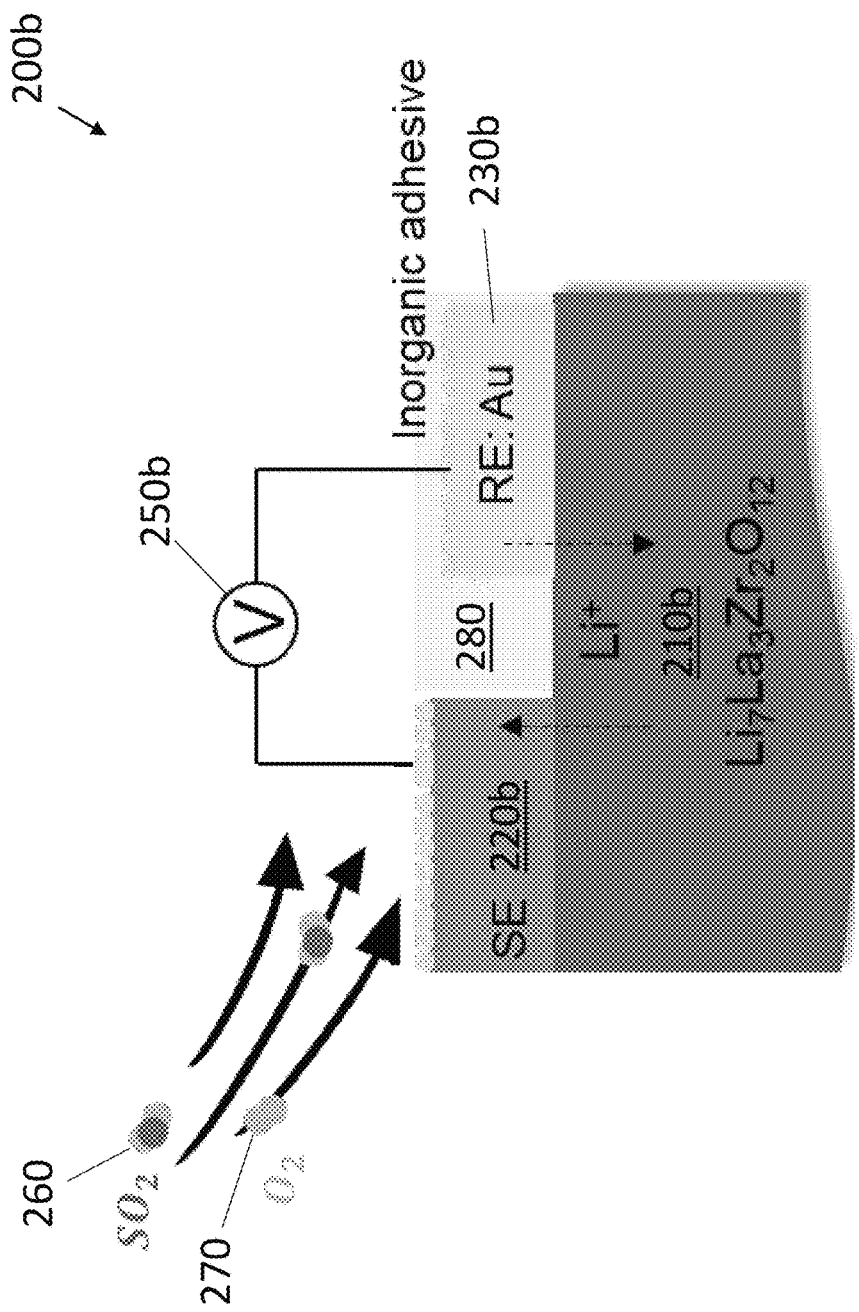
FIG. 2B is a cross-sectional schematic of the SO$_x$ sensor in FIG. 2A.

FIG. 2B shows another view of the in-plane configuration gas sensor 200b shown in FIG. 2A. The gas sensor 200b includes a Li-garnet solid electrolyte 210b, a sensing electrode 220b, and a reference electrode 230b. The reference electrode 230b also acts as the counter electrode. This gas sensor 200b has an in-plane configuration, where the sensing electrode 220b and the reference electrode 230b are disposed on the same surface of the solid electrolyte 210b. A potentiometer 250b is electrically coupled to the sensing electrode 220b and the reference electrode 230b via conductive wires to measure emf across the device 200b, corresponding to a concentration of $SO_x$. $SO_2$ gas 260 and $O_2$ gas 270 interact with the surface of the sensing electrode 220b, thereby changing the cell potential of the gas sensor 200b. An inorganic adhesive coating 280 is disposed on the surfaces of the solid electrolyte 210b or the reference electrode 230b so that $SO_2$ gas 260 and $O_2$ gas 270 substantially do not interact with their surfaces, where the gases could degrade the materials in these components and cause measurement errors.

Figure 3A:
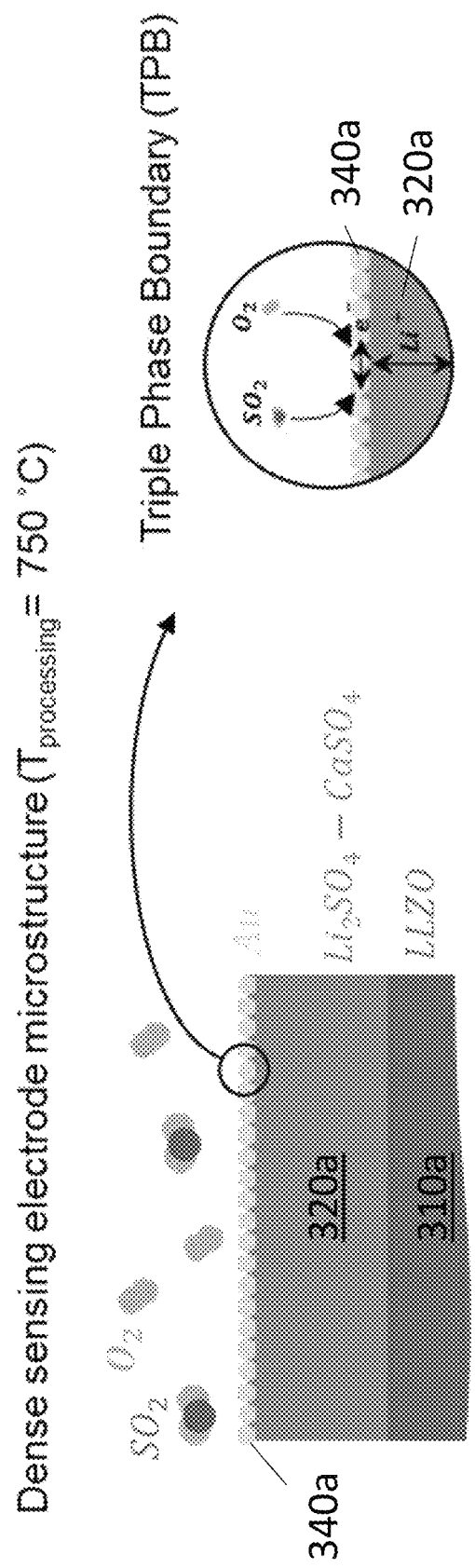
FIG. 3A is a cross-sectional schematic of a dense sensing electrode and the triple phase boundary of the dense sensing electrode.
Figures 3D, 3E, 3F:
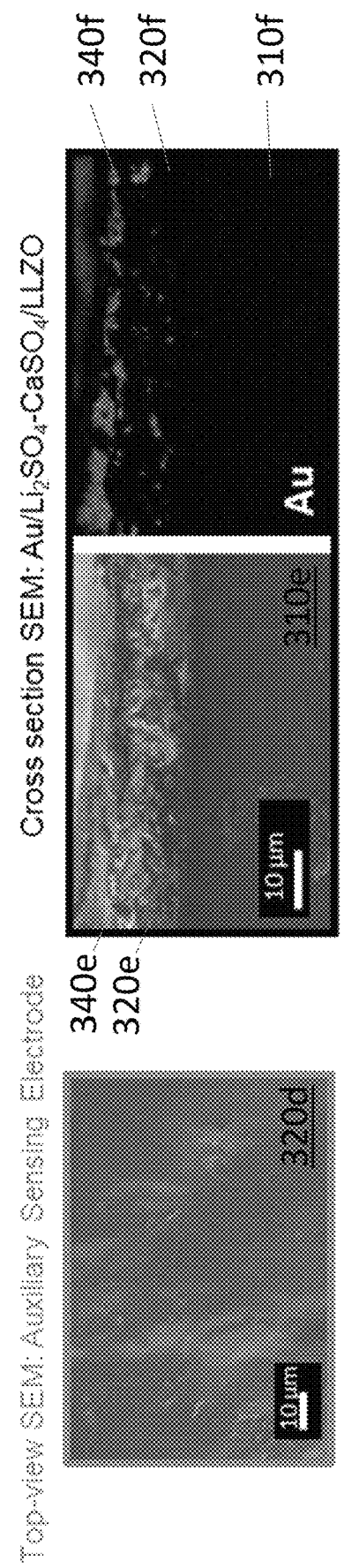
FIG. 3D is a planar SEM image of the dense sensing electrode in FIG. 3A.
FIG. 3E is a cross-sectional SEM image of the dense sensing electrode in FIG. 3A.
FIG. 3F shows a gold elemental analysis of the SEM image in FIG. 3F.

FIG. 3A shows a dense sensing electrode 320 disposed on a solid electrolyte 310 with a current collector 340 disposed on top of the sensing electrode 320. The dense sensing electrode 320 has a density of about 85%-95%. The dense sensing electrode forms a triple phase boundary (TPB) reaction zone between the gaseous species, the current collector 340, and the sensing electrode 320 at which the electrochemical sensing reactions occur. Gaseous $SO_2$ and $O_2$ react in the reaction zone. The current collector 340 conducts electrons and the sensing electrode 320 conducts $Li^+$ ions from the sold electrolyte to the reaction zone where they participate in the electrochemical sensing reactions. FIGS. 3B-3F show different SEM images of the dense sensing electrode shown in FIG. 3A. The SEM images indicated that the sensing electrode is substantially homogeneous and dense, with little porosity. The current collector material 340 in the example shown in FIGS. 3B-3F includes gold particles. FIG. 3F shows an EDS SEM image with gold chemical mapping showing the location of gold in the gas sensor. FIG. 3F shows gold was located at the surface of the sensing electrode 320.

Figure 4A:
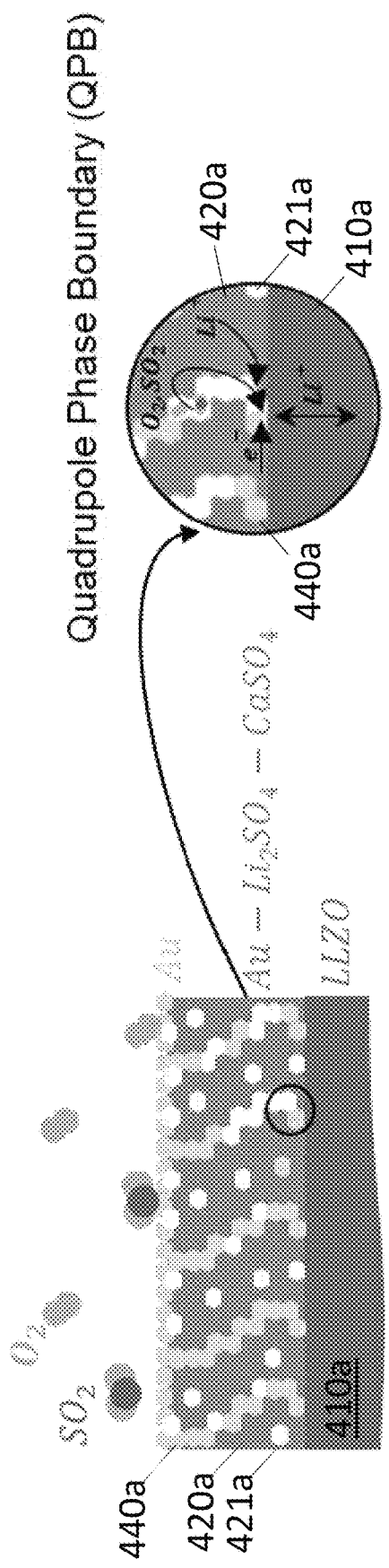
FIG. 4A is a cross-sectional schematic of a porous sensing electrode and the quadrupole phase boundary of the porous sensing electrode.

FIG. 4A shows a porous sensing electrode 420 disposed on a solid electrolyte 410. A current collector 440 is disposed on top of the sensing electrode 420 and is mixed into the sensing electrode matrix. The porous sensing electrode forms a quadrupole phase boundary (QPB) reaction zone between the gaseous species, the current collector 340, the sensing electrode 320, and the solid electrolyte 410 at which the electrochemical sensing reactions occur. The porous sensing electrode 420 provided a larger effective surface area for electrochemical reaction, favorable diffusion of $SO_2$ into the porous sensing electrode structure, and greater $SO_x$ sensitivity. However, the porous structure may also provide the opportunity for additional degradation reactions between the solid electrolyte and the sensing electrode, which decrease the overall lifetime of the gas sensor. As described in greater detail below, the dense or porous sensing electrode structure can be chosen by changing processing temperatures during device fabrication. FIGS. 4B-4D show SEM images of the porous sensing electrode microstructure. As shown in the images, the sensing electrode has a large number of pores on the micrometer-scale. SEM EDS gold mapping in FIG. 4D shows that gold particles are dispersed throughout the electrode.

Figure 5A:
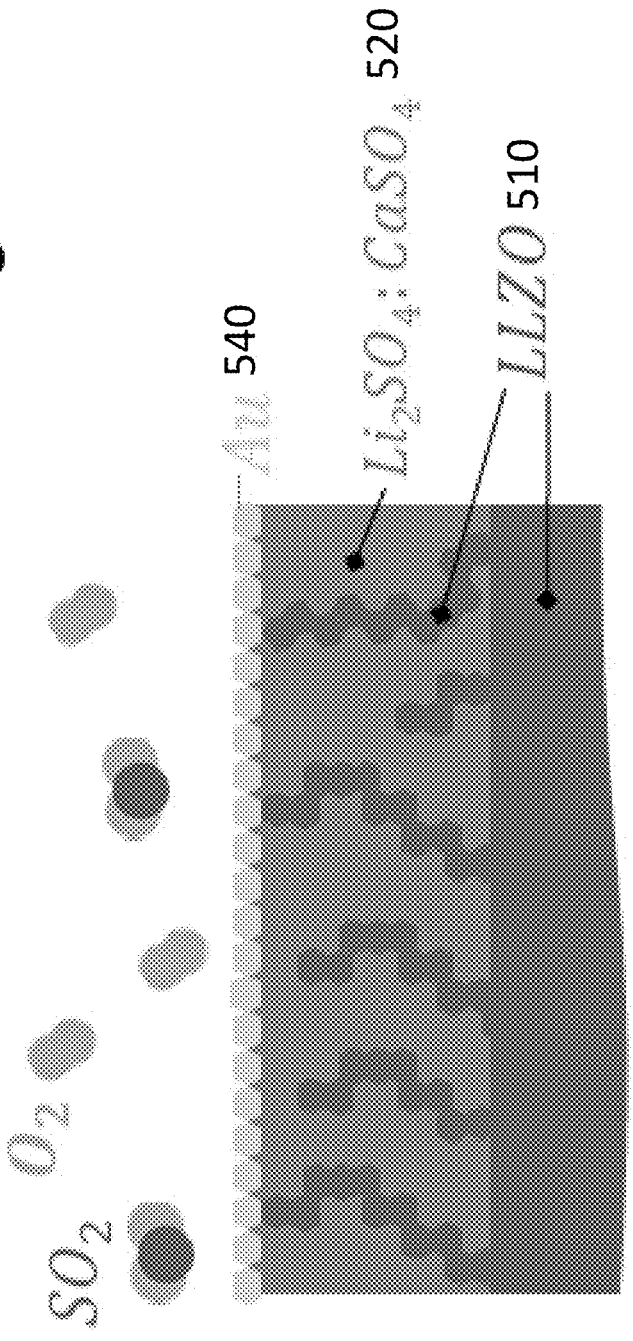
FIG. 5A is a cross-sectional schematic of a dense sensing electrode with a lithium garnet scaffold.
Figure 5B:
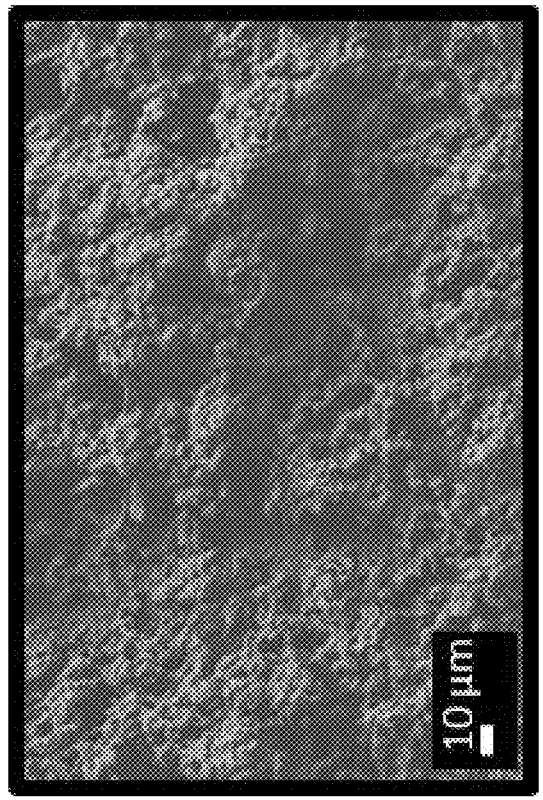
FIG. 5B is a planar SEM image of the dense sensing electrode of FIG. 5A.

FIG. 5A shows a sensing electrode 520 that includes a porous Li garnet scaffold. The sensing electrode 520 is sandwiched between the solid electrolyte 510 disposed on one surface of the sensing electrode 520 and the current collector 540 disposed on an opposite surface of the sensing electrode 520. Adding Li garnet to the sensing electrode 520 provides improved ionic conductivity, and shorter sensor response and recovery times. The randomly connected Li garnet scaffold creates percolation pathways for improved $Li^+$ ion conductivity through the sensing electrode 520. This configuration shortens the $Li^+$ ion diffusion distance from the sensing electrode 520 to the Li garnet solid electrolyte 510. This configuration also provides a stable interface between the sensing electrode 520 and the solid electrolyte 510. FIG. 5B shows a top-down image of the surface of the sensing electrode 520.

Figure 6A:
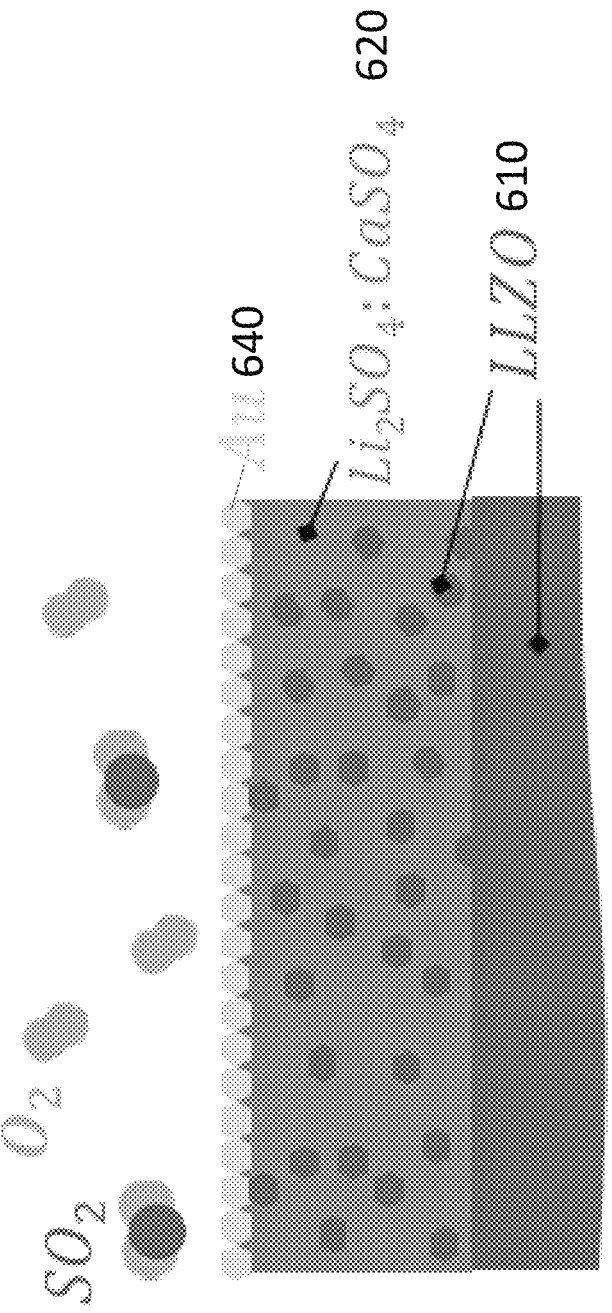
FIG. 6A is a cross-sectional schematic of a dense sensing electrode with a lithium sulfate, calcium sulfate, and lithium garnet composite.
Figure 6B:
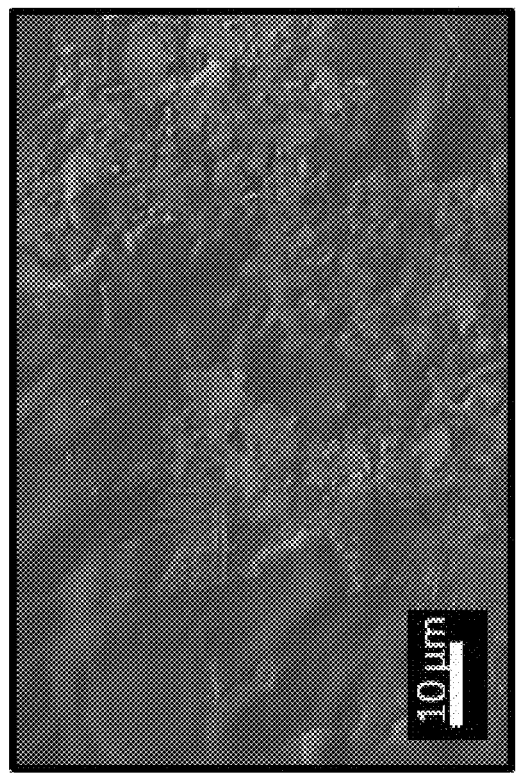
FIG. 6B is a planar SEM image of the dense sensing electrode of FIG. 6A.

FIG. 6A shows a sensing electrode 620 that includes a composite of $Li_2SO_4$ and Li garnet. The sensing electrode 620 is dense with Li garnet distributed more homogeneously in the sensing electrode. The sensing electrode 620 is sandwiched between a solid electrolyte 610 and a current collector 640. The composite sensing electrode 620 provided similar benefits to the Li garnet scaffold shown in FIG. 5A, with shorter $Li^+$ ion diffusion lengths, improved ionic conductivity, and shorter sensor response and recovery times. FIG. 6B shows a top-down image of the surface of the sensing electrode 620.

Figure 7:
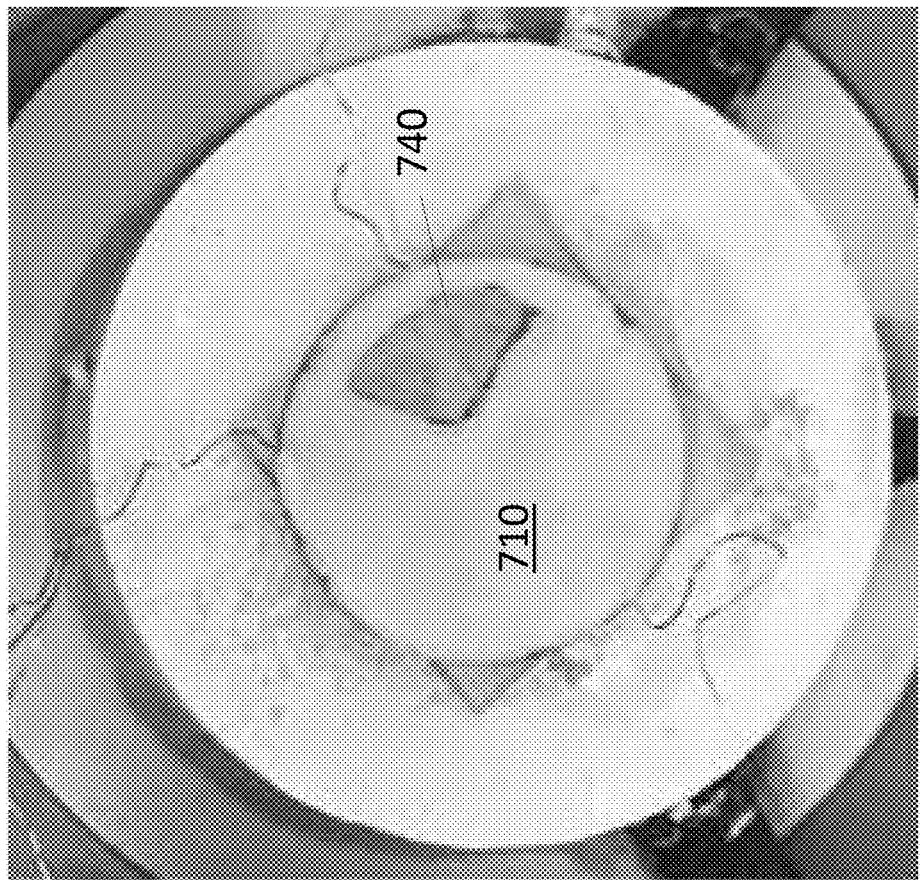
FIG. 7 is a photograph of an electrochemical potentiometric SO$_x$ sensor with an in-plane configuration.

FIG. 7 shows a photograph of a cross-plane configuration potentiometric gas sensor 700. FIG. 7 shows a gold current collector 740 disposed on top of a sensing electrode (not shown), all on top of a Li garnet solid electrolyte 710. Conductive wires (e.g., any solid conductive metal) electrically connect the current collector 740 and the reference electrode (not shown) to a potentiometer.

EXAMPLES

The $SO_2$ sensor was composed of the following electrochemical cell, expressed as:

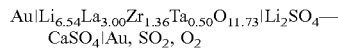
$Au|Li_{6.54}La_{3.00}Zr_{1.36}Ta_{0.50}O_{11.73}|Li_2SO_4$—$CaSO_4|Au, SO_2, O_2$ where gold (Au) is the reference electrode, $Li_{6.54}La_{3.00}Zr_{1.36}Ta_{0.50}O_{11.73}$ is the solid electrolyte and $Li_2SO_4$—$CaSO_4$ represents the binary compound of the auxiliary sensing electrode. When the cell is heated up to a stable thermal condition (a certain temperature), mobile $Li^+$ ions in the sensing electrode and the solid electrolyte participate in the electrochemical reaction and the cell reaction may come into an equilibrium state. In this case, the emf of the sensor was measured and converted to $SO_2$ concentrations.

Sensing Electrode Microstructure and the $SO_2$ Sensor Voltage Response

The $SO_2$ sensor operation was investigated in terms of its performance characteristics employing a dense sensing electrode microstructure, like that shown in FIG. 3A. The $SO_2$ concentration was varied from 0 ppm to 10 ppm and back to 0 ppm with 2.5 ppm step changes in dry synthetic air. Electromotive force (emf) values were recorded and converted to $SO_2$ concentrations to determine detection sensitivity, response time, and recovery time. Response and recovery times were defined as the time the sensor used to reach 90% of the steady final signal and the time the sensor takes to return to 10% of the steady signal, respectively.

Figure 8B:
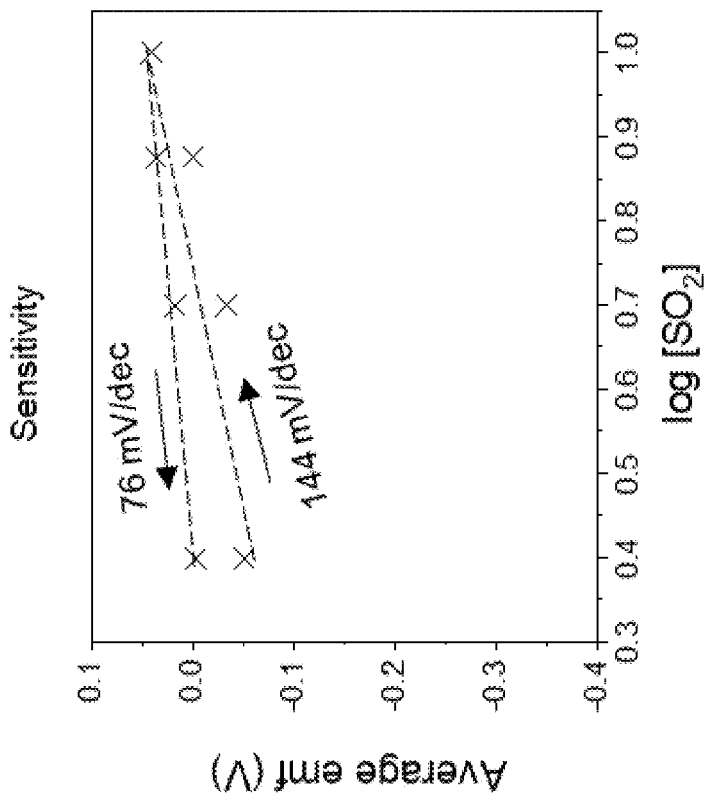
FIG. 8B shows average emf responses from the data in FIG. 8A.
Figure 8A:
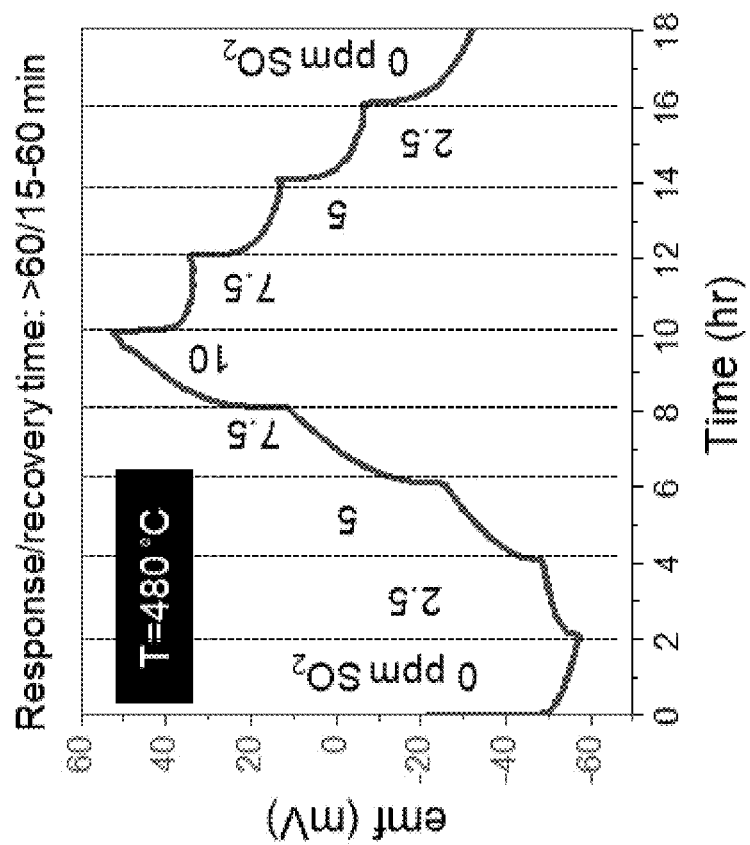
FIG. 8A shows emf response of an SO$_x$ sensor with the dense auxiliary sensing electrode of FIG. 3A to SO$_2$ concentration step changes (0-10 ppm) at 480° C.

FIGS. 8A-8B shows the emf response of the electrochemical cell to $SO_2$ concentration steps at 480° C. During the concentration step change of $SO_2$ from 0 to 10 ppm, the emf voltage response indicated a difference in the chemical potentials of $Li^+$ ions in the Li garnet solid electrolyte at the interfaces with the sensing and reference electrode, respectively. Moreover, the initial negative polarity in the presence of synthetic air or low $SO_2$ concentrations indicated an accumulation of $Li^+$ ions at the reference electrode and the depletion of $Li^+$ ions at the sensing electrode. The transfer of $Li^+$ ions is accompanied by the occurrence of reaction [2] described above from right to left at the sensing electrode interface, and reaction [3] from left to right at the Au reference electrode. Increasing the $SO_2$ concentration further, induces the reverse transfer of $Li^+$ ions from the reference to the sensing electrode and the opposite occurrence of reactions [2] and [3]. The average emf values and the logarithm of the $SO_2$ gas concentration was fitted by the Nernst equation to evaluate the sensitivity of the sensor. The average emf values were 144 (n=1.3 $e^-$) mV/dec and 76 (n=1.96 $e^-$) mV/dec for the sensor response step of 0 ppm to 10 ppm and a recovery step of 10 ppm to 0 ppm. This is similar or higher than the theoretical sensitivity for a two-electron reaction, which is 74.64 mV/dec. Without being bound by any theory, the differences between the theoretical and calculated sensitivity, especially in the response stage, may indicate more efficient desorption, compared to adsorption, of $SO_2$ gas at the surface of the sensing electrode. It is evident that the recovery was faster, at ~15-60 min depending on the $SO_2$ concertation, whereas response time was typically longer than >60 min (except in the case of 0 ppm to 2.5 ppm where $t_{90\%}$=21 min). Although the emf in the recovery stage is stable, it did not return to the initial emf value, and it may use a longer period to fully recover. Response and recovery times may be decreased by using a catalyst to catalyze fast $SO_2$ oxidation. Response and recovery times may be decreased by changing the operation temperature, so that adsorption and desorption of $SO_2$ processes are shortened. The sensing electrode microstructure and composition can also be changed to change response and recovery times, as discussed below.

One promising strategy to shorten the response/recovery time is by introducing a porous auxiliary sensing electrode to facilitate faster adsorption and diffusion of sulfur dioxide through the porous sensing electrode structure, like that shown in FIG. 4A. A porous microstructure increases the effective surface area for reaction and the amount of sulfur dioxide molecules that participate in the electrochemical reaction. With a porous microstructure, the sensing reaction takes place at the quadruple-phase boundary (QPB) reactive sites, where the electrochemical equilibrium uses a quadruple contact between the auxiliary phase of $Li_2SO_4$—$CaSO_4$, the Au current collector, the solid electrolyte, and the gaseous phase of $SO_2$, as shown in FIG. 4A. To improve the distribution of Au particles and increase the density of QPB reaction sites throughout the sensing electrode, a sensing electrode with a porous microstructure with an approximate pore diameter ranging from 5 to 10 μm was used. This microstructure was made by lowering the processing temperature of the sensing electrode from 750 to 600° C.

Figure 9B:
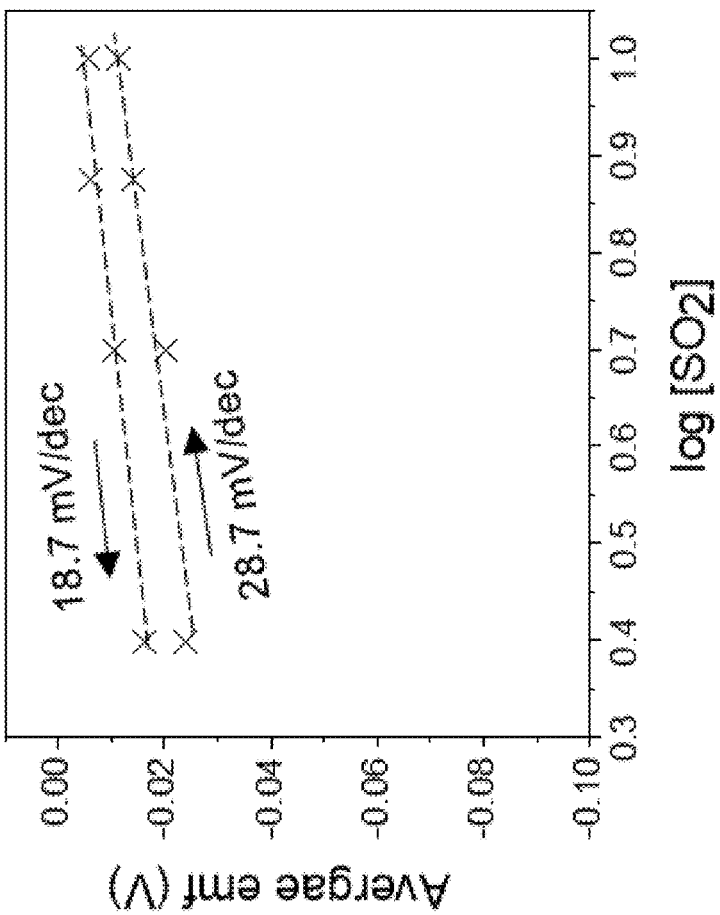
FIG. 9B shows average emf responses from the data in FIG. 9A.
Figure 9A:
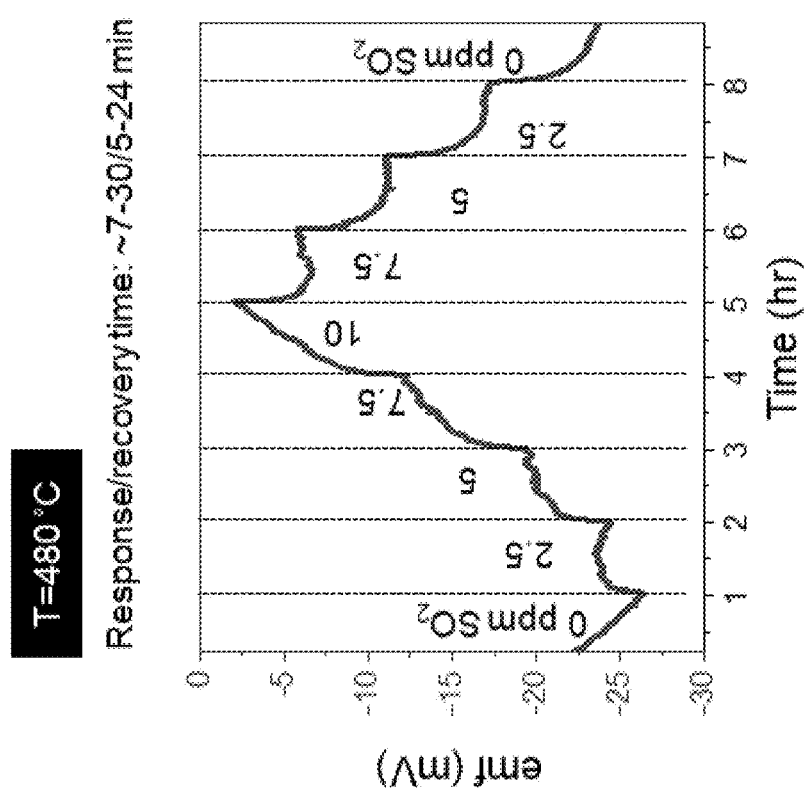
FIG. 9A shows emf response of an SO$_x$ sensor with the porous auxiliary sensing electrode of FIG. 4A to SO$_2$ concentration step changes (0-10 ppm) at 480° C.

FIGS. 9A-9B show the response time and recovery times of a gas sensor with a porous microstructure at 480° C. in the concentration ranges of 0 ppm to 10 ppm $SO_2$ and 10 ppm to 0 ppm $SO_2$, respectively, in 2.5 ppm steps. The graphs show a clear improvement in the response time of the porous sensing electrode compared to the dense electrode graphs shown in FIGS. 8A-8B. Here, the porous sensing electrodes revealed a shortened response time from >~60 min for the dense electrode to ~7-30 min for the porous electrode. The recovery time decreased from ~15-60 min for the dense electrode to ~5-24 min for the porous electrode, depending on the selected $SO_2$ concentration step. Cross-sectional SEM images and EDS elemental mapping of the sensing electrode/solid electrolyte interface shown in FIG. 4D revealed that the porous sensing electrode structure has an average thickness of ~20 μm and has a homogeneous distribution of the gold paste in the porous sensing electrode. This structure creates multiple quadruple contact points (QPB) for the cermet structure, which may account for the improvement in response time after $SO_2$ exposure. Incorporating gold paste in the composite sensing electrode helped maintain better metallic conductivity and improved the quadruple contact areas. The porous sensing electrode structure supported a continuous ion and electron conduction paths. The porous sensing microstructure also provided pathways for the infiltration of sulfur dioxide into the porous structure, which effectively increased the available surface area for the electrochemical reaction. On the other hand, a porous microstructure with efficient quadrupole phase boundary may not only secure higher effective surface area for reaction and favorable diffusion of sulfur dioxide into the porous sensing electrode structure, but it may also instigate additional degradation reactions between the solid electrolyte and the sensing electrode. Indeed, once the average emf values and the logarithm of the $SO_2$ gas concentration was fitted by the Nernst equation in order to evaluate sensitivity (mV/dec), it was determined to be 28.7 (n=5.2 $e^-$) and 18.7 (n=7.9 $e^-$) mV/dec for the sensor response step (0-10 ppm) and recovery step (10-0 ppm), respectively, significantly lower than the theoretical sensitivity of 74.64 mV/dec and the sensitivities determined in the case of a dense sensing electrode.

The investigation revealed that selecting the processing temperature of the $Li_2SO_4$—$CaSO_4$ sensing electrode between 600° C. and 750° C. can be used to select either a dense or a porous microstructure sensing electrode. The porous microstructure provided increased surface area for the electrochemical sensing reaction to occur, which may facilitate faster gas adsorption/desorption processes and improve the response/recovery time. The porous microstructure also shortened the $Li^+$ ion diffusion pathways in the low conducting $Li_2SO_4$—$CaSO_4$ phase (~$10^{-6}$ S/cm at 300° C.) compared to the $Li^+$ ion diffusion through a dense, several micron-thick sensing electrode. The low sensitivity values observed for the porous sensing electrode microstructure may indicate that the voltage does not approximately follow the Nernst law and that the system may not be in a thermodynamic equilibrium.

A potentiometric type III $SO_2$ sensor based on the fast-conducting Li-garnet $Li_{6.54}La_{3.00}Zr_{1.36}Ta_{0.50}O_{11.73}$ solid electrolyte was demonstrated by using different sensing electrode microstructures, namely dense and porous, and a porous gold layer as the reference electrode. To succeed here in defining the $SO_2$ sensing electrode chemistry and phase, and its stability towards the Li garnet electrolyte, the phase compatibility was probed. Two configurations were presented, dense and porous structures of the $Li_2SO_4$—$CaSO_4$ sensing electrode by changing the processing temperature. The sensor operated at 480° C. with sensitivities values ranging from 144 to 18 mV/dec and recovery/response time ranging from 5 to 60 min depending on the auxiliary sensing electrode configuration and $SO_2$ concentrations. The QPB-based porous configuration showed up to 1-order of magnitude lower response time and up to a 75% decrease in the recovery time compared to the TPB-based dense configuration.

Sensing Electrode Incorporating Li Garnet and the $SO_2$ Sensor Voltage Response The interface between the solid electrolyte and the sensing electrode may be further stabilized by adding Li garnet to the auxiliary sensing electrode. Li garnet may further assist in both improving the ionic conductivity and response time of the sensor by i) creating percolation pathways, forming randomly connected clusters with improved $Li^+$-ion conductivity through the electrode; ii) increasing the effective surface area for electrochemical sensing reactions by creating triple-phase boundary (TPB) reaction zones with shortened $Li^+$-ion diffusion distance from the sensing to the garnet LLZO solid electrolyte; and iii) stabilizing the solid electrolyte itself by playing an active role in forming an interfacial layer between the solid electrolyte and the sensing electrode, thus helping to achieve thermodynamic equilibrium. Two main processing strategies were undertaken in order to incorporate garnet LLZO in the auxiliary phase ($Li_2SO_4$:$CaSO_4$): i) LLZO calcinated powder was directly added to the sensing electrode paste followed by heat treatment at 750° C., as shown in FIG. 6A, and ii) a porous LLZO scaffold was created by preparing a porous LLZO layer on top of the LLZO sintered pellet, followed by infiltration of the sensing electrode paste and subsequent heat treatment at 750°, as shown in FIG. 5A.

$SO_2$ sensor operation was investigated in terms of its performance characteristics employing a sensing electrode with an Li garnet scaffold, like that shown in FIG. 5A. The $SO_2$ concentration was varied from 0 ppm to 10 ppm and back to 0 ppm with 2.5 ppm step changes in dry synthetic air. Electromotive force (emf) values were recorded and converted to $SO_2$ concentrations to determine detection sensitivity, response time, and recovery time. Response and recovery times were defined as the time the sensor used to reach 90% of the steady final signal and the time the sensor takes to return to 10% of the steady signal, respectively.

Figure 10B:
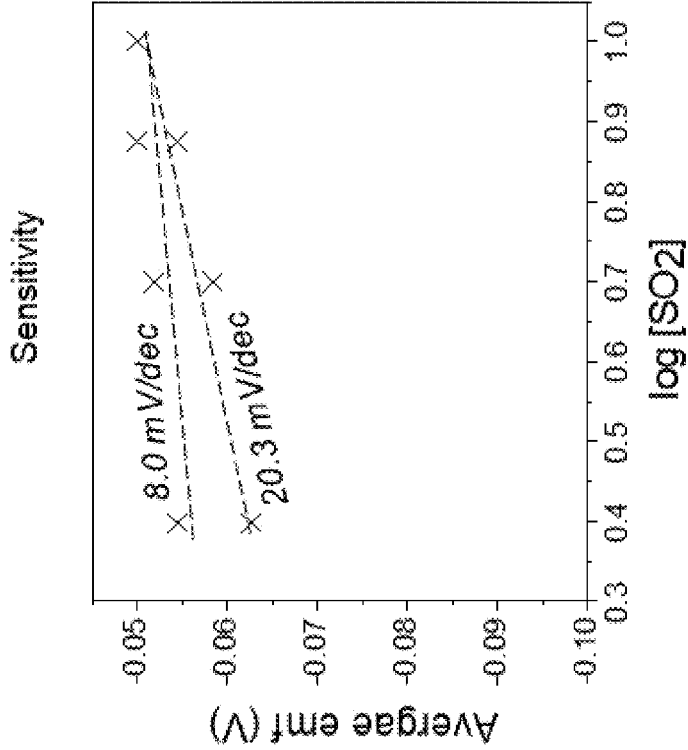
FIG. 10B shows average emf responses from the data in FIG. 10A.
Figure 10A:
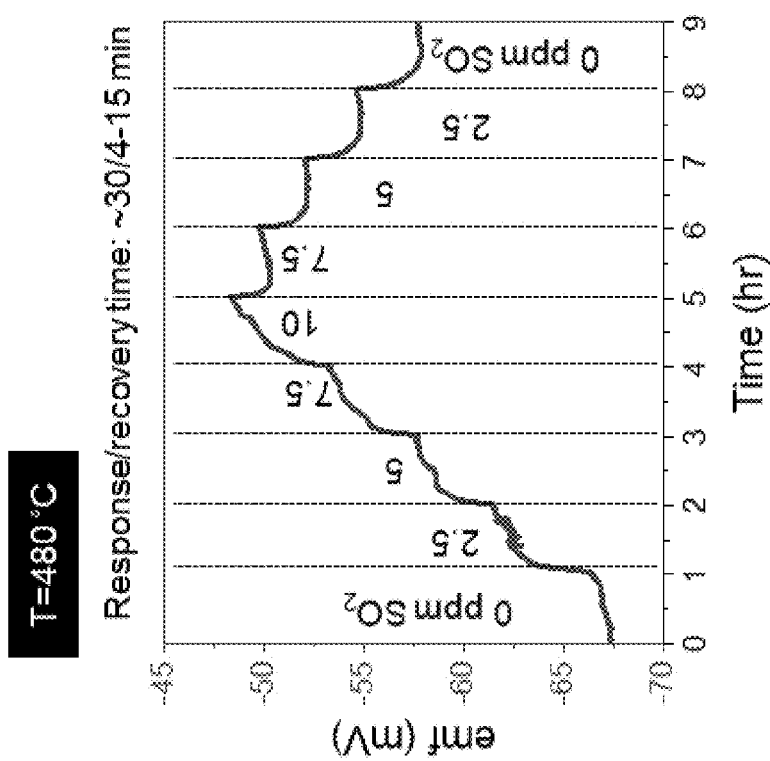
FIG. 10A shows emf response of an SO$_x$ sensor with the dense auxiliary sensing electrode with a lithium garnet scaffold of FIG. 5A to SO$_2$ concentration step changes (0-10 ppm) at 480° C.

FIGS. 10A-10B show the response time and recovery times of the gas sensor with a Li garnet scaffold at 480° C. in the concentration ranges of 0 ppm to 10 ppm $SO_2$ and 10 ppm to 0 ppm $SO_2$, respectively, in 2.5 ppm steps. A consistent increase in the emf of the sensor was observed in the electrochemical experiments measuring the emf response upon increase of $SO_2$ concentration steps, as shown in FIG. 10A. The response time was determined to be ≥~30 min while the recovery time was achieved within ~4-15 min. Nonetheless, the sensitivity of the sensor was determined to be 20.34 mV/dec (n=7.3 $e^-$) and 8 mV/dec (n=18.6 $e^-$) for the sensor response step (0-10 ppm) and recovery step (10-0 ppm), respectively, significantly lower than the theoretical sensitivity for a two-electron reaction of 74.64 mV/dec, as shown in FIG. 10B.

Figures 11A, 11B, 11C:
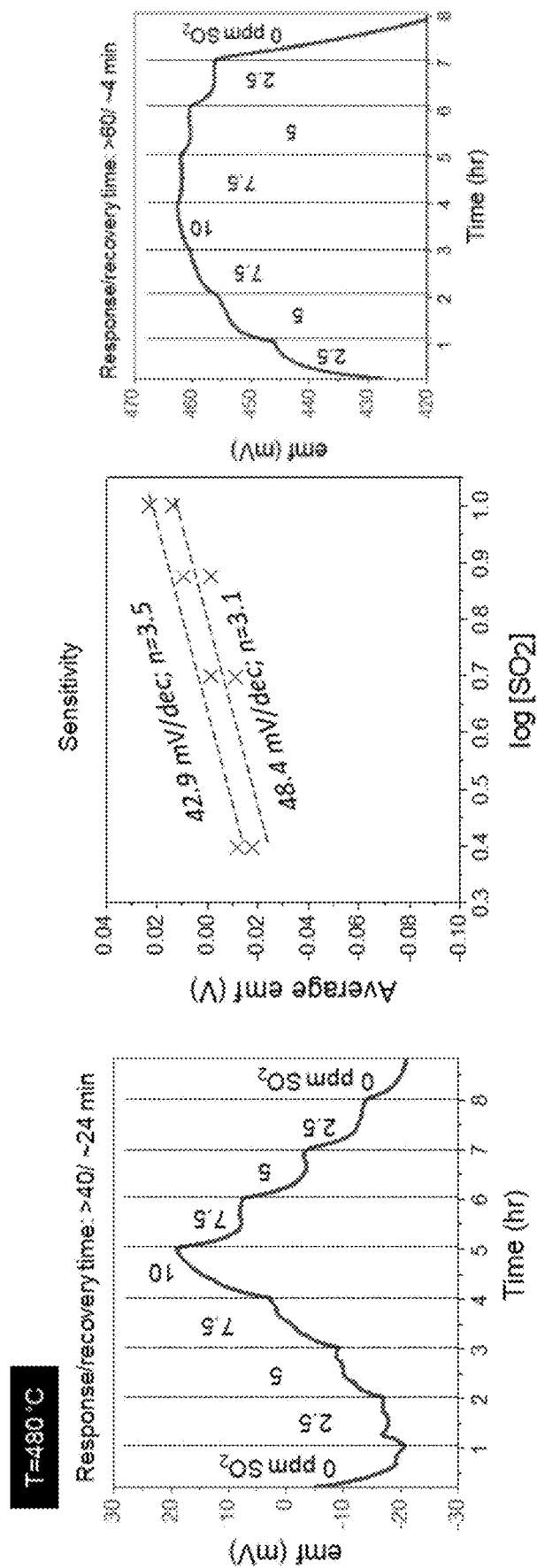
FIG. 11A shows emf response of an SO$_x$ sensor with the dense auxiliary sensing electrode with a lithium sulfate, calcium sulfate, and lithium garnet composite of FIG. 6A to $SO_2$ concentration step changes (0-10 ppm) at 480° C.
FIG. 11B shows average emf responses from the data in FIG. 11A.
FIG. 11C shows emf response of an $SO_x$ sensor with the dense auxiliary sensing electrode with a lithium sulfate, calcium sulfate, and lithium garnet composite of FIG. 6A to $SO_2$ concentration step changes (0-10 ppm) at 240° C.

FIGS. 11A-11C show $SO_2$ sensor operation in terms of its performance characteristics employing a sensing electrode with a dense Li garnet composite, like that shown in FIG. 6A. The Li garnet composite sensing electrode had a sensitivity of 48.4 mV/dec (n=3.1 $e^-$) and 42.9 mV/dec (n=3.5 $e^-$) for the sensor response step (0-10 ppm) and recovery step (10-0 ppm), respectively (FIGS. 11A-11C). The response time of ≥~40 min and recovery time of ≥~24 min was like the scaffold structure of Li garnet. The gas sensor with a Li garnet composite had a complete recovery to the initial sensor voltage with similar sensitivity values upon increase and decrease of $SO_2$ concentration steps, as shown in FIG. 11B. In the composite structure where Li garnet was distributed more homogeneously between the sulfate components and chemically reacted with them, the sensing electrode may have a stable thermodynamic equilibrium through both the response and recovery steps. A significant improvement in the response ability of the sensor was demonstrated for the composite sensing electrode by the operation of the sensor at significantly lower temperatures, namely 240° C., as shown in FIG. 11C. At 240° C., the response and recovery times are ≥~60 min and ≥~4 min, respectively. These times may be improved by incorporating electronic conductors in the composite sensing electrode to meaningfully increase the active reaction zones. The sensitivity value was determined to be 47.7 mV/dec (n=2.1 $e^-$) for the sensor response step (0 ppm to 10 ppm), a sensitivity value close to the theoretical value of 50.8 mV/dec (calculated for 240° C.). Without being bound by any theory, it is hypothesized that lower operating temperature inhibits decomposition reactions between Li garnet and $Li_2SO_4$—$CaSO_4$, ensuring a sensitivity close to the theoretical value, and implying thermodynamic equilibrium when using a composite sensing electrode. However, the lower operating temperature evidently has a significant effect on the $O_2/SO_2$ desorption processes, decreasing the sensitivity to 8.2 mV/dec for the sensor recovery step (10 ppm to 0 ppm). A catalyst may be used to increase sensitivity for operation at lower temperatures.

Chemical and Thermal Stability of the Li-Garnet $Li_7La_3Zr_2O_{12}$ in $SO_2$ Environments The inventors have demonstrated $SO_2$ electrochemical sensors with sufficient stability of the Li garnet electrolyte to maintain its phase and ensure sufficient Li conductivity to function for fast sensor response. To probe stability for the rather harsh environment, dense and cubic Li-garnet solid-state electrolyte pellets ($Li_{6.5}La_3Zr_{1.5}Ta_{0.5}O_{12}$) were fabricated via classic solid-state synthesis and their phase stability and microstructural changes were investigated when exposed to low and high $SO_2$ concentrations ranging between 4 ppm and 250 ppm at temperatures between 240° C. and 480° C. over a 24-hour period.

FIG. 12A shows morphological changes in Li garnet after exposure to $SO_2$ observed using SEM. Without being bound by any theory, these morphological changes may indicate changes in near-order vibration of the Li garnet lattice resulting from reaction with $SO_2$.

At low $SO_2$ concentrations (4 ppm), the cubic garnet structure was maintained over the entire probed temperature range, 25-480° C. At temperatures of 320° C. and above, the XRD peak signature at 22.23° became more prominent, which corresponds to (11$\bar{1}$) diffraction of $Li_2SO_4$. The thickness of the $Li_2SO_4$ layer formed on LLZO increased from 0.5 to ~2 μm upon increasing the temperature from 240° C. to 480° C., according to the SEM cross sectional images in FIG. 12A. For temperatures >320° C., a change in morphology from a continuous but porous layer of $Li_2SO_4$ to a non-continuous and dense island-like layer was observed. FIG. 12B schematically illustrates the Li garnet morphology changes upon exposure to $SO_2$ at different concentrations and temperatures. Without being bound by any theory, the formation of $Li_2SO_4$ may be a product of leaching of $Li^+$ ions from the surface of the Li garnet pellet followed by a reaction with $SO_2$ gas. That said, the $Li_2SO_4$ layer did not substantially affect the $Li^+$ ionic conductivity of Li garnet, with the Li garnet maintaining a conductivity of ~0.7 mS cm$^{-1}$ at ambient temperature. Electrochemical impedance spectroscopy was used to estimate the bulk ionic conductivity of the same LLZO pellet after 24-h exposure to 10 ppm of $SO_2$ at 240 and 480° C. and indicated that the Li garnet maintained its cubic structure.

At medium $SO_2$ concentrations (40 ppm), the appearance of $Li_2SO_4$ on the surface of the Li garnet was observed in the SEM, XRD, and Raman analyses at a temperature of 320° C. and above. The thickness of the $Li_2SO_4$ layer increased by one order of magnitude from ~350 nm at 240° C. to ~3.5 μm at 480° C. after exposure to 40 ppm $SO_2$. The top-view SEM micrographs reveal more about the evolving growth of this layer starting from a porous morphology followed by an increase in grain size and densification of the $Li_2SO_4$ layer as a function of temperature, as shown in FIG. 12B. The complete coverage of the Li garnet pellet by the dense $Li_2SO_4$ layer aligns well with its principal observation in the Raman surface characterization and XRD bulk characterization. These results were accompanied by a color change of the pellet from yellowish to white at temperatures above 400° C.

At high $SO_2$ concentrations (250 ppm), the Li garnet pellets were exposed to rather harsh conditions over a 24-hour period at temperatures of 240° C. to 480° C. Up to 40 ppm $SO_2$ exposure, the phase of the bulk Li garnet did not change and remained cubic. At 250 ppm $SO_2$, XRD analysis revealed that even though the cubic phase remained in Li garnet, there was pronounced Li loss and the formation of lanthanum zirconate ($La_2Zr_2O_7$), as indicated by the increasing intensity of the (111) diffraction peak at 28.5° with temperature (at both 240 and 480° C.). The cross-section SEM micrographs indicate a continuous and dense $Li_2SO_4$ layer at 240° C. and 480° C. with thicknesses of ~2.5 and 4 μm, respectively, exclusively covering the surface of the Li garnet pellet, as shown in FIG. 12A. Altogether, the cubic garnet structure was maintained as the majority phase up to 480° C. in the bulk at low and medium $SO_2$ concentrations. In very harsh $SO_2$ environments, there was a threshold of ~240° C., above which Li leached out from the Li garnet structure significantly in the process of forming the $Li_2SO_4$ surface layer.

Exploring the spontaneous formation and morphological evolution of $Li_2SO_4$ under diverse $SO_2$ concentrations and temperatures suggests that the major sensing electrode component may preferably be $Li_2SO_4$ to substantially avoid its in-situ formation during sensor operation and to better manipulate its morphology and thickness through the formation of an artificial sensing electrode layer. The was a tendency toward the formation of $Li_2SO_4$ on LLZO at the investigated temperatures and $SO_2$ concentration ranges. The latter is of high importance, indicating the feasibility of $SO_2$ oxidation under the explored conditions, without the use of catalysts (e.g., platinum (Pt) mesh) typically employed to catalyze the oxidation of $SO_2$. The investigation clarified that the $SO_2$ concentration may be kept at <40 ppm, where the gas sensor was operated at elevated temperatures (480° C.). Under these conditions, the cubic structure and high $Li^+$ conductivity of Li garnet is maintained, indicating the potential long-term operation of the sensor.

Without being bound by any theory, once an artificial $Li_2SO_4$ layer is introduced on top of the Li garnet pellet as a sensing electrode, the formation of a new $Li_2SO_4$ layer, formed in situ on top of the LLZO layer during sensor operation, may be kinetically inhibited. Additional stability investigations of Li garnet with an artificially deposited $Li_2SO_4$ layer were executed to probe this theory. Qualitative analysis conducted using SEM micrographs and elemental mapping of a Li garnet pellet pre-deposited with $Li_2SO_4$ and exposed to 10 ppm $SO_2$ at 480° C. for 24 hours revealed that the in-situ formation of the $Li_2SO_4$ layer was in fact inhibited. Thin (<500 nm) deposits (such as $Li_2CO_3$ and $Li_2SO_4$ deposits) were observed mainly at defected areas on the surface of the Li garnet pellet. Moreover, post-mortem SEM and elemental mapping analysis of the sensing electrode/Li garnet cross section revealed that the ~15-20-μm-thick sensing electrode remained unchanged throughout the sensing experiment (~24 h) without the appearance of a new deposit layer on top of the sensing electrode.

The phase and microstructure evolution indicate that the processing range to first establish the sensing electrode formation of $Li_2SO_4$ on LLZO may be separated from the operation conditions of the sensor. Manufacture of the sensing electrode on LLZO pellets may be fabricated artificially in a step prior to operation of the sensor. With this method, the electrode's microstructure and composition can be tuned efficiently. Operation of the $SO_2$ sensor may proceed at a lower temperature and lower $SO_2$ concentrations where long operation lifetimes are desired. The Li garnet pellet remained primarily in the cubic phase, with no occurrence of the Li-loss phase observed for a critical amount of ~3 μm of $Li_2SO_4$ formed when operated between 240° C. and 480° C. for 4 ppm to 40 ppm $SO_2$. Considering that the regulation values for $SO_2$ detection in ambient atmosphere are 0.1-10 ppm, the gas sensor may be preferably operated in the regulated $SO_2$ range at a temperature of 240-480° C.

Li Garnet/$Li_2SO_4$ Interface

The electrode/electrolyte interface plays a critical role in determining the performance characteristics of the gas sensor. The gas sensor responds to the difference in the chemical potential of $Li^+$ at the interfaces of the electrodes. The Li garnet solid electrolyte acts as a $Li^+$-ion source that facilitates $Li^+$ diffusion to and from the sensing electrode so that $Li^+$ can chemically react either during the processing of the sensing electrode (e.g., at 750° C.) or during the operation of the sensor (e.g., at 480° C.). The sensing electrode in the following experiments was a composite of $Li_2SO_4$ and CaSO4. This composite benefits from faster response time attributed to lower melting point and higher ionic conductivity than $Li_2SO_4$ alone. In the particular material composite case of $Li_2SO_4$—$CaSO_4$|LLZO, both the sensing electrode and the solid electrolyte are $Li^+$-ion conductors. In other words, $Li^+$ is the mobile ion. Thus, the electrochemical chain through the interface is achieved with $Li^+$ ions. This contrasts with other type III potentiometric electrochemical sensors, where the sensing electrode and solid electrolyte are based on different mobile ions (e.g., $Li^+$ conductor and $O^{2-}$ conductor for $Li_2SO_4$|MSZ), necessitating the formation of a mediating phase (ionic bridge) to provide a fast and stable electrochemical response by delivering a continuous path for ion conduction.

FIG. 13 shows XRD studies of possible chemical reaction between LLZO and the sensing electrode ($Li_2SO_4$—$CaSO_4$). An interfacial layer may be formed at the sensing electrode/solid electrolyte interface during the sensing electrode coating process (750° C.) and/or operation of the sensor (480° C.). The interfacial layer may deteriorate the $SO_2$ sensing ability and create a complex voltage response due to competitive electrochemical reaction. In one experiment, cross-sectional SEM micrographs and elemental mapping of a sensor after a prolonged sensing experiment revealed a ~1-2-μm-thick Ca-rich interfacial layer sandwiched between the LLZO solid electrolyte and sensing electrode. The interface may be stabilized by adding Li garnet to the auxiliary sensing electrode, as described in more detail above.

Fabrication of the Gas Sensor

Synthesis of LLZO Solid Electrolyte

The solid electrolyte $Li_{6.5}La_3Zr_{1.5}Ta_{0.5}O_{12}$Li garnet was prepared via solid state reaction route using stoichiometric amounts of $La(OH)_3$, $ZrO_2$, $Ta_2O_5$, and an excess amount of 50 wt. % LiOH to compensate for the lithium evaporation during the high temperature calcination of the powder. The precursors were homogenized by planetary milling in absolute isopropanol, and then dried at 90° C. The obtained powder was packed and first-calcinated at 750° C. for 10 h at a heating rate of 5° C. $min^{-1}$ under the constant flow of synthetic air (50 sccm). The last two steps of ball-milling, drying and calcination were repeated once again. Finally, weighted amount of the Li garnet powder was pressed into a pellet using a die with a diameter of 12 mm and thickness of 1.5 mm in a uniaxial press (2.2 tons·$cm^{-2}$). The green pellets were sintered in a MgO crucible at 1100° C. for 5 hours at heating/cooling rates of 10° C. $min^{-1}$ and under a constant flow of pure oxygen (50 sccm). The sintered Li garnet pellets were dry-polished to ensure consistency among all samples.

Fabrication of the Sensing Electrode and Sensor Device

The sensing electrode was prepared by mixing different mole ratios of lithium sulfate (($Li_2SO_4$), anhydrous, 99.99% trace metal basis) and calcium sulfate (($CaSO_4$), anhydrous, 99.99% trace metal basis). A binder solution (mixture of α-terpineol and ethylene cellulose) was added in a weight ratio of 1:2 to the different $Li_2SO_4$:$CaSO_4$ powder mixture, crushed and homogenized using a mortar until a smooth paste was produced. The paste was brushed on a quarter of the solid electrolyte and heated at 750° C. for 2 h at a heating rate of 10° C. $min^{-1}$ under the constant flow of pure oxygen. After the sensing electrode preparation, a gold paste (Conductive Epoxy GOLD Paste, EMS) was brush-painted on the second quarter of the solid electrolyte surface, serving as the reference electrode (RE). A thin layer of the gold paste was brushed on the sensing electrode, serving as a current collector). Platinum wires (0.1 mm diameter, 99.995%) were connected to the sensing and reference electrodes using the gold paste. The complete sensor construction was annealed at 300° C. for 4 h in an oxygen atmosphere to cure the gold paste. An adhesive sealant was applied on the reference electrode (898FS, Cotronics corp.) and cured again at 300° C. for 2 h in an oxygen atmosphere.

In order to develop a porous sensing electrode two major processing approaches were taken: i) reducing the sensing electrode processing temperature to 600° C. instead of 750° C. while maintaining all other parameters, or ii) adding 10% of corn starch as a pore former to the auxiliary electrode paste followed by a heat treatment at 600° C. for 4 h at a heating rate of 10° C. $min^{-1}$ under the constant flow of pure oxygen.

A composite sensing electrode including Li garnet was fabricated by adding 10 wt. % of the synthesized LLZO powder in the auxiliary electrode paste followed by the typical heating step at 750° C. for 2 hours at a heating rate of 10° C. $min^{-1}$ under the constant flow of pure oxygen.

A porous LLZO scaffold layer was prepared by brushing a paste of the sintered LLZO powder and binder solution (mixture of α-terpineol and ethylene cellulose) in a 1:1 weight ratio on top of the LLZO pellet. Corn starch was added as a pore former. The sample was sintered at 1100° C. for 2 h under oxygen flow. Once a porous LLZO scaffold was formed, a sensing electrode paste was sprayed on top of the porous LLZO and further heated to 750° C. for 2 h at a heating rate of 10° C. $min^{-1}$ under the constant flow (50 sccm) of oxygen.

When better control of the thickness and geometry of the sensing electrode was used (for instance, in the case of the porous LLZO scaffold layer), a spraying procedure was employed. Appropriate amounts of the $Li_2SO_4$ and $CaSO_4$ powders were weighed and ball-milled in absolute isopropanol for 3 hours. The homogenized suspension was loaded into a spray gun and sprayed on the LLZO pellet using a shadow mask. The sprayed sensing electrode was then heated at 750° C. for 2 hours at a heating rate of 10° C. $min^{-1}$ under the constant flow (50 sccm) of pure oxygen.

Chemical stability investigation of LLZO solid electrolyte and auxiliary sensing electrode components. Powder mixtures of LLZO and the sulfates, i.e., LLZO:Li$_2$SO$_4$:CaSO$_4$, in different mole ratios (namely 1:0:1, 1:1:2, 0:1:1, 1:0:0, 0:1:0, and 1:1:0) were thoroughly mixed using a mortar and pestle, packed into a 12-mm diameter die, and heated at 750° C. for 2 h at a heating rate of 10° C. min$^{-1}$ under the constant flow (50 sccm) of pure oxygen. The reaction products were identified using XRD.

Sensing System Setup and Electrochemical Sensing Measurements

The SO$_2$ gas sensing experiments were conducted and measured in a Linkam stage (HFS600E) with an internal volume of ~50 cm$^3$ equipped with a heating element in the temperature range of 25-600° C. Two automated mass flow controllers were used to balance between 50 ppm SO$_2$ balanced by dry synthetic air (21% O$_2$ in N$_2$) in order to achieve different concentrations of the analyzed gas, namely of 0-10 ppm of SO$_2$ with 2.5 ppm steps, held for 1-2 h. The open-circuit voltage was measured using a Kiethley 2612B electrometer. The reference and sensing electrodes were contacted using the Pt wires, which were glued to the electrodes with gold paste. The sensitivity of the sensor was evaluated through sensing experiments where the open-circuit voltage (OCV) was measured as a function of SO$_2$ concentration at a constant and calibrated temperature of either 240, 320, 400 and 480° C. with a heating/cooling rate of 10° C. min$^{-1}$.

Surface and Bulk Characterization

Field Emission Scanning Electron Microscopes (FESEM Ultra Plus and FESEM Supra55VP equipped with an Energy Dispersive x-ray Spectrometer (EDS) for elemental analysis and mapping, Zeiss) and Scanning Electron Microscope (SEM JEOL 7900F) equipped with wide variety of detectors including EDS and a Soft X-ray Emission Spectrometer (SXES) allows efficient and parallel collection of very low-energy rays with chemical state analysis. The different scanning electron microscopes were used to characterize the microstructure of the sensing electrodes as a function of their processing procedures.

Melting temperature of the sensing electrode as a function of its composition was determined via Differential Scanning calorimetry/Thermogravimetric (DSC/TGA) analysis of different mole ratio of Li$_2$SO$_4$: 4, namely 1:0, 1:1, 4:1, 2:1, 1:2 and 4:1. The measurement was conducted under synthetic air from room temperature to 900° C., held for 5 min and cooled back to room temperature at a ramp rate of 10° C./min for both heating and cooling steps.

Phase Compatibility and Synthesis Protocol for the SO$_2$ Sensing Electrode/Li-Garnet Electrolyte A thorough electrochemical cell design and operational principles were explored for the Li$_7$La$_3$Zr$_2$O$_{12}$ garnet-based sensor tracking SO$_2$. The sulfur dioxide sensor architecture had an in-plane geometry including a Ta-doped LLZO Li garnet pellet solid electrolyte with a sensing electrode and a gold reference electrode forming the gas sensor, as shown in FIG. 2B and FIG. 7. The gold reference electrode was brush-painted as a paste on top of the dense pellet of Li garnet and sealed with inorganic adhesive (on top of the pellet on all exposed surfaces except the sensing electrode). The inorganic adhesive served as a protective layer to substantially prevent water vapor and SO$_2$ gas in the atmosphere reacting with the Li garnet or the reference electrode. The sensing electrode includes two or multiple phase components, which may help with sluggish recovery times. Examples of components that may be added to the sensing electrode include CaSO$_4$ (with and without SiO$_2$), BaSO$_4$, V$_2$O$_5$, or La$_2$O$_2$SO$_4$—K$_2$SO$_4$. In the current study, garnet solid electrolyte obviates the use of SiO$_2$ to avoid decomposition of the electrolyte through the formation of lithium silicate (Li$_2$Si$_x$O$_{2x+1}$) compounds.

In case of a two-component sensing electrode, i.e., Li$_2$SO$_4$—CaSO$_4$, a less pronounced effect was observed in the average response time (~20 sec) and average recovery time (~12-18 min) as a function of the Li$_2$SO$_4$—CaSO$_4$ mole ratio. Without being bound by any theory, the addition of other metal sulfates such as CaSO$_4$, in eutectic proportions, i.e. ~17 mol %, may suppress interference in the sensor performance attributed to the presence of humidity. Humidity can interfere with the voltage readout because water can affect the activity of SO$_2$. If more than one electrochemical reaction takes place at the sensing electrodes, the sensor operates under a mixed-potential due to competitive reactions. This creates a more complex voltage response. Without being bound by any theory, the addition of other metal sulfates such as CaSO$_4$, may also lower the melting temperature of the mixture. Materials with a lower melting temperature tend to have higher ionic conductivity due a higher defect concentration close to the melting point, which increases gas detection sensitivity at lower temperatures.

FIG. 14 shows the melting point of Li$_2$SO$_4$ and CaSO$_4$ mixtures containing 0, 20, 33, 50, 67, 80 and 100 mol % CaSO$_4$. The melting points indicate that the addition CaSO$_4$ in 20 mol % to 80 mol % lowered the melting point of the mixture by ~150° C., from 853° C. (100% Li$_2$SO$_4$) to ~700° C. upon CaSO$_4$ addition in 20-80 mol %. The results were also used to determine the firing temperature used to assure a complete melt of the sulphate's mixture and improve the adhesion between the sensing electrode layer and the solid electrolyte during fabrication of the gas sensor. The firing temperature was set to 750° C. so that the Li$_2$SO$_4$—CaSO$_4$ sulfates mixture was completely melted. In-situ XRD investigation indicated that LLZO exhibited excellent stability properties and may support the processing temperature used, i.e., 750° C., to melt the solid electrolyte. Thus, the sensing electrode with a chemical composition of Li$_2$SO$_4$—CaSO$_4$ in a mole ration of 1:1, was brushed directly on the surface of the LLZO solid electrolyte pellet, dried and heated up to 750° C. to provide adhesion between the dense sensing electrode and the solid electrolyte.

Further Mitigating LLZO Instability

FIG. 15A shows the open circuit voltage response of an SO$_x$ sensor to four cycles of SO$_2$ concentration step changes (0-10-0 ppm) at 480° C. FIG. 15B shows sensitivity values from the data in FIG. 15A. The calculated number of electrons (slope of V vs. log[SO$_2$] was in good agreement with the expected value of n=2 going from high to low [SO$_2$] concentrations.

FIG. 16A shows the open circuit voltage response of an SO$_x$ sensor with an inorganic coating to SO$_2$ concentration step changes (0-15 ppm) at 480° C. FIG. 16B shows average sensitivity values from the data in FIG. 16A. Using an inorganic adhesive (e.g., Al$_2$O$_3$) as a coating on top of the LLZO mitigated LLZO instability in the presence of an SO$_2$ environment. The inorganic adhesive includes a ceramic material (e.g., Al$_2$O$_3$, ZrO$_2$) that is substantially stable in a SO$_2$ environment. The inorganic adhesive may be applied to the LLZO as a viscous paste and then heat treated. For example, a slurry including Al$_2$O$_3$ particles was applied as a coating on to the reference electrode using a brush. After, the slurry coating was applied, the slurry coating was thermally treated at 300° C. for two hours. In one implementation, the inorganic adhesive coated the reference electrode only. In another implementation, the inorganic adhesive coated the entire top surface of the sensor except for the sensing electrode. A sensor with the entire top surface of the sensor except for the sensing electrode coated with the inorganic adhesive demonstrated faster response time (~20 min) and recovery time (~10 min) but the sensor had a lower sensitivity.

Sensing Electrode Additives and Alternative Materials

The perovskite $(La_{0.6}Sr_{0.4})_{0.99}CoO_{3-\delta}$ (LSC) is an electrically conductive material that may be added to the sensing electrode composite and/or used as the current collector disposed on the sensing electrode. LSC may also act as a catalyst for the oxidation of $SO_2$ to $SO_3$ at the TPB or QPB in the sensing electrode. As a catalyst, LSC may support lower operation temperatures of the $SO_x$ sensor (e.g., 240° C.). LSC may be included in the sensing electrode composite in quantities of about 0% to about 60% by weight (e.g., 10%, 30%, or 50%). Preferably, the LSC is present in quantities of about 10% by weight. In place of LSC, other perovskite oxides may be used that have a high mixed ionic and electronic conductance and stability at temperatures greater than 350° C.

FIG. 17 shows planar SEM images of sensing electrode composites comprising $Li_2SO_4$, $CaSO_4$ and LSC with varying amounts of LSC and different annealing temperatures. FIG. 17 shows 10%, 30%, and 50% by weight LSC in the composite of the sensing electrodes. Two different annealing temperatures were used for the preparation of the sensing electrode, 600° C. and 750° C. The 600° C. annealing temperature provided a porous sensing electrode morphology, while the 750° C. annealing temperature provided a dense sensing electrode morphology.

FIGS. 18A and 18B show the operation of gas sensors using sensing electrodes that include composites of $Li_2SO_4$, $CaSO_4$ and LSC operated at 240° C. with $SO_2$ concentrations ranging from 0 ppm to 15 ppm. The $SO_2$ concentration was changed from 0 ppm to 15 ppm and back to 0 ppm, with 2.5 ppm step changes every 1.5 hours. FIG. 18A shows the open circuit voltage (OCV) of the gas sensor with a sensing electrode including 10% by weight LSC. FIG. 18B shows average OCV measurements vs. the log of the concentration of $SO_2$ from gas sensors with sensing electrodes including 10%, 30%, and 50% LSC at 240° C. With 10% by weight LSC in the sensing electrode, the gas sensor operated at low temperature (240° C.) with sensitivity values close to theoretical (n=2).

FIGS. 19A and 19B show the operation of gas sensors using sensing electrodes that include composites of $Li_2SO_4$, $CaSO_4$ and LSC operated at 320° C. with $SO_2$ concentrations ranging from 0 ppm to 15 ppm. The $SO_2$ concentration was changed from 0 ppm to 15 ppm and back to 0 ppm, with 2.5 ppm step changes every 1.5 hours. FIG. 19A shows OCV measurements of the gas sensor with a sensing electrode including 50% by weight LSC. FIG. 19B shows average OCV measurements vs. the log of the concentration of $SO_2$ from gas sensors with sensing electrodes including 10%, 30%, and 50% LSC at 320° C. With 50% by weight LSC in the sensing electrode, the gas sensor had its highest sensitivity at a temperature of about 320° C.

FIG. 20 shows $SO_2$ detection sensitivity as a function of the amount of LSC in the composite sensing electrode at three different operation temperatures, 240° C., 320° C., and 400° C. Three different amounts of LSC in the sensing electrode were probed, 10%, 30%, and 50% by weight. Sensitivity values are shown in mV per decade (mV/dec), where 1 decade is a 10-ppm change in $SO_2$ concentration. Theoretical values are given based on the expected changes using the Nernst equation and the $SO_2$ concentration. With 10% by weight LSC in the sensing electrode, the gas sensor had its highest sensitivity at 240° C. With 30% by weight LSC in the sensing electrode, the gas sensor had its highest sensitivity at 320° C. and 400° C.

FIG. 21A shows the open circuit voltage response of an $SO_x$ sensor with a sensing electrode with 30% $(La_{0.6}Sr_{0.4})_{0.99}CoO_{3-\delta}$ to $SO_2$ concentration step changes (0-10 ppm) at 400° C. FIG. 21B shows average sensitivity values from the data in FIG. 21A. These sensing experiments indicated that 30% wt. of LSC addition to the sensing electrode showed good sensing performance at 400° C. with ~10-minute response time. Sensing electrodes with LSC may be used for the detection of lower concentrations (e.g., less than 1 ppm) of $SO_2$.

FIG. 22 shows the mechanism of catalyst-assisted $SO_2$ oxidation. A catalyst may be added to the sensing electrode to facilitate oxidation of $SO_2$. A catalyst may facilitate sensor operation at lower temperatures. The catalyst may be, for example, $Fe_2O_3$, NiO, Pt, LSC, or $La_xSm_{1-x}FeO_3$ where x is 0.2-0.8 (e.g., 0.2, 0.4, 0.5, 0.6, or 0.8). The catalyst may be present in the sensing electrode in a weight percent of about 1% to about 50% (e.g., 1%, 10%, 30%, or 50%).

FIG. 23A shows an SEM image of a sensing electrode with 10% $Fe_2O_3$ as a catalyst. The SEM image shows particles of $Fe_2O_3$ 2310 homogenously dispersed in the sensing electrode 2300. FIG. 23B shows the open circuit voltage (OCV) response of an $SO_x$ sensor with a sensing electrode with 10% $Fe_2O_3$ to $SO_2$ concentration step changes (0-10 ppm) at 480° C. FIG. 23C shows average sensitivity values from the data in FIG. 23B. The addition of $Fe_2O_3$ catalyst assisted in recovering the sensor voltage response during decreasing $SO_2$ concentration from 10 ppm to 0 ppm.

Thin Film $SO_x$ Sensors

FIG. 24 is a photograph of a thin film electrochemical potentiometric $SO_x$ sensor. FIGS. 25A-25D show several cross-sectional schematics of thin film electrochemical potentiometric $SO_x$ sensors with an in-plane configuration. These devices are deposited on a substrate (e.g., MgO) using one or more thin film deposition techniques (e.g., pulsed laser deposition, spray pyrolysis, sputtering, spin coating, tape casting). In one implementation, shadow masks are used to direct the fabrication of the sensor. In another implementation, photolithography is used to direct the fabrication of the sensor. In one embodiment of the in-plane configuration, a first PLD layer of crystalline LLZO was deposited on a MgO substrate and a second PLD layer of LSC was deposited on the LLZO. Then the sensing electrode was spray deposited onto part of the LSC layer and the LLZO and the sensor was post-annealed at a temperature between 600° C. and 750° C. Then a blocking layer (e.g., $Al_2O_3$, $Gd_2O_3$, $HfO_2$, $SrTiO_3$) was added to cover the LLZO but not the sensing electrode. In another embodiment of the in-plane configuration, a first PLD layer of crystalline LLZO was deposited on a MgO substrate. Then the sensing electrode was spray deposited onto part of the LLZO layer and then post-annealed at a temperature between 600° C. and 750° C. Then a second PLD layer of LSC was deposited and a blocking layer was added. In place of the LSC PLD step, a gold paste may be used instead.

FIG. 26 shows a cross-sectional schematic of a thin film electrochemical potentiometric $SO_x$ sensor with a cross-plane configuration. This sensor may be made by first depositing an LSC layer using PLD, then depositing an LLZO layer using PLD, then spray depositing the sensing electrode. The sensing electrode is then post-annealed before a blocking layer is applied. The in-plane configuration of the thin film sensor is preferred over the cross-plane configuration because the current collector (e.g., LSC, Au) may de-wet after post-annealing in the cross-plane configuration.

FIG. 27 is a cross-sectional SEM image of part of a thin film $SO_x$ sensor with an in-plane configuration. The sensor was post-annealed at 750° C. for 2 hours in synthetic air.

FIGS. 28A-28C shows SEM images of sensing electrodes deposited on thin film lithium garnet using spray pyrolysis. The sensing electrode ($Li_2SO_4$—$CaSO_4$—Au) deposition morphology changed as a function of spraying time. For a dense and continuous morphology, about 10 μm of sensing electrode was deposited.

FIG. 29A shows the open circuit voltage response of a thin film $SO_x$ sensor to $SO_2$ concentration step changes (0-10 ppm) at 320° C. FIG. 29B shows average sensitivity values for the data in FIG. 29A. The thin film $SO_x$ sensor operated at 320° C. with sensitivity values close to the theoretical sensitivity values in the response step.

FIGS. 30A-30B show SEM images of thin film lithium garnet exposed to 10 ppm $SO_2$ at different temperatures (160° C. and 240° C.) for 24 hours. The lithium garnet substantially degraded when exposed to $SO_2$ at 480° C. Therefore, the thin film $SO_x$ sensor is operated at temperatures lower than 400° C. to reduce or prevent substantial degradation of the solid electrolyte.

FIG. 31 shows Raman characterization of thin film lithium garnet after $SO_2$ exposure, as shown in FIGS. 30A and 30B. The lithium garnet was a 1.5 μm thick layer of Ta-doped LLZO. Increasing the temperature from 240° C. to 480° C. during $SO_2$ exposure led to a change in $Li_2SO_4$ layer morphology from a continuous and porous layer to a non-continuous and denser layer. These results indicate that the working temperature of the thin-film $SO_x$ sensor may be less than 320° C. to maintain cubic LLZO.

FIG. 32 shows Raman characterization of thin film lithium garnet before and after post-annealing at 750° C. Thin film Ta-doped LLZO was deposited by PLD on a MgO substrate using a multilayer deposition approach according to Pfenninger, Rupp et al., Nature Energy, 2019, 4(6), 475-483, which is attached as an Appendix. A cubic LLZO thin film was evident before and after depositing the sensing electrode on top of the LLZO electrolyte via spray pyrolysis and post-annealing at 750° C. $La_2Zr_2O_7$ (LZO), a decomposition product, was also present in the LLZO film after post-annealing.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An $SO_x$ sensor comprising:
a lithium garnet electrolyte;
a sensing electrode comprising:
at least one of a metal oxide or a metal sulfate; and
$Li_2SO_4$,
wherein a first surface of the sensing electrode is disposed on at least a portion of a first surface of the lithium garnet electrolyte;
a current collector disposed on at least a portion of a second surface of the sensing electrode;
a reference electrode disposed on the lithium garnet electrolyte, wherein the reference electrode is electrically coupled to the current collector via a potentiometer; and
a heating element capable of heating the sensing electrode and the lithium garnet electrolyte to a temperature sufficient to achieve a sensor response time of less than about 30 minutes.

2. The $SO_x$ sensor of claim 1, wherein the reference electrode is disposed on:
another portion of the first surface of the lithium garnet electrolyte; or
a portion of another surface of the lithium garnet electrolyte.

3. The $SO_x$ sensor of claim 1, wherein the sensing electrode comprises the metal sulfate, and the $Li_2SO_4$ and the metal sulfate are present in a mole ratio of about 1:4 to about 9.5:0.5.

4. The $SO_x$ sensor of claim 1, wherein:
the metal sulfate is at least one of $CaSO_4$, $K_2SO_4$, $Na_2SO_4$, $Bi_2(SO_4)_3$, $Ce(SO_4)_2$, $ZnSO_4$, $Zr(SO_4)_2$, $Fe_2(SO_4)_3$, $Y_2(SO_4)_3$, $La_2(SO_4)_3$, $Ta_2SO_4$, or $BaSO_4$; and
the metal oxide is at least one of FeO, $Fe_2O_3$, $Fe_3O_4$, VO, $VO_2$, $V_2O_3$, $V_2O_5$, NiO, ZnO, $CeO_2$, $SnO_2$, $Ga_2O_3$, $WO_3$, $TiO_2$, Pt, $In_2O_3$, or $La_xSm_{1-x}FeO_3$ where x is 0.2, 0.4, 0.5, 0.6, or 0.8.

5. The $SO_x$ sensor of claim 1, wherein a thickness of the lithium garnet electrolyte is about 100 nm to about 80 μm.

6. The $SO_x$ sensor of claim 1, wherein the sensing electrode additionally comprises at least one of lithium garnet phase or $(La_{0.6}Sr_{0.4})_{0.99}CoO_{3-\delta}$ phase.

7. The $SO_x$ sensor of claim 1, wherein the sensing electrode additionally comprises a catalyst to facilitate oxidation of $SO_x$.

8. The $SO_x$ sensor of claim 1, wherein the lithium garnet electrolyte comprises a cubic phase.

9. The $SO_x$ sensor of claim 8, wherein the lithium garnet electrolyte comprises $Li_xLa_yZr_zO_{12}$ with at least one additional dopant element.

10. The $SO_x$ sensor of claim 9, wherein the lithium garnet electrolyte comprises $Li_{7-x}La_3Zr_{2-x}Ta_xO_{12}$, where x is about 0.25 to about 0.6.

11. The $SO_x$ sensor of claim 1, wherein the reference electrode comprises at least one of $(La_{0.6}Sr_{0.4})_{0.99}CoO_{3-\delta}$, gold, or platinum.

12. The $SO_x$ sensor of claim 1, additionally comprising a capping layer to substantially reduce exposure of the lithium garnet electrolyte to air.

13. The $SO_x$ sensor of claim 1, wherein the sensing electrode has a porous microstructure.

14. A method of sensing a $SO_x$ gas using an electrochemical sensor comprising:
exposing the $SO_x$ gas to a sensing electrode comprising:
at least one of a metal oxide or a metal sulfate; and
$Li_2SO_4$,
wherein a first surface of the sensing electrode is disposed on at least a portion of a first surface of a lithium garnet electrolyte;
heating the sensing electrode and the lithium garnet electrolyte to a temperature sufficient to achieve a reaction between the $SO_x$ gas, $Li^+$ and $O_2$ to form $Li_2SO_4$, thereby changing a potential of the electrochemical sensor; and
detecting a change in the potential of the electrochemical sensor.

15. The method of claim 14, wherein:
the $SO_x$ gas comprises $SO_2$; and
the method additionally comprises oxidizing the $SO_2$ to $SO_3$.

16. The method of claim 14, additionally comprising determining a concentration of the $SO_x$ gas based at least in part on the change in the potential of the electrochemical sensor.

17. The method of claim 14, wherein the temperature is between about 200° C. and about 500° C.

18. A method of making an $SO_x$ sensing electrode comprising:
creating a mixture comprising:
at least one of a metal oxide or a metal sulfate; and
$Li_2SO_4$;
applying the mixture to at least a portion of a first surface of a lithium garnet electrolyte; and
annealing the lithium garnet electrolyte and the mixture to form the $SO_x$ sensing electrode on at least the portion of the first surface of the lithium garnet electrolyte.

19. The method of claim 18, wherein annealing comprises melting the mixture of $Li_2SO_4$ and the metal sulfate.

20. The method of claim 18, wherein the step of annealing comprises heating the sensing electrode under a constant flow of oxygen gas to a temperature sufficient to adhere the sensing electrode to at least the portion of the first surface of the lithium garnet electrolyte.

* * * * *